(12) United States Patent
Yamasaki et al.

(10) Patent No.: US 8,681,593 B2
(45) Date of Patent: Mar. 25, 2014

(54) OBJECTIVE LENS, OPTICAL HEAD AND OPTICAL DISK DEVICE

(75) Inventors: Fumitomo Yamasaki, Nara (JP); Yoshiaki Komma, Osaka (JP); Katsuhiko Hayashi, Nara (JP); Yoshifumi Takasu, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/578,045

(22) PCT Filed: Mar. 17, 2011

(86) PCT No.: PCT/JP2011/001567
§ 371 (c)(1),
(2), (4) Date: Aug. 9, 2012

(87) PCT Pub. No.: WO2011/118161
PCT Pub. Date: Sep. 29, 2011

(65) Prior Publication Data
US 2012/0320728 A1    Dec. 20, 2012

(30) Foreign Application Priority Data

Mar. 25, 2010    (JP) .................................. 2010-070707

(51) Int. Cl.
*G11B 7/135*    (2012.01)
(52) U.S. Cl.
USPC .................................................. 369/112.08
(58) Field of Classification Search
CPC .................................................. G11B 7/1353
See application file for complete search history.

(56) References Cited

U.S. PATENT DOCUMENTS

| | | | |
|---|---|---|---|
| 5,886,970 A | | 3/1999 | Tachibana et al. |
| 5,995,286 A | * | 11/1999 | Mukai et al. .................. 359/571 |
| 7,182,528 B2 | * | 2/2007 | Mori ............................... 385/93 |
| 2001/0038503 A1 | * | 11/2001 | Nakai ........................... 359/869 |
| 2004/0062180 A1 | * | 4/2004 | Mimori et al. ............ 369/112.08 |
| 2004/0213136 A1 | * | 10/2004 | Arai et al. ................ 369/112.23 |

FOREIGN PATENT DOCUMENTS

| | | |
|---|---|---|
| JP | 7-294707 | 11/1995 |
| JP | 9-212894 | 8/1997 |
| JP | 2004-101954 | 4/2004 |

(Continued)

OTHER PUBLICATIONS

English machine translation of JP 2005-050433 A (Nomura et al., Optical Pickup Apparatus and Objective Optical Element, published Feb. 2009).*

(Continued)

*Primary Examiner* — Brian Miller
*Assistant Examiner* — Mark Fischer
(74) *Attorney, Agent, or Firm* — Wenderoth, Lind & Ponack, L.L.P.

(57) ABSTRACT

A lens surface of an objective lens includes an optical surface formed of a plurality of annular optical surfaces which include an approximately stair-shaped cross section and which are annularly partitioned centered around an optical axis of the objective lens, and a plurality of connecting surfaces that connect the plurality of mutually adjacent annular optical surfaces to each other. The plurality of connecting surfaces include cylindrical connecting surfaces formed of a cylindrical surface centered around the optical axis and a conical connecting surface formed of a conical surface centered around the optical axis, and the conical connecting surface connects the annular optical surface and the annular optical surface.

16 Claims, 22 Drawing Sheets

(56) References Cited

FOREIGN PATENT DOCUMENTS

| JP | 2005050433 A | * | 2/2005 | ............ | G11B 7/135 |
| JP | 2006-251787 | | 9/2006 | | |
| JP | 2009037715 A | * | 2/2009 | ............ | G11B 7/135 |
| WO | 2009/128445 | | 10/2009 | | |
| WO | WO 2011/013339 A1 | * | 2/2011 | ............ | G11B 7/135 |

OTHER PUBLICATIONS

International Search Report issued Apr. 26, 2011 in International (PCT) Application No. PCT/JP2011/001567.

* cited by examiner

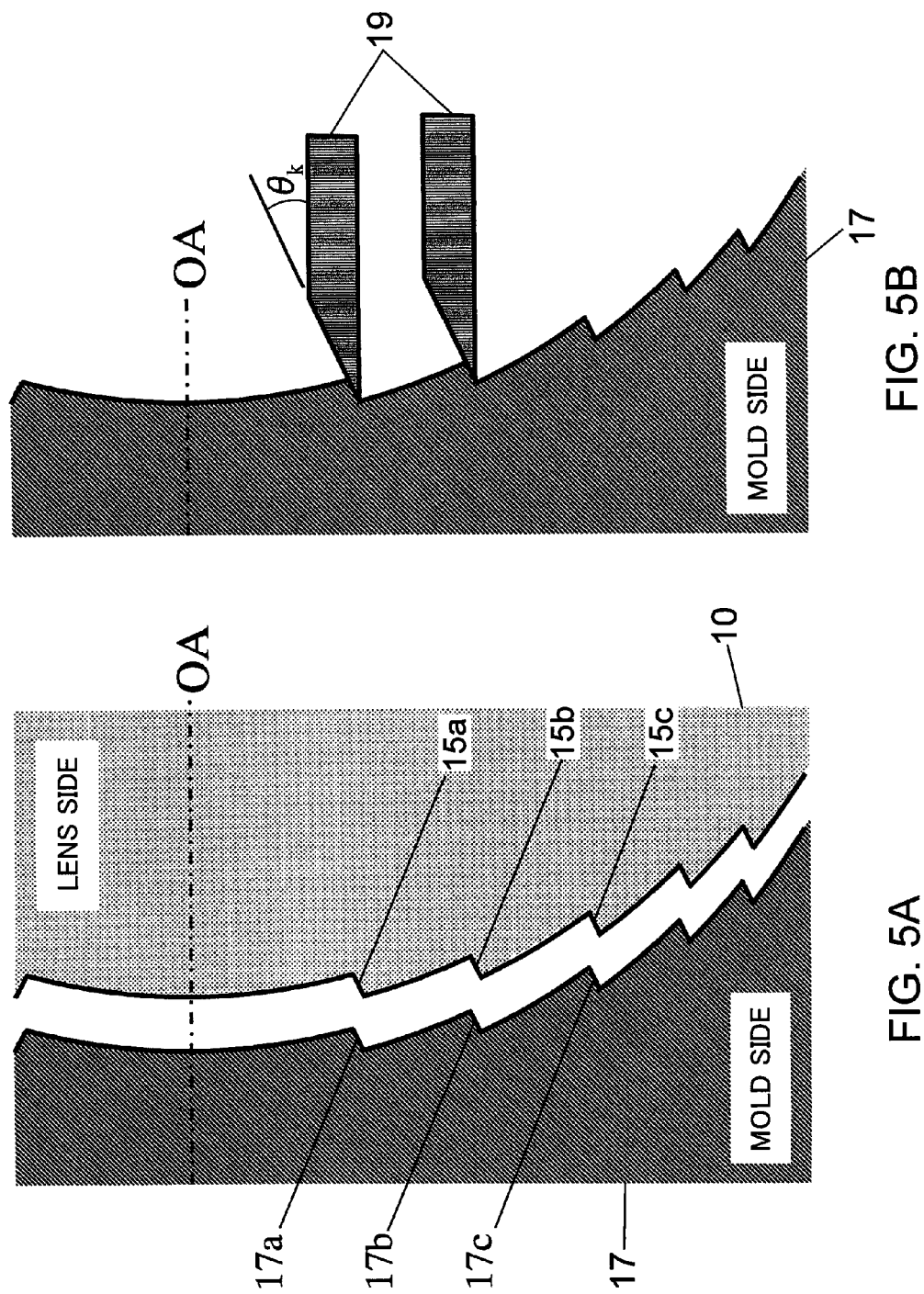

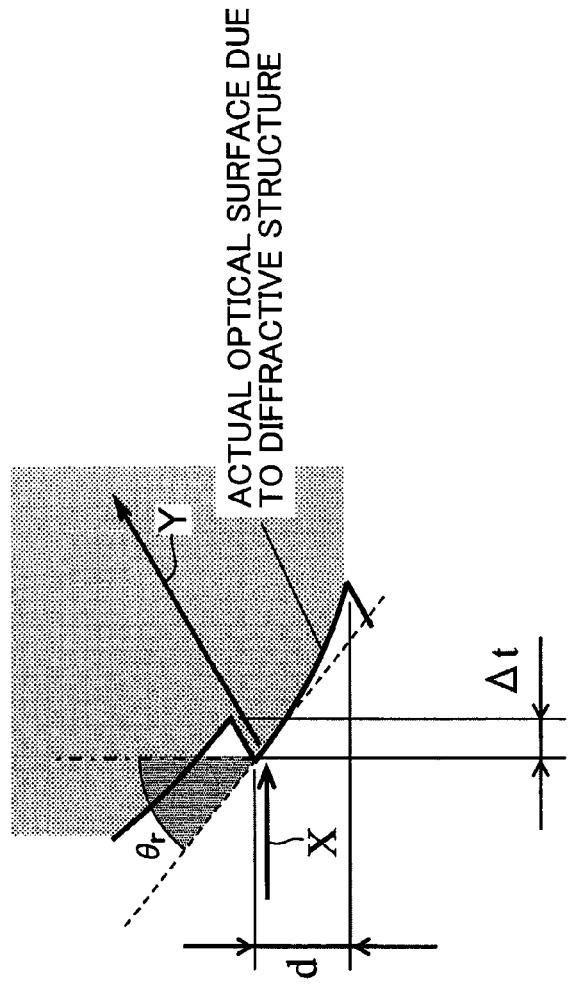
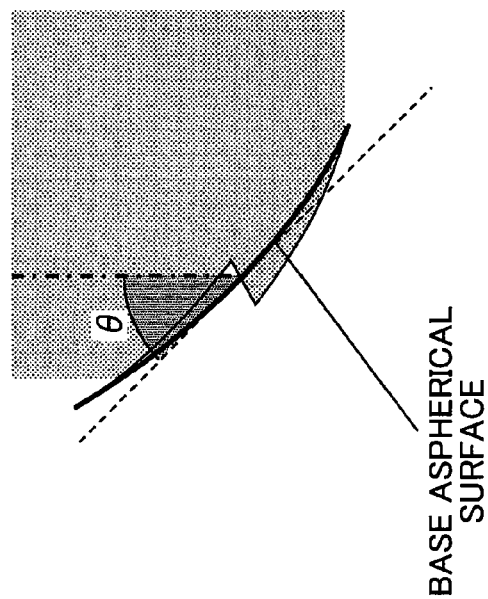
FIG. 6A
FIG. 6B

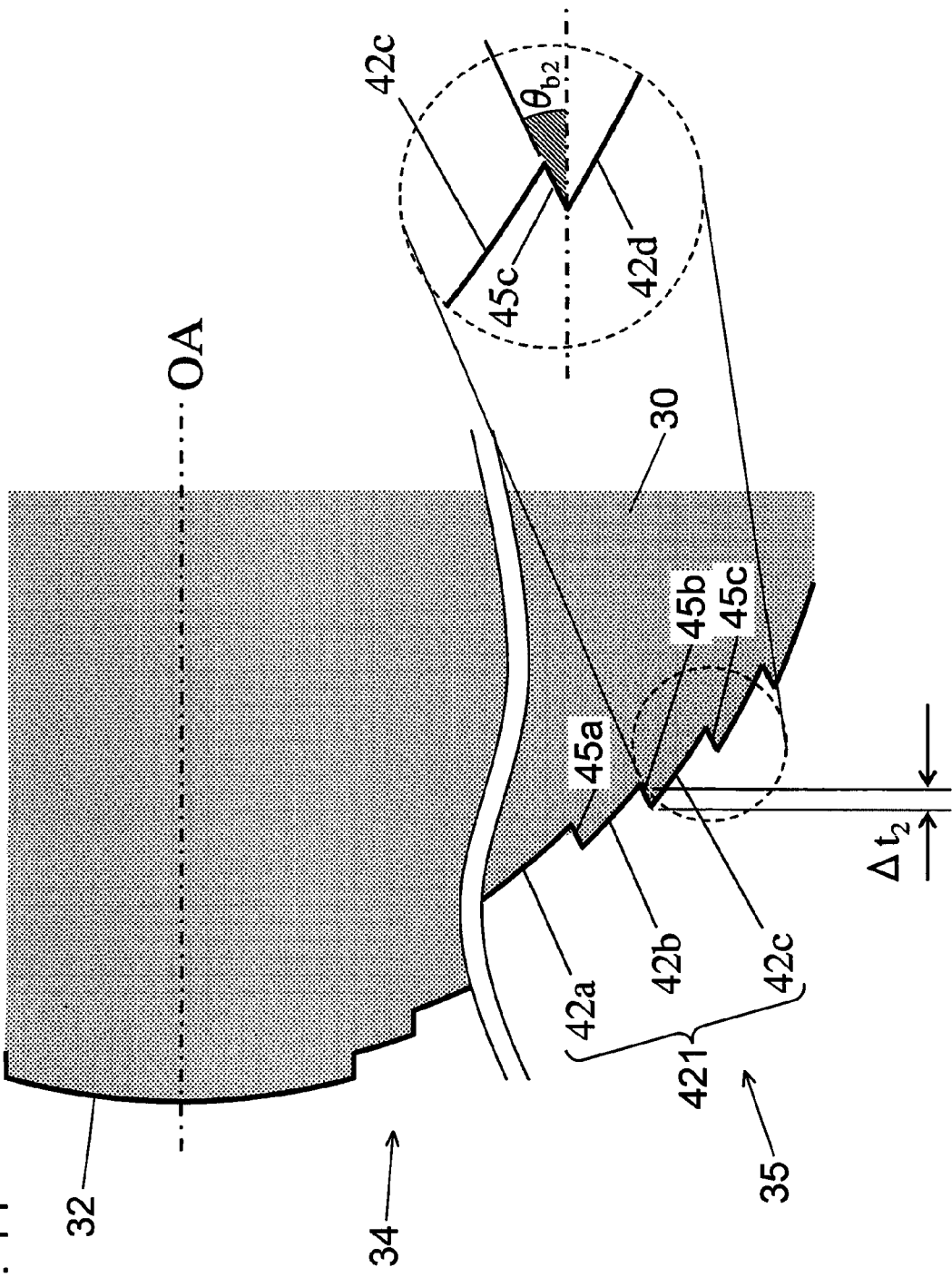

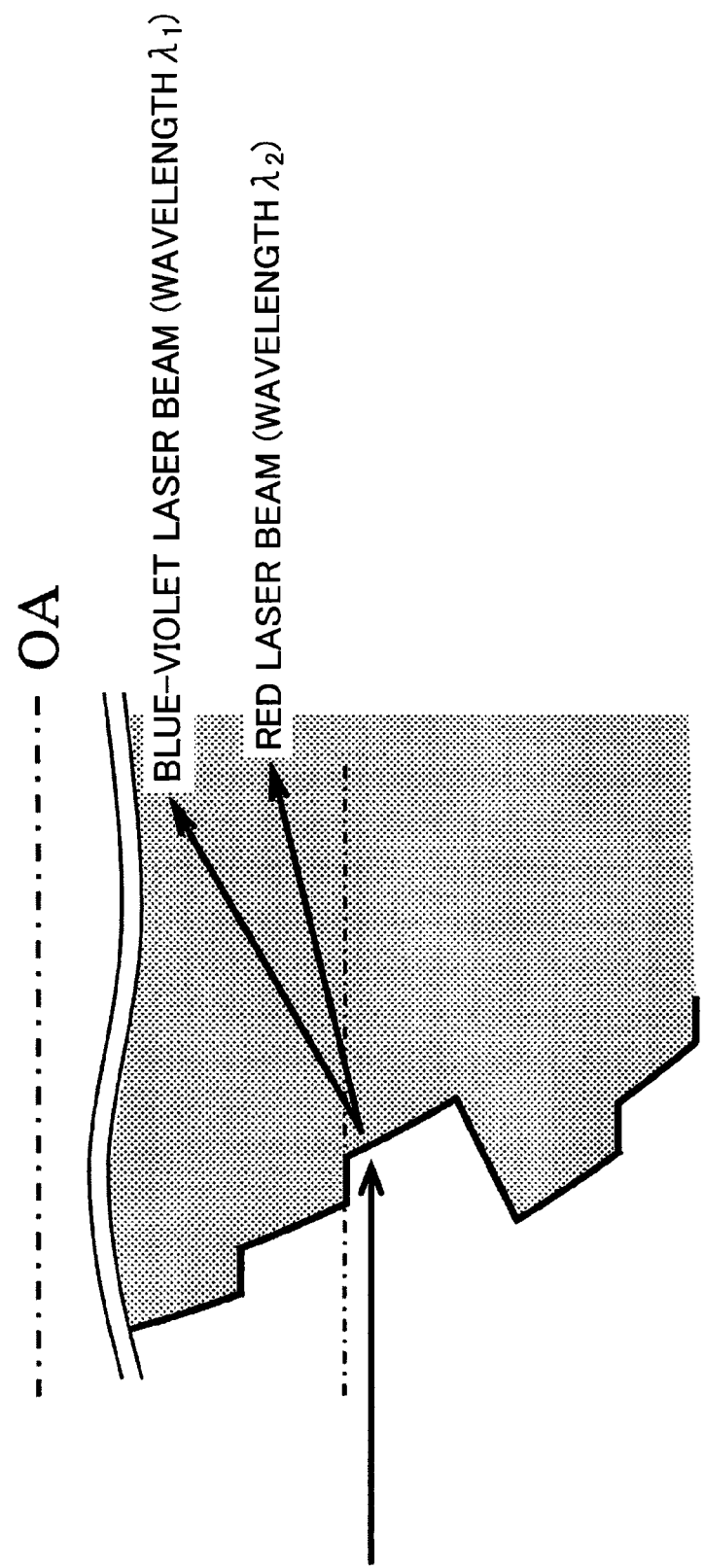

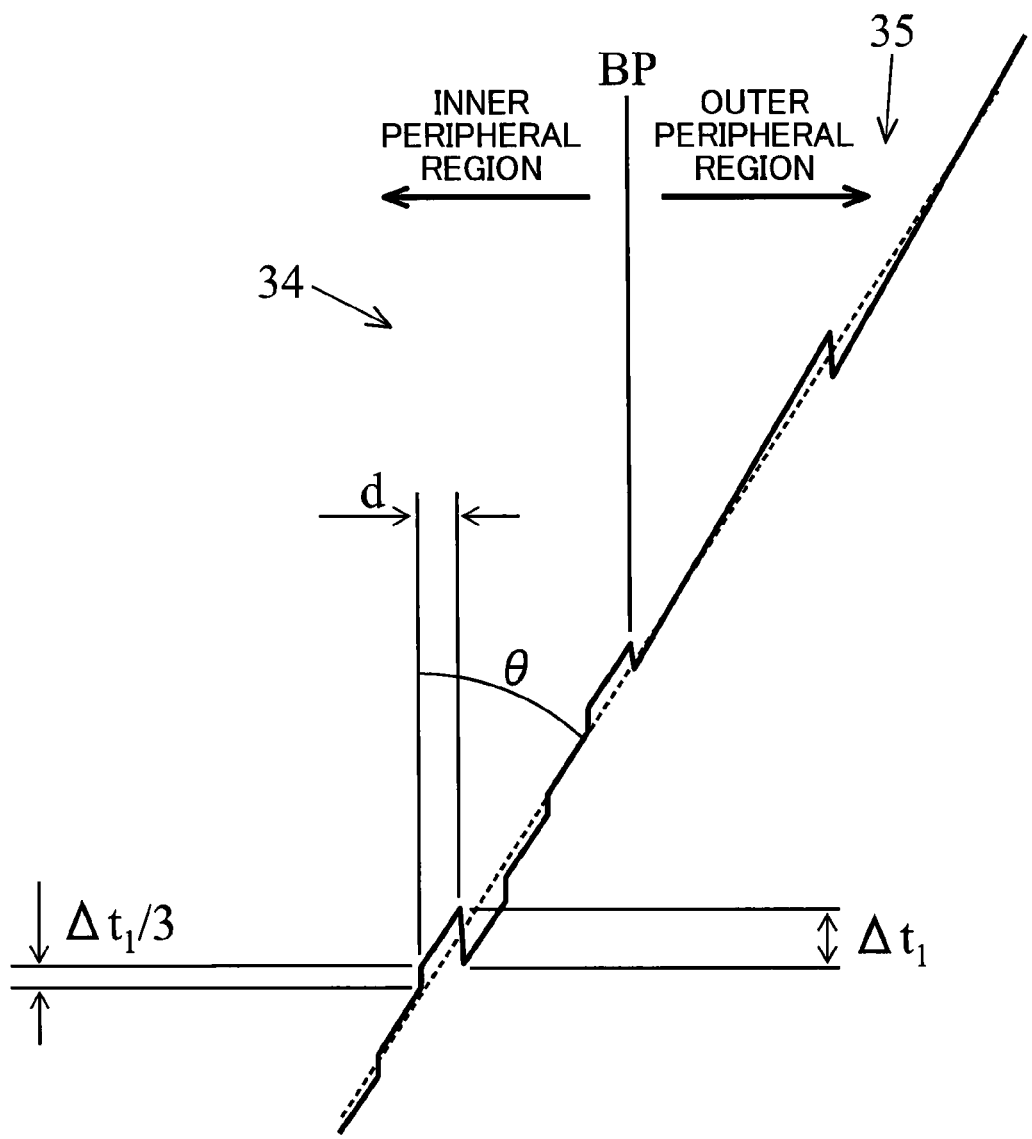

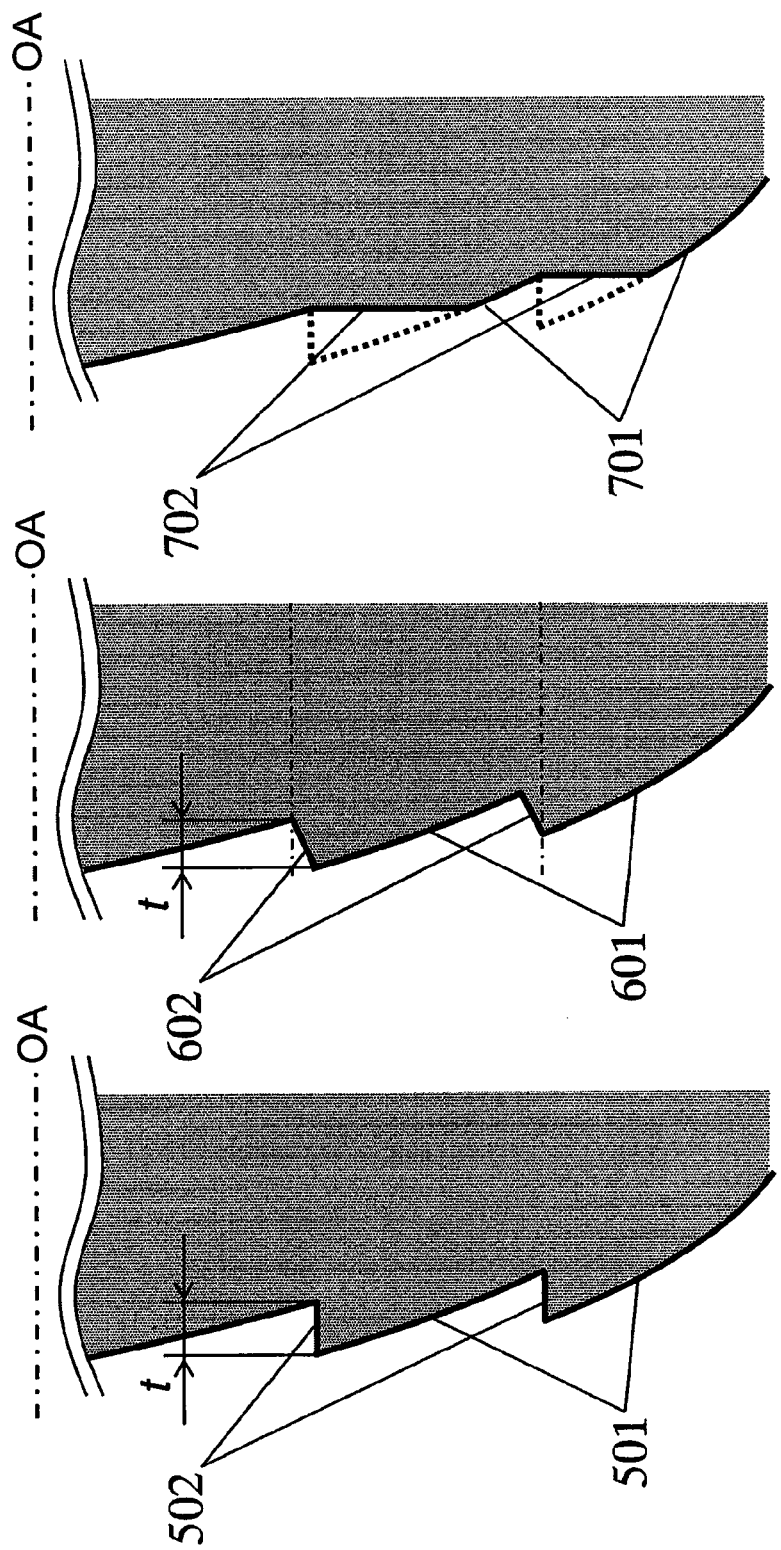

OBJECTIVE LENS, OPTICAL HEAD AND OPTICAL DISK DEVICE

TECHNICAL FIELD

The present invention relates to an objective lens having an optical surface formed of a plurality of partitioned surfaces annularly partitioned centered around an optical axis, an optical head using the objective lens, and an optical disk device using the optical head.

BACKGROUND ART

With the increase in practical application of blue-violet semiconductor lasers, a Blu-ray Disc (hereinafter BD) that is an high-density, large-capacity optical information recording medium (hereinafter, also referred to as an optical disk) with a same size as an CD (Compact Disc) and a DVD (Digital Versatile Disc) is being put to practical use. A BD is an optical disk in which information is recorded onto or reproduced from an information recording surface having a light transmission layer with a thickness of approximately 0.1 mm using a blue-violet laser light source that outputs a laser beam with a wavelength of around 400 nm and an objective lens with a numerical aperture (NA) of approximately 0.85.

Generally, a synthetic resin objective lens is used in an optical head that records information onto or reproduces information from an optical disk such as a CD or a DVD. A synthetic resin objective lens has a smaller specific gravity than a glass objective lens. Therefore, a load on an objective lens actuator that drives the objective lens can be reduced with respect to an axial runout and eccentricity of the optical disk. In addition, an axial runout and eccentricity of the optical disk can be tracked at high speed by the objective lens. Furthermore, since synthetic resin objective lenses can be mass-produced at high accuracy by injection molding, the cost of objective lenses can be lowered.

Therefore, in recent years, more and more synthetic resin objective lenses have been adopted as high NA objective lenses used in BD optical heads.

Meanwhile, a so-called diffraction lens in which are formed a plurality of annular optical surfaces (a diffractive structure) centered around an optical axis is known for its ability to correct defocusing or a spherical aberration of an objective lens which occurs due to a variation in light source wavelength or a variation in a refractive index of synthetic resin caused by a change in temperature.

In addition, many methods are known regarding a so-called compatible objective lens in which a diffractive structure is formed on an objective lens in order to correct, using a difference in light source wavelengths, a spherical aberration that occurs due to a difference in thickness among a plurality of types of base materials used in an optical disk.

FIGS. 22A to 22C are partially enlarged sectional views for describing a conventional synthetic resin objective lens. FIG. 22A is a partially enlarged sectional view for describing a conventional objective lens in a case where a connecting surface is parallel to an optical axis, FIG. 22B is a partially enlarged sectional view for describing a conventional objective lens in a case where the connecting surface is at a predetermined angle relative to the optical axis, and FIG. 22C is a partially enlarged sectional view for describing a conventional objective lens in a case where the connecting surface is perpendicular to the optical axis.

A diffraction lens, in which irregularities on an annular optical surface are minute (in the order of wavelengths), is manufactured by injection molding of a synthetic resin. As shown in FIG. 22A, when a connecting surface 502 for connecting mutually adjacent annular optical surfaces 501 is a cylindrical surface centered around an optical axis OA, a shape of an edge portion is poorly transferred, and depending on a length t of a level difference of the connecting surface 502, a flow of the synthetic resin that is a lens material is blocked and makes it difficult to accurately transfer a mold.

Therefore, with a conventional synthetic resin objective lens described in Patent Literature 1, a connecting surface 602 for connecting mutually adjacent annular optical surfaces 601 is formed by a conical surface as shown in FIG. 22B. In other words, each connecting surface 602 is composed of a part of a conical surface having an optical axis OA of the objective lens as an axis of rotation.

When the connecting surface 602 for connecting mutually adjacent annular optical surfaces 601 is formed by a conical surface as described above, a shape of a level difference of the connecting surface 602 can be transferred more accurately during injection molding of the synthetic resin objective lens in comparison to a case where the connecting surface 502 for connecting mutually adjacent annular optical surfaces 501 is formed by a cylindrical surface as shown in FIG. 22A.

On the other hand, according to Patent Literature 2, a level difference formed on a connecting surface 702 for connecting mutually adjacent annular optical surfaces 701 is formed by a flat surface perpendicular to an optical axis OA as shown in FIG. 22C.

When the connecting surface 702 for connecting mutually adjacent annular optical surfaces 701 is formed by a flat surface perpendicular to the optical axis OA as described above, a shape of the level difference of the connecting surface 702 can be transferred even more accurately during injection molding of the synthetic resin objective lens.

However, with the conventional synthetic resin objective lenses disclosed in Patent Literature 1 and Patent Literature 2, descriptions thereof are limited to a shape of a connecting surface in a case where a cross section of annular optical surfaces centered around an optical axis has an approximately sawtooth shape. Therefore, in Patent Literature 1 and Patent Literature 2, no consideration whatsoever is given to a case where a cross section of annular optical surfaces has an approximately stair shape or to a case where a cross section of annular optical surfaces combines an approximately sawtooth shape and an approximately stair shape. In addition, Patent Literature 1 and Patent Literature 2 make absolutely no mention of an optimal shape of a connecting surface when taking into consideration workability of a mold used for injection molding and a shape of a tool bit (blade) for processing the mold.

Furthermore, with an objective lens with a high numerical aperture such as that used for a BD, an incidence angle of a laser beam or, in other words, an angle formed by a surface perpendicular to an optical axis and a lens surface (a lens inclination angle) increases in a vicinity of an outermost periphery of an active region, and light intensity loss also increases. Therefore, a light intensity loss caused by forming a narrow-pitch diffractive structure on an objective lens surface must also be suppressed. However, in Patent Literature 1 and Patent Literature 2, no quantitative consideration is given to light intensity loss in an objective lens which has a high numerical aperture and has a diffractive structure including annular optical surfaces with a cross section that is an approximately sawtooth shape and/or an approximately stair shape, and no disclosure whatsoever is made on a shape of a connecting surface suitable for an objective lens with a high numerical aperture.

CITATION LIST

Patent Literature

Patent Literature 1: Japanese Patent Application Laid-open No. H7-294707
Patent Literature 2: Japanese Patent Application Laid-open No. 2004-101954

SUMMARY OF INVENTION

The present invention has been made in order to solve the problems described above, and an object thereof is to provide an objective lens, an optical head, and an optical disk device capable of improving diffraction efficiency in a vicinity of an outermost periphery of an active region of an objective lens and suppressing light intensity loss.

An objective lens according to an aspect of the present invention is an objective lens used in an optical head which records information onto or reproduces information from an information recording medium, wherein at least one surface of the objective lens includes an optical surface formed of a plurality of partitioned surfaces including an approximately stair-shaped cross section and annularly partitioned centered around an optical axis of the objective lens, and a plurality of connecting surfaces that connect the plurality of mutually adjacent partitioned surfaces to each other, the plurality of connecting surfaces include a first connecting surface formed of a cylindrical surface centered around the optical axis of the objective lens, a second connecting surface formed of a cylindrical surface centered around the optical axis of the objective lens, and a third connecting surface formed of a conical surface centered around the optical axis of the objective lens, the plurality of partitioned surfaces include a first partitioned surface, a second partitioned surface adjacent to the first partitioned surface, a third partitioned surface adjacent to the second partitioned surface, and a fourth partitioned surface adjacent to the third partitioned surface, the first partitioned surface is closer to the optical axis of the objective lens than the second partitioned surface, the second partitioned surface is closer to the optical axis of the objective lens than the third partitioned surface, the third partitioned surface is closer to the optical axis of the objective lens than the fourth partitioned surface, when a plane in contact with the optical surface at an intersection of the optical surface and the optical axis of the objective lens is assumed as a reference plane, an interval between the second partitioned surface and the reference plane is greater than an interval between the first partitioned surface and the reference plane, an interval between the third partitioned surface and the reference plane is greater than the interval between the second partitioned surface and the reference plane, an interval between the fourth partitioned surface and the reference plane is smaller than the interval between the third partitioned surface and the reference plane, the first connecting surface connects the first partitioned surface and the second partitioned surface, the second connecting surface connects the second partitioned surface and the third partitioned surface, and the third connecting surface connects the third partitioned surface and the fourth partitioned surface.

According to this configuration, at least one surface of the objective lens includes an optical surface formed of a plurality of partitioned surfaces including an approximately stair-shaped cross section and annularly partitioned centered around an optical axis of the objective lens, and a plurality of connecting surfaces that connect the plurality of mutually adjacent partitioned surfaces to each other. The plurality of connecting surfaces include a first connecting surface formed of a cylindrical surface centered around the optical axis of the objective lens, a second connecting surface formed of a cylindrical surface centered around the optical axis of the objective lens, and a third connecting surface formed of a conical surface centered around the optical axis of the objective lens. The plurality of partitioned surfaces include a first partitioned surface, a second partitioned surface adjacent to the first partitioned surface, a third partitioned surface adjacent to the second partitioned surface, and a fourth partitioned surface adjacent to the third partitioned surface. The first partitioned surface is closer to the optical axis of the objective lens than the second partitioned surface, the second partitioned surface is closer to the optical axis of the objective lens than the third partitioned surface, and the third partitioned surface is closer to the optical axis of the objective lens than the fourth partitioned surface. A flat surface in contact with the optical surface at an intersection of the optical surface and the optical axis of the objective lens is now assumed as a reference plane. An interval between the second partitioned surface and the reference plane is greater than an interval between the first partitioned surface and the reference plane, an interval between the third partitioned surface and the reference plane is greater than the interval between the second partitioned surface and the reference plane, and an interval between the fourth partitioned surface and the reference plane is smaller than the interval between the third partitioned surface and the reference plane. The first connecting surface connects the first partitioned surface and the second partitioned surface, the second connecting surface connects the second partitioned surface and the third partitioned surface, and the third connecting surface connects the third partitioned surface and the fourth partitioned surface.

According to the present invention, since the third partitioned surface and the fourth partitioned surface are connected by the third connecting surface formed of a conical surface centered around the optical axis of the objective lens and a light path is not blocked when a light beam incident in a vicinity of an outermost periphery of an active region of the objective lens is refracted and diffracted by the lens surface, diffraction efficiency in the vicinity of the outermost periphery of the active region of the objective lens can be improved and light intensity loss can be suppressed.

This and other objects, features, and advantages of the present invention will become more apparent as the following detailed description is read with reference to the accompanying drawings.

BRIEF DESCRIPTION OF DRAWINGS

FIG. 5A is a diagram showing a shape of a mold used when producing a synthetic resin objective lens according to the first embodiment of the present invention by injection molding, and FIG. 5B is a diagram for describing processing of a mold of an objective lens according to the first embodiment of the present invention.

FIG. 6A is a diagram showing a lens inclination angle of a base aspherical surface, and FIG. 6B is a diagram showing a lens inclination angle of an actual lens surface due to a diffractive structure.

FIG. 14 is a partially enlarged sectional view showing an outer peripheral region of an objective lens according to the third embodiment of the present invention.

FIG. 15 is a diagram for describing an interval of a cylindrical connecting surface and an interval of a conical connecting surface in the inner peripheral region according to the third embodiment of the present invention.

FIG. 16 is a diagram showing an actual shape of a boundary portion between an inner peripheral region and an outer peripheral region of an objective lens according to the third embodiment of the present invention.

FIG. 22A is a partially enlarged sectional view for describing a conventional objective lens in a case where a connecting surface is parallel to an optical axis, FIG. 22B is a partially enlarged sectional view for describing a conventional objective lens in a case where the connecting surface is at a predetermined angle relative to the optical axis, and FIG. 22C is a partially enlarged sectional view for describing a conventional objective lens in a case where the connecting surface is perpendicular to the optical axis.

DESCRIPTION OF EMBODIMENTS

Embodiments of the present invention will now be described with reference to the drawings. The following embodiments are merely examples of implementation of the present invention and should not be construed as limiting the technical scope of the present invention.

First Embodiment

Figure 1:
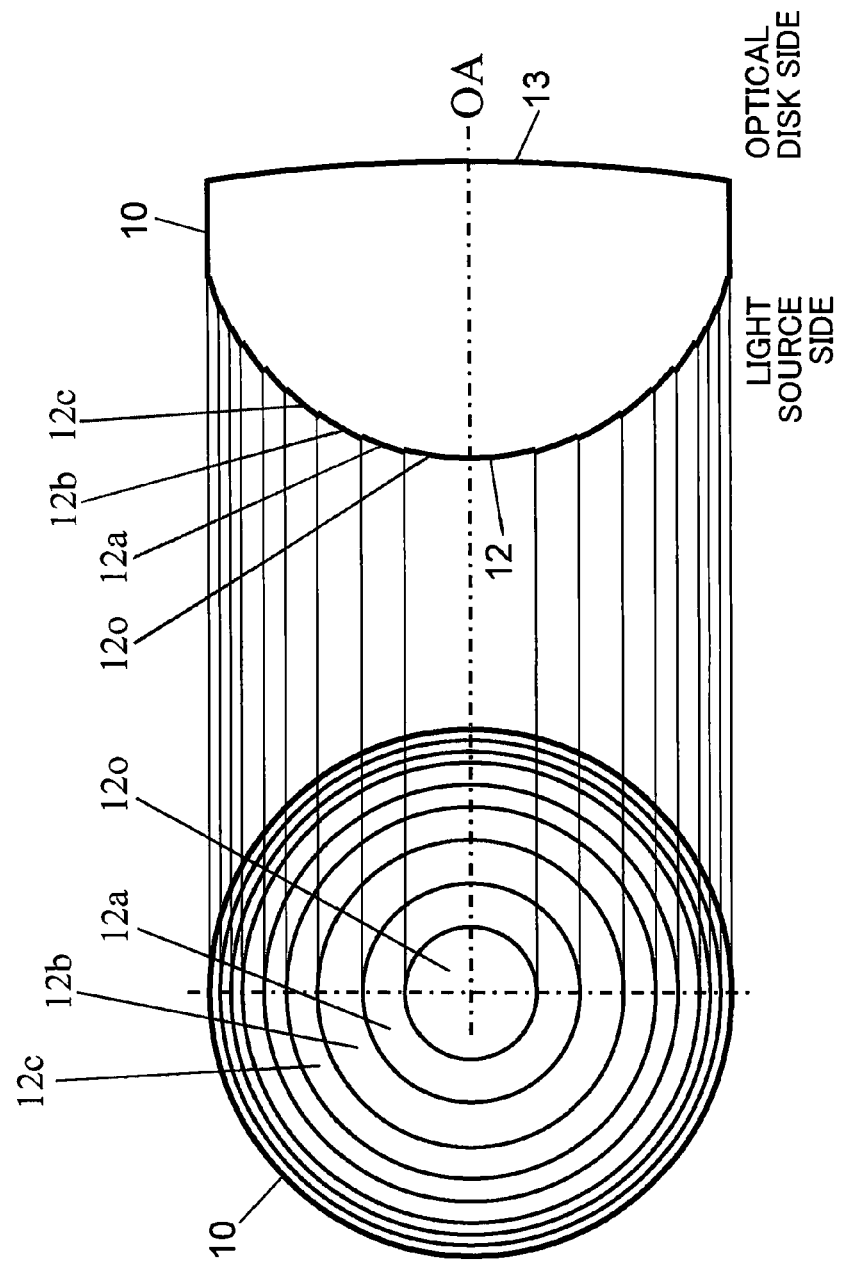
FIG. 1 is a diagram showing a configuration of an objective lens according to a first embodiment of the present invention.

FIG. 1 is a diagram showing a configuration of an objective lens according to a first embodiment of the present invention. A left-hand side diagram in FIG. 1 is a plan view showing a configuration of a synthetic resin objective lens 10 according to the present first embodiment, and a right-hand side diagram in FIG. 1 is a sectional view showing a configuration of the objective lens 10. A lens surface 12 on a light source side (an incidence side of a laser beam) of the objective lens 10 comprises a spherical surface or an aspherical surface that constitutes a base. A sawtooth-shaped diffractive structure having a plurality of annular optical surfaces centered around an optical axis OA of the objective lens 10 is formed on the spherical surface or the aspherical surface that constitutes a base (hereinafter, collectively referred to as a base aspherical surface).

Meanwhile, a lens surface 13 on an optical disk side (an exit side of a laser beam) of the objective lens 10 which opposes the lens surface 12 is configured as a spherical surface or an aspherical surface.

Figure 2:
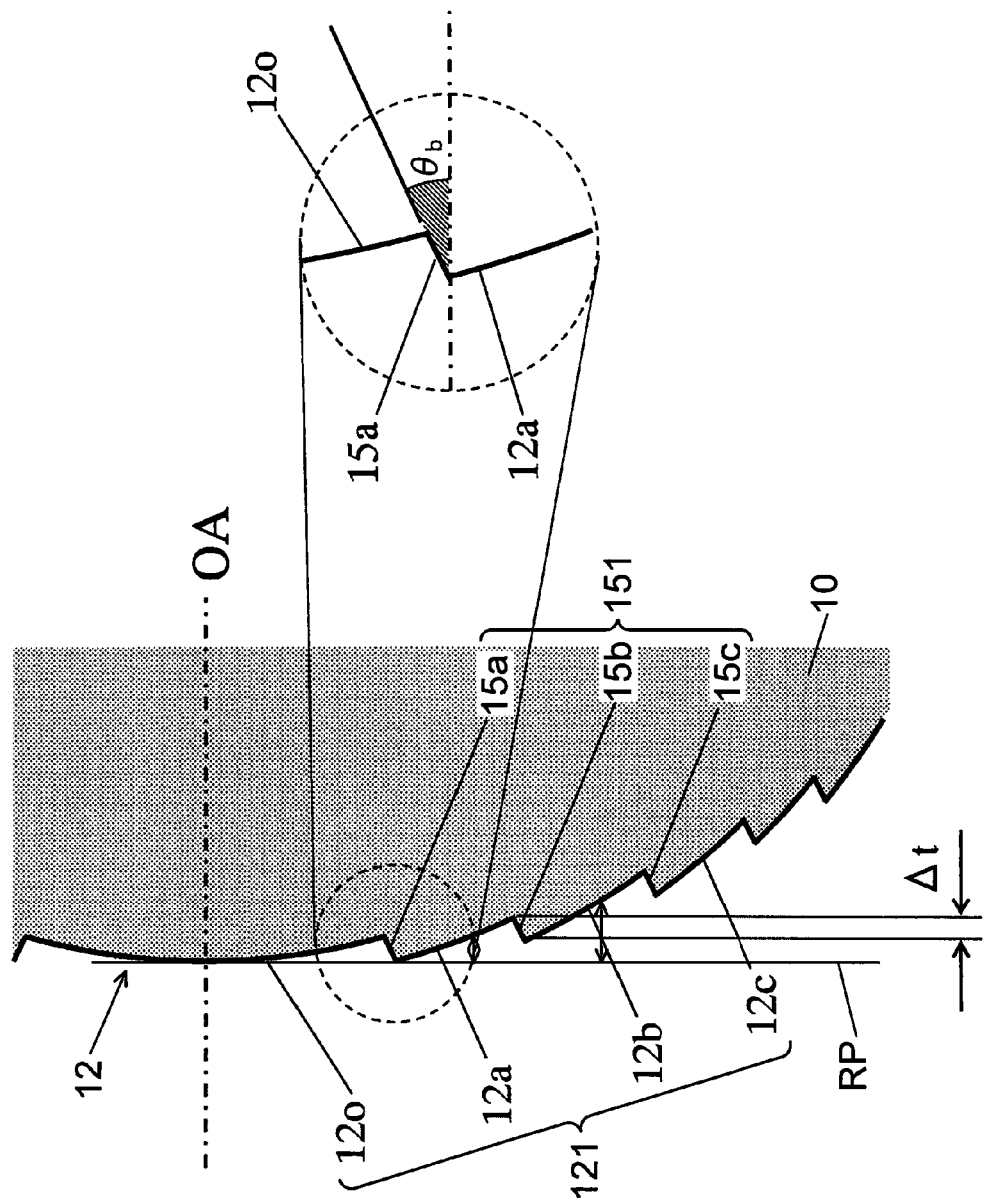
FIG. 2 is a partially enlarged sectional view showing a vicinity of an optical axis of a lens surface of an objective lens according to the first embodiment of the present invention.

FIG. 2 is a partially enlarged sectional view showing a vicinity of the optical axis OA of the lens surface 12 of the objective lens 10 according to the present first embodiment.

The diffractive structure formed on the base aspherical surface of the lens surface 12 comprises a circular optical surface 12o centered around the optical axis OA, and a plurality of concentric annular optical surfaces 12a, 12b, 12c, . . . provided on an outer side of the circular optical surface 12o. In addition, the circular optical surface 12o and the annular optical surface 12a are connected by an annular connecting surface 15a, and the annular optical surfaces 12a, 12b, . . . and the annular optical surfaces 12b, 12c, . . . adjacent to the annular optical surfaces 12a, 12b, . . . are connected by annular connecting surfaces 15b, 15c, . . . .

The objective lens 10 has a numerical aperture of 0.8 or higher and is made of a synthetic resin. The numerical aperture is favorably 0.8 or higher and 0.9 or lower.

The lens surface 12 has an optical surface 121 comprising the circular optical surface 12o which is centered around the optical axis OA and which has a circular shape and a plurality of annular optical surfaces 12a, 12b, 12c, . . . which have approximately sawtooth-shaped cross sections and which are annularly partitioned centered around the optical axis OA of the objective lens 10, and the connecting surfaces 15a, 15b, 15c, . . . which connect the plurality of mutually adjacent annular optical surfaces to each other and which are composed of conical surfaces centered around the optical axis OA of the objective lens 10. Moreover, in the present invention, the term "sawtooth shape" is to include an approximately sawtooth shape that is similar to a sawtooth shape.

The plurality of annular optical surfaces include at least the annular optical surface 12a and the annular optical surface 12b that is adjacent to the annular optical surface 12a. The annular optical surface 12a is closer to the optical axis OA of the objective lens 10 than the annular optical surface 12b.

Now, a flat surface in contact with the optical surface 121 at an intersection of the optical surface 121 and the optical axis OA of the objective lens 10 is assumed as a reference plane RP. An interval between the annular optical surface 12b and the reference plane RP is greater than an interval between the annular optical surface 12a and the reference plane RP.

Moreover, in the present first embodiment, while an interval between each annular optical surface and the reference plane represents, for example, an interval from a midpoint of a length of each annular optical surface in a radial direction to the reference plane, the present invention is not limited thereto. For example, an interval between each annular optical surface and the reference plane may represent an interval between a point closest to the reference plane on each annular optical surface and the reference plane.

The connecting surface 15b connects the annular optical surface 12a and the annular optical surface 12b.

The circular optical surface 12o and the annular optical surfaces 12a, 12b, 12c, . . . themselves which form the diffractive structure are optical surfaces composed of a spherical surface or an aspherical surface. The cross section of the lens surface 12 of the objective lens has an approximately sawtooth shape as shown in FIG. 2. An interval Δt of a level difference of the sawtooth shape is determined so that, for example, a maximum diffraction efficiency is reached at a predetermined reference wavelength λ [μm].

The connecting surface 15a connects the circular optical surface 12o on an inner side of the connecting surface 15a and the annular optical surface 12a on an outer side of the connecting surface 15a. The connecting surfaces 15b, 15c, . . . connect the annular optical surfaces 12a, 12b, . . . on an inner side of the connecting surfaces 15b, 15c, . . . and the annular optical surfaces 12b, 12c, . . . on an outer side of the connecting surfaces 15b, 15c, . . . . The connecting surfaces 15a, 15b, 15c, . . . all form a predetermined angle $\theta_b$ with the optical axis OA of the objective lens 10.

Figure 3:
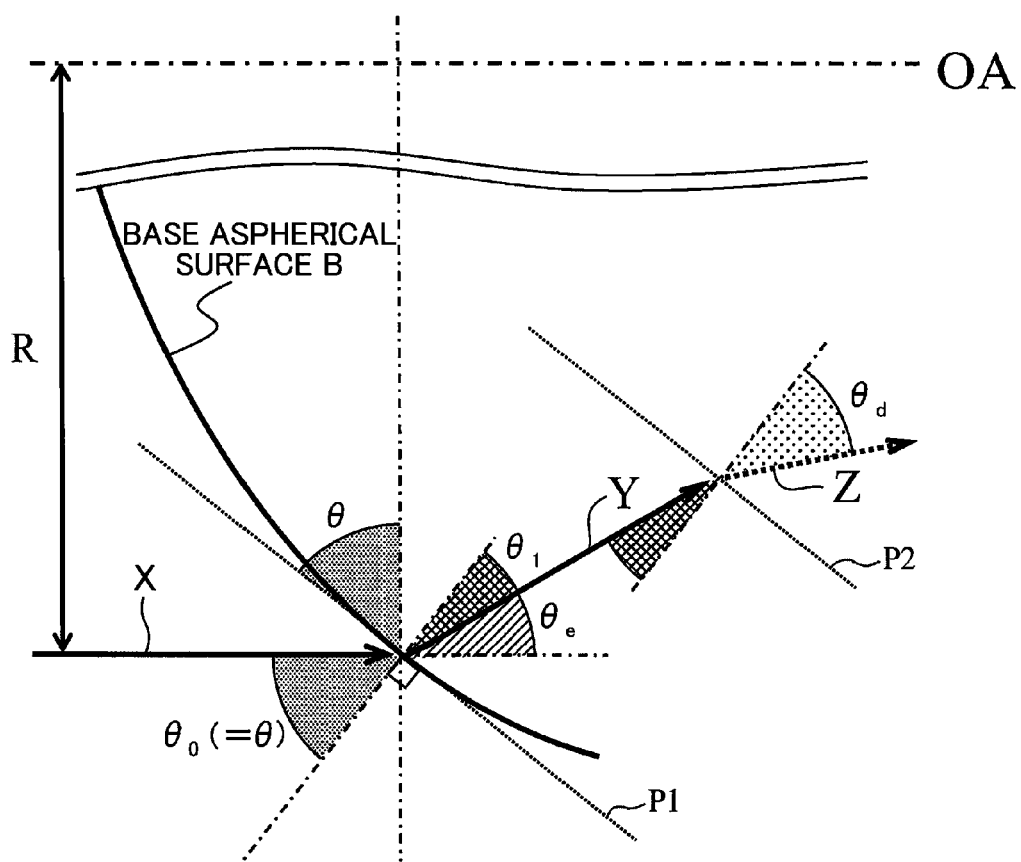
FIG. 3 is a diagram for describing a behavior of a light beam incident on an objective lens comprising a diffractive structure.

FIG. 3 is a diagram for describing a behavior of a light beam incident on an objective lens comprising a diffractive structure. A case of an objective lens will now be considered in which, as shown in FIG. 3, a light beam X that is parallel to the optical axis OA is incident on a position of a radius R.

If the light beam X incident on a position of the radius R is refracted and diffracted by the lens surface and becomes a light beam Y, then an angle $\theta_e$ formed by the optical axis OA and the light beam Y can be obtained as follows.

As shown in FIG. 3, if a base aspherical surface B represents the lens surface into which the light beam X enters and θ denotes an inclination angle (an angle formed with a surface perpendicular to the optical axis OA) of the base aspherical surface B at the radius R, then an incidence angle $\theta_o$ of the light beam X parallel to the optical axis OA is expressed as $\theta_o = \theta$.

Now, when the light beam X is incident at the radius R to a virtual plane P1 that is in contact with the base aspherical surface B at an incidence angle $\theta_o$ (=θ), a pitch d [μm] at the radius R of the diffractive structure formed on the base aspherical surface B, a reference wavelength λ [μm] of the incident light beam, a diffraction order m (where m is an integer) at which diffraction efficiency reaches minimum at the reference wavelength λ, and a virtual emergence angle $\theta_d$ of a light beam Z outputted from a virtual plane P2 that is parallel to the virtual plane P1 can be expressed by Expression (1) below.

$$d(\sin\theta \pm \sin\theta_d) = m\lambda \tag{1}$$

If the diffractive structure has a power of a convex lens, then Expression (1) above becomes Expression (2) below.

$$d(\sin\theta - \sin\theta_d) = m\lambda \tag{2}$$

Modifying Expression (2) above produces Expression (3) below.

$$\sin\theta_d = \sin\theta - m\lambda/d \tag{3}$$

On the other hand, when a parallel plate with a refractive index n and comprising the virtual plane P1 and the virtual plane P2 is assumed, according to Snell's law, an emergence angle $\theta_1$ of the light beam Y outputted from the virtual plane P1 and incident on the virtual plane P2 and a virtual emergence angle $\theta_d$ of the light beam Z outputted from the virtual plane P2 satisfy Expression (4) below.

$$\sin\theta_d = n \cdot \sin\theta_1 \tag{4}$$

Consequently, from Expression (3) and Expression (4), we get Expression (5) below.

$$n \cdot \sin\theta_1 = \sin\theta - m\lambda/d \tag{5}$$

The emergence angle $\theta_1$ may be expressed by Expression (6) below.

$$\theta_1 = \sin^{-1}\left(\frac{(\sin\theta - m\lambda/d)}{n}\right) \tag{6}$$

As shown in FIG. 3, the angle $\theta_e$ formed by the light beam Y resulting from the refraction and diffraction by the lens surface of the light beam X incident parallel to the optical axis OA and the optical axis OA can obviously be expressed by Expression (7) below.

$$\theta_e = \theta - \theta_1 \tag{7}$$

Therefore, the angle $\theta_e$ may be expressed by Expression (8) below.

$$\theta_e = \theta - \sin^{-1}\left(\frac{(\sin\theta - m\lambda/d)}{n}\right) \tag{8}$$

Generally, with objective lenses with a high numerical aperture (for example, a numerical aperture of 0.8 or higher) which are used for high-density optical disks such as a BD, a lens inclination angle in a vicinity of an outermost periphery of an active region becomes significantly large. In particular, with a synthetic resin objective lens that has a smaller refractive index than a glass objective lens, the lens inclination angle in the vicinity of an outermost periphery reaches about 60 deg, and light intensity loss due to surface reflection is not insignificant even when an antireflection coat (AR coat) is deposited on the surface.

Furthermore, in many objective lenses in which a diffractive structure is formed on a lens surface, a pitch becomes smaller the further toward the outer periphery, in which case light intensity loss (a decline in diffraction efficiency) due to the reduction in pitch is also not negligible.

In other words, with a synthetic resin objective lens having a high numerical aperture (for example a numerical aperture or 0.8 or higher) and comprising a diffractive structure, light intensity loss in the vicinity of an outermost periphery reaches maximum in an active region.

Figure 4A:
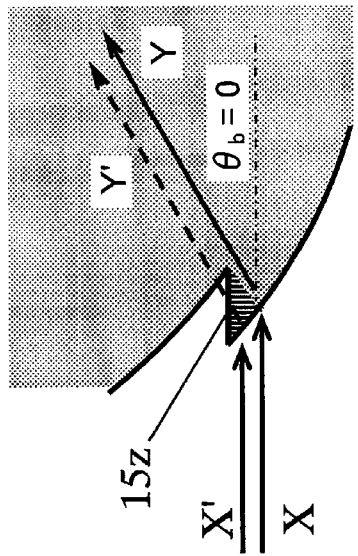
FIG. 4A is a diagram showing a relationship between an angle of a connecting surface and light intensity loss when an angle $\theta_b$ is equal to an angle $\theta_e$.
Figure 4B:
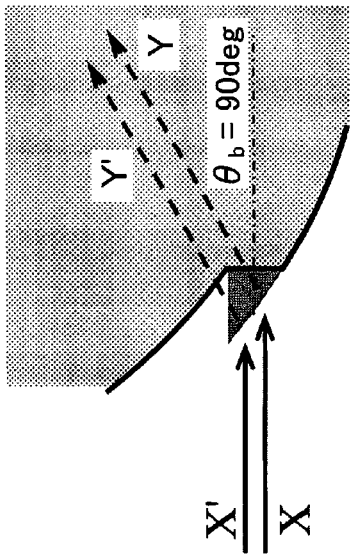
FIG. 4B is a diagram showing a relationship between an angle of a connecting surface and light intensity loss when the angle $\theta_b$ is 0.
Figure 4C:
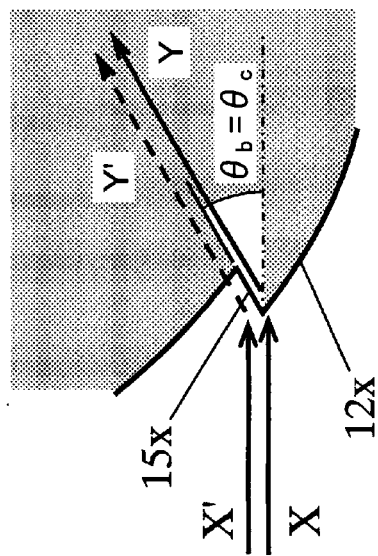
FIG. 4C is a diagram showing a relationship between an angle of a connecting surface and light intensity loss when the angle $\theta_b$ is greater than the angle $\theta_e$.
Figure 4D:
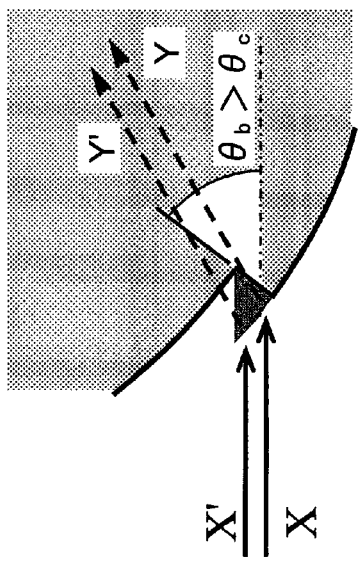
FIG. 4D is a diagram showing a relationship between an angle of a connecting surface and light intensity loss when the angle $\theta_b$ is 90 degrees.

FIGS. 4A to 4D are diagrams showing a relationship between an angle of a connecting surface that connects adjacent annular optical surfaces and light intensity loss according to the first embodiment of the present invention. FIG. 4A is a diagram showing a relationship between an angle of a connecting surface and light intensity loss when an angle $\theta_b$ is equal to an angle $\theta_e$, FIG. 4B is a diagram showing a relationship between an angle of a connecting surface and light intensity loss when the angle $\theta_b$ is 0, FIG. 4C is a diagram showing a relationship between an angle of a connecting surface and light intensity loss when the angle $\theta_b$ is greater than the angle $\theta_e$, and FIG. 4D is a diagram showing a relationship between an angle of a connecting surface and light intensity loss when the angle $\theta_b$ is 90 degrees.

Here, as shown in FIG. 4A, if an angle $\theta_b$ formed by a connecting surface that connects adjacent annular optical surfaces (for example, a connecting surface 15x) and the optical axis OA is equal to the angle $\theta_e$ obtained by Expression (8) above ($\theta_b=\theta_e$), then a light path of a light beam Y resulting from the refraction and diffraction by the lens surface of a light beam X incident on an annular optical surface adjacent on the side of the outer periphery (for example, an annular optical surface 12x) is not blocked.

In addition, as shown in FIG. 4B, when a connecting surface 15z is parallel to the optical axis OA or, in other words, when the angle $\theta_b$ is 0 ($\theta_b=0$), a light path of a light beam Y' resulting from the refraction and diffraction by the lens surface 12 of a light beam X' on a side of the inner periphery relative to the light beam X is blocked. In other words, between a configuration of a connecting surface shape shown in FIG. 4A in which $\theta_b=\theta_e$ and a configuration of a connecting surface shape shown in FIG. 4B in which $\theta_b=0$, light intensity loss or, in other words, a decline in diffraction efficiency is substantially the same. Furthermore, it is obvious that light intensity loss or, in other words, a decline in diffraction efficiency is the same in a range expressed as $0<\theta_b\leq\theta_e$.

More specifically, an angle $\theta_b$ [deg] formed by a connecting surface and the optical axis OA of the objective lens 10 satisfies Expression (9) below.

$$0 < \theta_b \leq \theta - \sin^{-1}\left(\frac{(\sin\theta - m\lambda_1/d)}{n}\right) \quad (9)$$

In Expression (9), $\lambda_1$ [µm] denotes a light source wavelength of a laser beam incident on the objective lens 10, n denotes a refractive index of the objective lens 10 at the wavelength $\lambda_1$, $\theta$ [deg] denotes a lens inclination angle of a base aspherical surface at an outermost periphery of an active region of the objective lens 10, d [µm] denotes a pitch of one period of the diffractive structure in a direction perpendicular to the optical axis OA, and m denotes a diffraction order of diffracted light that is a main component of the laser beam with the wavelength $\lambda_1$ that is generated by the diffractive structure.

On the other hand, a light path of the light beam Y resulting from the refraction and diffraction by the lens surface of the light beam X is blocked when an angle $\theta_b$ formed by a connecting surface that connects adjacent annular optical surfaces and the optical axis is greater than the angle $\theta_e$ ($\theta_b>\theta_e$) or when the angle $\theta_b$ formed by the connecting surface and the optical axis is 90 degrees ($\theta_b=90$ deg) as shown in FIG. 4C or FIG. 4D. Therefore, compared to the configuration shown in FIG. 4A or FIG. 4B, light intensity loss or, in other words, a decline in diffraction efficiency occurs with the configuration shown in FIG. 4C or FIG. 4D.

With the synthetic resin objective lens 10 according to the present first embodiment, if a reference wavelength $\lambda$ of the used light source is set to 0.405 [µm], a refractive index n of the synthetic resin at the wavelength $\lambda$ is set to 1.52, a lens inclination angle $\theta$ of the base aspherical surface at an effective radius Re [mm] is set to 60 [deg], a pitch d of the diffractive structure is set to 10 [µm], and a diffraction order m at which diffraction efficiency reaches maximum at the wavelength $\lambda$ is set to +1, then the angle $\theta_e$ is obtained as 27.1 [deg] using Expression (8) above.

FIG. 5A is a diagram showing a shape of a mold used when producing a synthetic resin objective lens according to the first embodiment of the present invention by injection molding, and FIG. 5B is a diagram for describing processing of a mold of an objective lens according to the first embodiment of the present invention.

The connecting surfaces 15a, 15b, 15c, ... of the objective lens 10 according to the present first embodiment shown in FIG. 2 have an angle $\theta_b$ ($\theta_b=\theta_e$) of 27.1 [deg] with respect to the optical axis OA of the objective lens 10. As shown in FIG. 5A, in a mold 17 used when mass-producing the objective lens 10 by injection molding, machining surfaces 17a, 17b, 17c, ... which correspond to the connecting surfaces 15a, 15b, 15c, ... have an angle $\theta_b$ with respect to the optical axis OA. Therefore, as shown in FIG. 5B, by setting a blade edge angle $\theta_k$ of a tool bit (blade) 19 that processes the mold 17 to 27.1 [deg] that is equivalent to the angle $\theta_b$, the machining surfaces 17a, 17b, 17c, ... of the mold 17 can be readily processed. In addition, since a tip of the tool bit 19 does not become excessively narrow, chipping of the tip of the tool bit during mold processing can be suppressed.

In addition, the connecting surfaces 15a, 15b, 15c, ... of the objective lens 10 are composed of a part of a conical surface having the optical axis OA of the objective lens 10 as an axis of rotation. Therefore, an objective lens can be obtained which has a lower likelihood of a transfer failure occurring on the circular optical surface 120, the annular optical surfaces 12a, 12b, 12c, ..., and the connecting surfaces 15a, 15b, 15c, ... during injection molding, which has improved mold releasability, and which has favorable aberration performance.

Furthermore, in order to prevent a light path from being blocked when an incident light beam is refracted and diffracted by a lens surface in a vicinity of an outermost periphery corresponding to a position of an effective radius Re [mm], the angle $\theta_b$ between the connecting surfaces 15a, 15b, 15c, ... and the optical axis OA is set to 27.1 [deg] that is equal to the angle $\theta_e$. Therefore, compared to a case where the connecting surface is composed of a part of a cylindrical surface having the optical axis OA as an axis of rotation, light intensity loss does not substantially occur. As a result, a favorable objective lens can be obtained in which a decline in diffraction efficiency is reduced in a vicinity of an outermost periphery where light intensity loss reaches maximum.

According to the configuration of the present first embodiment described above, in a diffractive structure formed on a base aspherical surface of an objective lens, an angle $\theta_b$ formed between an annular connecting surface that connects adjacent annular optical surfaces to each other and an optical axis of the objective lens is equal to an angle $\theta_e$ formed between a light beam resulting from the refraction and diffraction by a lens surface of a light beam incident parallel to the optical axis and the optical axis, whereby the angle $\theta_e$ is expressed by Expression (8) above.

Accordingly, a favorable objective lens can be obtained in which a decline in diffraction efficiency is reduced in a vicinity of an outermost periphery where light intensity loss reaches maximum.

In addition, processing of a mold used for injection molding is facilitated, and chipping of a tip of a tool bit during mold processing can be suppressed. Furthermore, since transferability and mold releasability during injection molding also improve, an objective lens with favorable aberration performance can be obtained.

Moreover, while a case where $\theta_b = \theta_e$ has been described for the objective lens 10 according to the present first embodiment, in a range where $0 < \theta_b \leq \theta_e$, a favorable objective lens can be obtained in which a decline in diffraction efficiency is reduced in a vicinity of an outermost periphery where light intensity loss substantially reaches maximum. Since an excessively fine tip of the tool bit used to process a mold creates a risk of chipping of the tip of the tool bit during mold processing, the angle $\theta_b$ is favorably set to 20 [deg] or more.

From the above, in consideration of transferability, mold releasability, mold workability, and the like during injection molding, the angle $\theta_b$ formed between an annular connecting surface and the optical axis of the objective lens may be varied as appropriate within a range of $0 < \theta_b \leq \theta_e$, and more favorably, within a range of 20 [deg] $\leq \theta_b \leq \theta_e$.

Moreover, as shown in FIG. 6A and FIG. 6B, a lens inclination angle $\theta_r$ of an actual optical surface due to a diffractive structure formed on a base aspherical surface differs from a lens inclination angle $\theta$ of the base aspherical surface. FIG. 6A is a diagram showing a lens inclination angle of a base aspherical surface, and FIG. 6B is a diagram showing a lens inclination angle of an actual lens surface due to a diffractive structure.

Here, when an interval $\Delta t$ of level differences shown in FIG. 6B is formed so as to produce a phase difference that is an integral multiple of a wavelength $\lambda$ so that diffraction efficiency reaches maximum, according to Snell's law, an emergence angle of a light beam Y resulting from the refraction and diffraction of a light beam X by the diffractive structure formed on the base aspherical surface (the emergence angle $\theta_1$ shown in FIG. 3) is equal to a lens inclination angle $\theta_r$ in a case where the light beam X is refracted by the actual optical surface due to the diffractive structure.

In other words, the lens inclination angle $\theta_r$ may be expressed by Expression (10) below.

$$\sin\theta_r = n \cdot \sin\theta_1 \tag{10}$$

Therefore, the emergence angle $\theta_1$ may be expressed by Expression (11) below.

$$\theta_1 = \sin^{-1}\left(\frac{\sin\theta_r}{n}\right) \tag{11}$$

Here, as shown in FIG. 3, the angle $\theta_c$ may obviously be expressed by Expression (12) below.

$$\theta_e = \theta_r - \theta_1 \tag{12}$$

Therefore, the angle $\theta_e$ may be expressed by Expression (13) below.

$$\theta_e = \theta_r - \sin^{-1}\left(\frac{\sin\theta_r}{n}\right) \tag{13}$$

Consequently, Expression (13) above which uses the lens inclination angle $\theta_r$ of the actual optical surface due to the diffractive structure can be applied in place of Expression (8) above.

In other words, the angle $\theta_b$ [deg] formed by a conical connecting surface and the optical axis OA of the objective lens 10 may satisfy Expression (14) below.

$$0 < \theta_b \leq \theta_r - \sin^{-1}\left(\frac{\sin\theta_r}{n}\right) \tag{14}$$

In Expression (14), $\theta_r$ [deg] denotes a lens inclination angle of an annular optical surface at an outermost periphery of an active region of the objective lens 10, and n denotes a refractive index of the objective lens 10 at a light source wavelength of a laser beam incident on the objective lens 10.

Moreover, while a diffractive structure is formed only on the lens surface 12 into which a laser beam enters in the present first embodiment, the present invention is not particularly limited thereto and diffractive structures may be formed on both the lens surface 12 and the spherical surface 13. This also applies to the objective lenses according to other embodiments.

Second Embodiment

Figure 7:
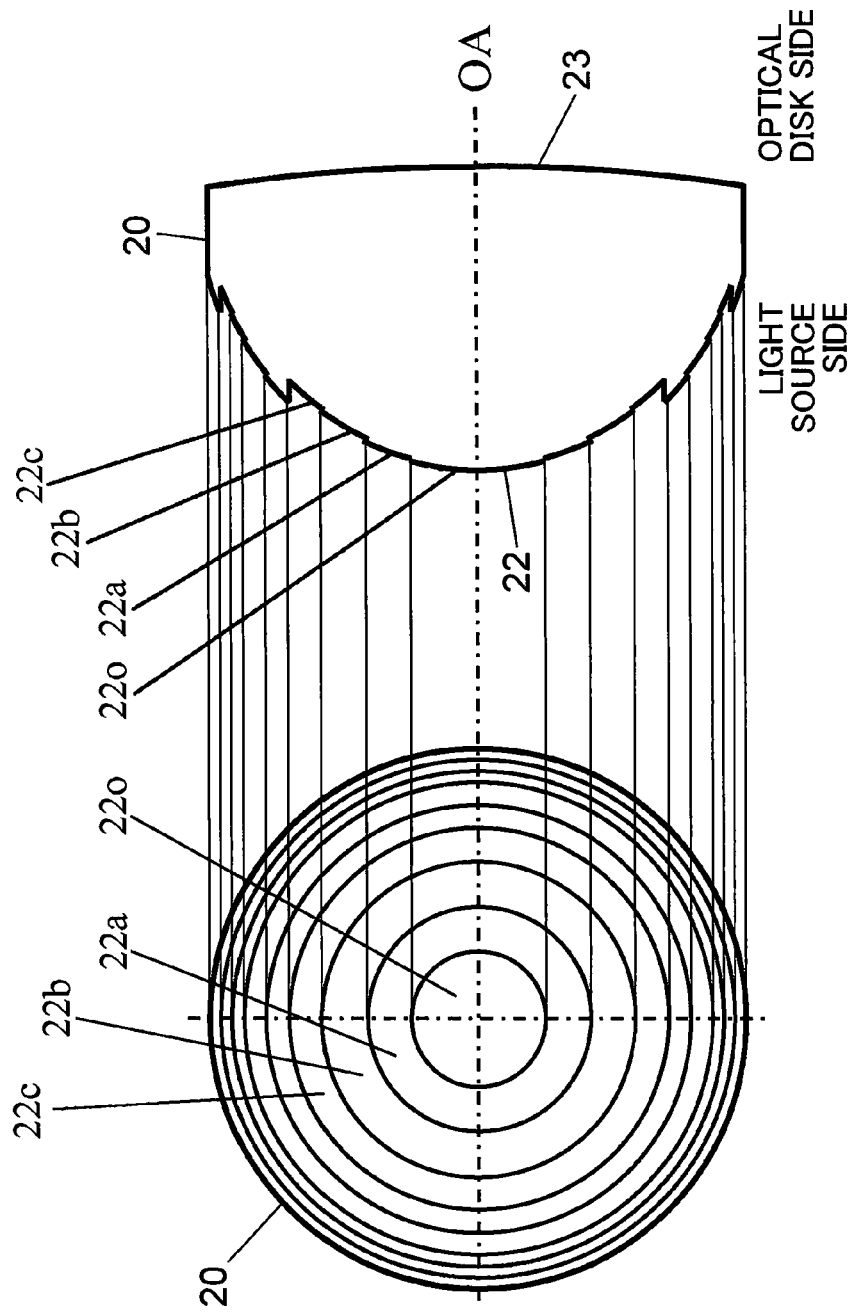
FIG. 7 is a diagram showing a configuration of an objective lens according to a second embodiment of the present invention.

FIG. 7 is a diagram showing a configuration of an objective lens according to a second embodiment of the present invention. A left-hand side diagram in FIG. 7 is a plan view showing a configuration of a synthetic resin objective lens 20 according to the present second embodiment, and a right-hand side diagram in FIG. 7 is a sectional view showing a configuration of the objective lens 20. A lens surface 22 on a light source side (an incidence side of a laser beam) of the objective lens 20 comprises a base aspherical surface. A stair-shaped diffractive structure having a plurality of annular optical surfaces centered around an optical axis OA of the objective lens 20 is formed on the base aspherical surface.

Meanwhile, a lens surface 23 on an optical disk side (an exit side of a laser beam) of the objective lens 20 which opposes the lens surface 22 is configured as a spherical surface or an aspherical surface.

Figure 8:
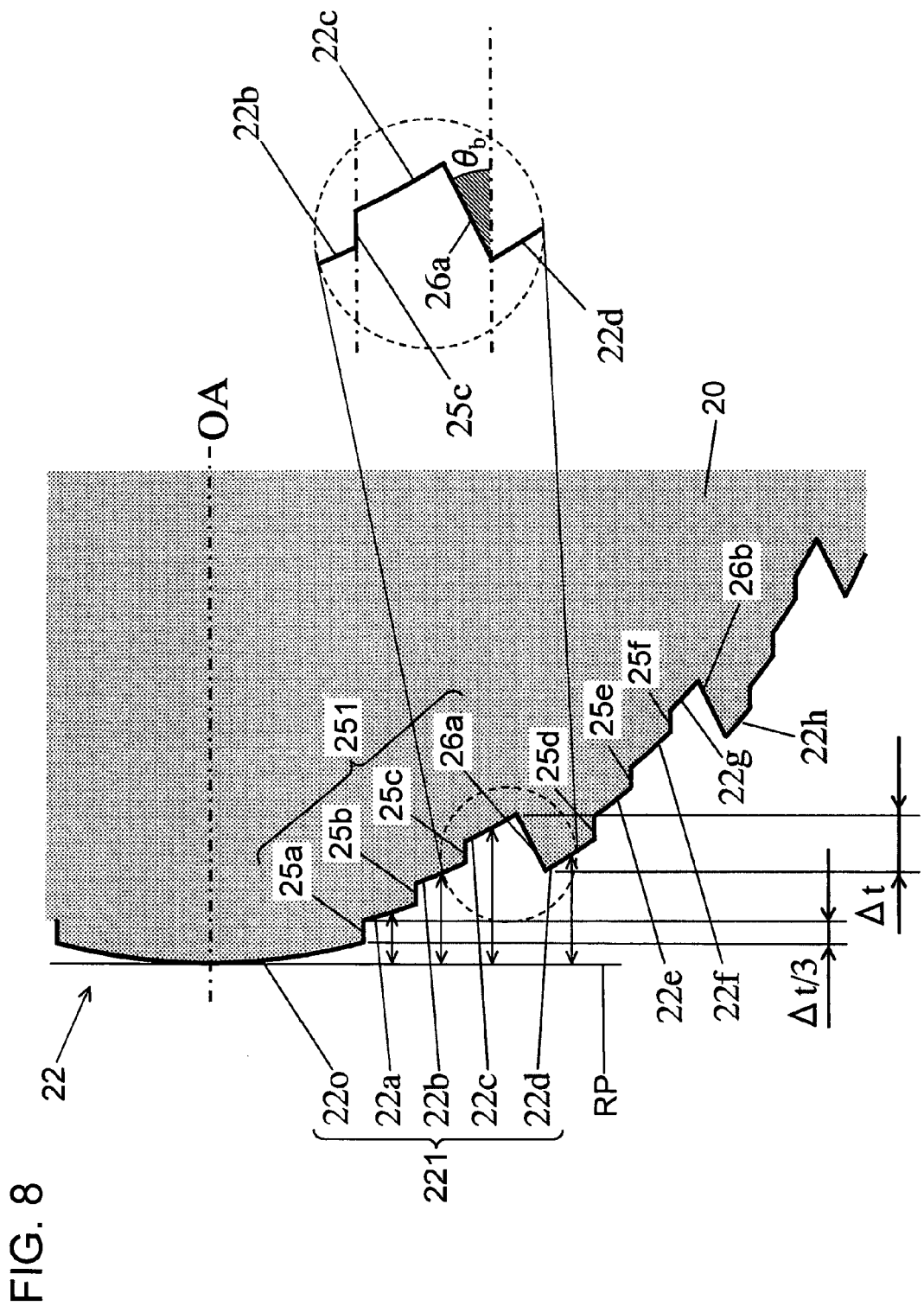
FIG. 8 is a partially enlarged sectional view showing a vicinity of an optical axis of a lens surface of an objective lens according to the second embodiment of the present invention.

FIG. 8 is a partially enlarged sectional view showing a vicinity of the optical axis OA of the lens surface 22 of the objective lens 20 according to the present second embodiment.

The diffractive structure formed on the base aspherical surface of the lens surface 22 comprises a circular optical surface 22o centered around the optical axis OA, and concentric annular optical surfaces 22a, 22b, 22c, ... provided on an outer side of the circular optical surface 22o. In addition, the circular optical surface 22o and the annular optical surface 22a are connected by an annular cylindrical connecting surface 25a. The annular optical surfaces 22a, 22b, 22d, 22e, 22f, ... and the annular optical surfaces 22b, 22c, 22e, 22f, 22g, ... adjacent to the annular optical surfaces 22a, 22b, 22d, 22e, 22f, ... are connected by annular cylindrical connecting surfaces 25b, 25c, 25d, 25e, 25f, . . . . The annular optical surfaces 22c, 22g, ... and the annular optical surfaces 22d, 22h, ... adjacent to the annular optical surfaces 22c, 22g, ... are connected by annular conical connecting surfaces 26a, 26b, . . . .

The lens surface 22 has an optical surface 221 comprising the circular optical surface 22o which is centered around the optical axis OA and which has a circular shape and the plurality of annular optical surfaces 22a, 22b, 22c, 22d, ... which have approximately stair-shaped cross sections and which are annularly partitioned centered around the optical axis OA of the objective lens 20, and a plurality of connecting surfaces 251 which connect the plurality of mutually adjacent annular optical surfaces to each other. Moreover, in the present invention, the term "stair shape" is to include an approximately stair shape that is similar to a stair shape.

The plurality of connecting surfaces 251 include at least the cylindrical connecting surface 25b formed of a cylindrical surface centered around the optical axis OA of the objective lens 20, the cylindrical connecting surface 25c formed of a cylindrical surface centered around the optical axis OA of the objective lens 20, and the conical connecting surface 26a formed of a conical surface centered around the optical axis OA of the objective lens 20. In addition, the plurality of annular optical surfaces include at least the annular optical surface 22a, the annular optical surface 22b adjacent to the annular optical surface 22a, the annular optical surface 22c adjacent to the annular optical surface 22b, and the annular optical surface 22d adjacent to the annular optical surface 22c.

The annular optical surface 22a is closer to the optical axis OA of the objective lens 20 than the annular optical surface 22b, the annular optical surface 22b is closer to the optical axis OA of the objective lens 20 than the annular optical surface 22c, and the annular optical surface 22c is closer to the optical axis OA of the objective lens 20 than the annular optical surface 22d.

Now, a flat surface in contact with the optical surface 221 at an intersection of the optical surface 221 and the optical axis OA of the objective lens 20 is assumed as a reference plane RP. An interval between the annular optical surface 22b and the reference plane PR is greater than an interval between the annular optical surface 22a and the reference plane PR, an interval between the annular optical surface 22c and the reference plane PR is greater than an interval between the annular optical surface 22b and the reference plane PR, and an interval between the annular optical surface 22d and the reference plane PR is smaller than an interval between the annular optical surface 22c and the reference plane PR.

Moreover, in the present second embodiment, while an interval between each annular optical surface and the reference plane represents, for example, an interval from a midpoint of a length of each annular optical surface in a radial direction to the reference plane, the present invention is not limited thereto. For example, an interval between each annular optical surface and the reference plane may represent an interval between a point closest to the reference plane on each annular optical surface and the reference plane.

The cylindrical connecting surface 25b connects the annular optical surface 22a and the annular optical surface 22b. The cylindrical connecting surface 25c connects the annular optical surface 22b and the annular optical surface 22c. The conical connecting surface 26a connects the annular optical surface 22c and the annular optical surface 22d.

The diffractive structure of the objective lens 20 is formed by repetitively forming the annular optical surfaces 22a, 22b, 22c, and 22d, the cylindrical connecting surfaces 25a, 25b, and 25c, and the conical connecting surface 26a in a direction of an outer periphery of the objective lens 20.

Moreover, in the present embodiment, the annular optical surfaces 22a, 22b, 22c, 22d, ... correspond to examples of a partitioned surface, the optical surface 221 corresponds to an example of an optical surface, the plurality of connecting surfaces 251 correspond to an example of a plurality of connecting surfaces, the cylindrical connecting surface 25b corresponds to an example of a first connecting surface, the cylindrical connecting surface 25c corresponds to an example of a second connecting surface, the conical connecting surface 26a corresponds to an example of a third connecting surface, the annular optical surface 22a corresponds to an example of a first partitioned surface, the annular optical surface 22b corresponds to an example of a second partitioned surface, the annular optical surface 22c corresponds to an example of a third partitioned surface, the annular optical surface 22d corresponds to an example of a fourth partitioned surface, and the reference plane RP corresponds to an example of a reference plane.

The circular optical surface 22o and the annular optical surfaces 22a, 22b, 22c, 22d, ... themselves which form the diffractive structure are optical surfaces composed of a spherical surface or an aspherical surface. The cross section of the lens surface 22 of the objective lens 20 has an approximately stair shape as shown in FIG. 8. In the stair-shaped diffractive structure, four steps constitute one period and a level difference of the stair shape is determined so that diffraction efficiency reaches maximum at, for example, a predetermined reference wavelength $\lambda$ [μm] or determined in consideration of a balance in diffraction efficiency among a plurality of wavelengths.

The cylindrical connecting surface 25a connects the circular optical surface 22o on an inner side of the cylindrical connecting surface 25a and the annular optical surface 22a on an outer side of the cylindrical connecting surface 25a. The cylindrical connecting surfaces 25b, 25c, . . . connect the annular optical surfaces 22a, 22b, . . . on an inner side of the connecting surfaces 25b, 25c, . . . and the annular optical surfaces 22b, 22c, . . . on an outer side of the connecting surfaces 25b, 25c, . . . .

In addition, the conical connecting surface 26a connects the annular optical surface 22c on an inner side of the conical connecting surface 26a and the annular optical surface 22d on an outer side of the conical connecting surface 26a.

Furthermore, the cylindrical connecting surfaces 25d, 25e, 25f, . . . connect the annular optical surfaces 22d, 22e, 22f, ... on an inner side of the cylindrical connecting surfaces 25d, 25e, 25f, ... and the annular optical surfaces 22e, 22f, 22g, ... on an outer side of the cylindrical connecting surfaces 25d, 25e, 25f, . . . . The conical connecting surface 26b connects the annular optical surface 22g on an inner side of the conical connecting surface 26b and the annular optical surface 22h on an outer side of the conical connecting surface 26b.

As shown in FIG. 8, the cylindrical connecting surfaces 25a, 25b, 25c, ... form level differences (interval $\Delta t/3$) in a direction where a thickness of the objective lens 20 decreases among the stair-shaped diffractive structure in which four steps constitute one period, and the conical connecting surfaces 26a, 26b, ... form level differences (interval $\Delta t$) in a direction where the thickness of the objective lens 20 increases among the stair-shaped diffractive structure in which four steps constitute one period. A length of the cylindrical connecting surfaces 25a, 25b, 25c, 25d, 25e, 25f, ... in the direction of the optical axis is shorter than a length of the conical connecting surfaces 26a and 26b in the direction of the optical axis. Moreover, in the present embodiment, the length of the cylindrical connecting surfaces in the direction of the optical axis is set to, for example, ⅓ of the length of the conical connecting surfaces in the direction of the optical axis.

In addition, the cylindrical connecting surfaces 25a, 25b, 25c, . . . are parallel to the optical axis OA of the objective lens 20, and the conical connecting surfaces 26a, 26b, . . . form a predetermined angle $\theta_b$ with the optical axis OA of the objective lens 20.

Figure 9B:
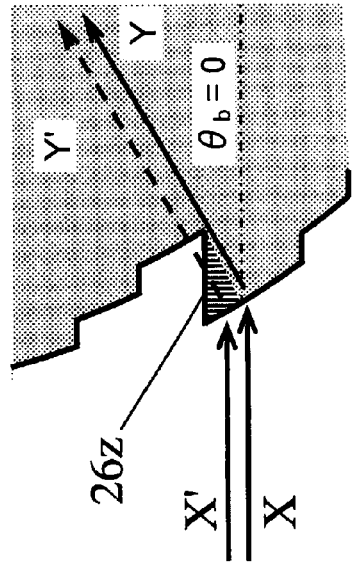
FIG. 9B is a diagram showing a relationship between an angle of a connecting surface and light intensity loss when the angle $\theta_b$ of a conical connecting surface is 0.
Figure 9D:
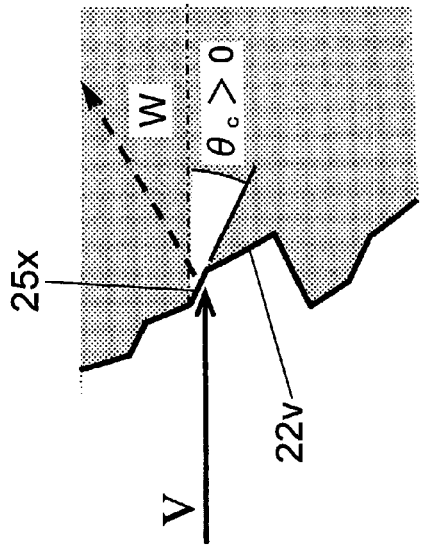
FIG. 9D is a diagram showing a relationship between an angle of a connecting surface and light intensity loss when the angle $\theta_c$ of a cylindrical connecting surface is greater than 0.
Figure 9A:
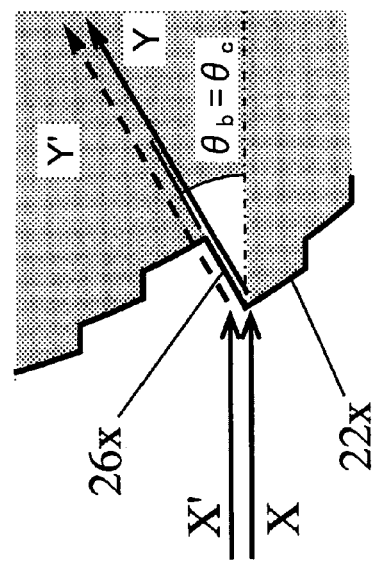
FIG. 9A is a diagram showing a relationship between an angle of a connecting surface and light intensity loss when an angle $\theta_b$ of a conical connecting surface is equal to an angle $\theta_e$.
Figure 9C:
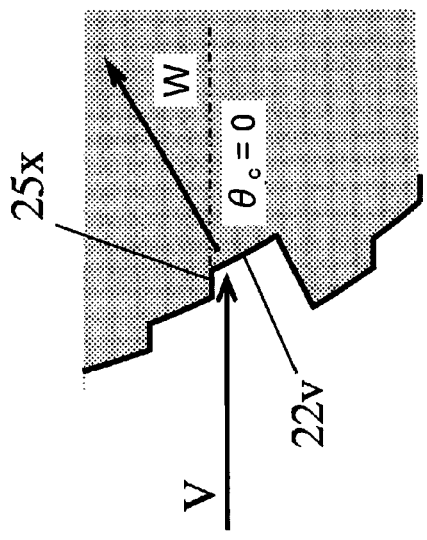
FIG. 9C is a diagram showing a relationship between an angle of a connecting surface and light intensity loss when an angle $\theta_c$ of a cylindrical connecting surface is 0.

FIGS. 9A to 9D are diagrams showing a relationship between an angle of a connecting surface that connects adjacent annular optical surfaces and light intensity loss according to the second embodiment of the present invention. FIG. 9A is a diagram showing a relationship between an angle of a connecting surface and light intensity loss when an angle $\theta_b$ of a conical connecting surface is equal to an angle $\theta_e$, FIG. 9B is a diagram showing a relationship between an angle of a connecting surface and light intensity loss when the angle $\theta_b$ of a conical connecting surface is 0, FIG. 9C is a diagram showing a relationship between an angle of a connecting surface and light intensity loss when an angle $\theta_c$ of a cylindrical connecting surface is 0, and FIG. 9D is a diagram showing a relationship between an angle of a connecting surface and light intensity loss when the angle $\theta_c$ of a cylindrical connecting surface is greater than 0.

Here, as shown in FIG. 9A, if an angle $\theta_b$ formed by a conical connecting surface with a large level difference interval ($\Delta t$) that connects adjacent annular optical surfaces (for example, a conical connecting surface 26x) and the optical axis OA is equal to the angle $\theta_e$ obtained by Expression (8) above ($\theta_b = \theta_e$), then a light path of a light beam Y resulting from the refraction and diffraction by the lens surface of a light beam X incident on an annular optical surface adjacent on the side of the outer periphery (for example, an annular optical surface 22x) is not blocked.

In addition, as shown in FIG. 9B, when a conical connecting surface 26z is parallel to the optical axis OA or, in other words, when the angle $\theta_b$ is 0 ($\theta_b = 0$), a light path of a light beam Y' resulting from the refraction and diffraction by the lens surface 22 of a light beam X' on a side of the inner periphery relative to the light beam X is blocked. In other words, between a configuration of a connecting surface shape shown in FIG. 9A in which $\theta_b = \theta_e$ and a configuration of a connecting surface shape shown in FIG. 9B in which $\theta_b = 0$, light intensity loss or, in other words, a decline in diffraction efficiency is substantially the same. Furthermore, it is obvious that light intensity loss or, in other words, a decline in diffraction efficiency is the same in a range expressed as $0 < \theta_b \leq \theta_e$.

In other words, the objective lens 20 has a numerical aperture of 0.8 or higher and is made of a synthetic resin. The optical surface 221 has a diffractive structure with an approximately stair-shaped cross section, and the angle $\theta_b$ [deg] formed by a conical connecting surface and the optical axis OA of the objective lens 20 satisfies Expression (15) below.

$$0 < \theta_b \leq \theta - \sin^{-1}\left(\frac{(\sin\theta - m\lambda_1/d)}{n}\right) \quad (15)$$

In Expression (15), $\lambda_1$ [μm] denotes a light source wavelength of a laser beam incident on the objective lens 20, n denotes a refractive index of the objective lens 20 at the wavelength $\lambda_1$, θ[deg] denotes a lens inclination angle of a base aspherical surface at an outermost periphery of an active region of the objective lens 20, d [μm] denotes a pitch of one period of the diffractive structure in a direction perpendicular to the optical axis OA, and m denotes a diffraction order of diffracted light that is a main component of the laser beam with the wavelength $\lambda_1$ that is generated by the diffractive structure.

On the other hand, as shown in FIG. 9C, if an angle $\theta_c$ formed by a cylindrical connecting surface with a small level difference interval ($\Delta t/3$) that connects adjacent annular optical surfaces (for example, a cylindrical connecting surface 25X) and the optical axis OA is equal to 0 ($\theta_c = 0$), then a light path of a light beam W resulting from the refraction and diffraction by the lens surface 22 of a light beam V incident on an annular optical surface adjacent on the side of the outer periphery (for example, an annular optical surface 22v) is not blocked by the cylindrical connecting surface 25x.

However, as shown in FIG. 9D, when the angle $\theta_c$ formed by a cylindrical connecting surface (for example, the cylindrical connecting surface 25x) and the optical axis OA is greater than 0 ($\theta_c > 0$), then the light beam V incident on an annular optical surface adjacent on the side of the outer periphery (for example, the annular optical surface 22v) is blocked by the cylindrical connecting surface 25x. Therefore, compared to the configuration shown in FIG. 9C, light intensity loss or, in other words, a decline in diffraction efficiency occurs with the configuration shown in FIG. 9D.

With the synthetic resin objective lens 20 according to the present second embodiment, if a reference wavelength λ of the used light source is set to 0.405 [μm], a refractive index n of the synthetic resin at the wavelength λ is set to 1.52, a lens inclination angle θ of the base aspherical surface at an effective radius Re [mm] is set to 60 [deg], a pitch d of the diffractive structure (one period) is set to 10 [μm], and a diffraction order m is set to +1, then the angle $\theta_e$ is obtained as 27.1 [deg] using Expression (8) above.

Figures 10A, 10B:
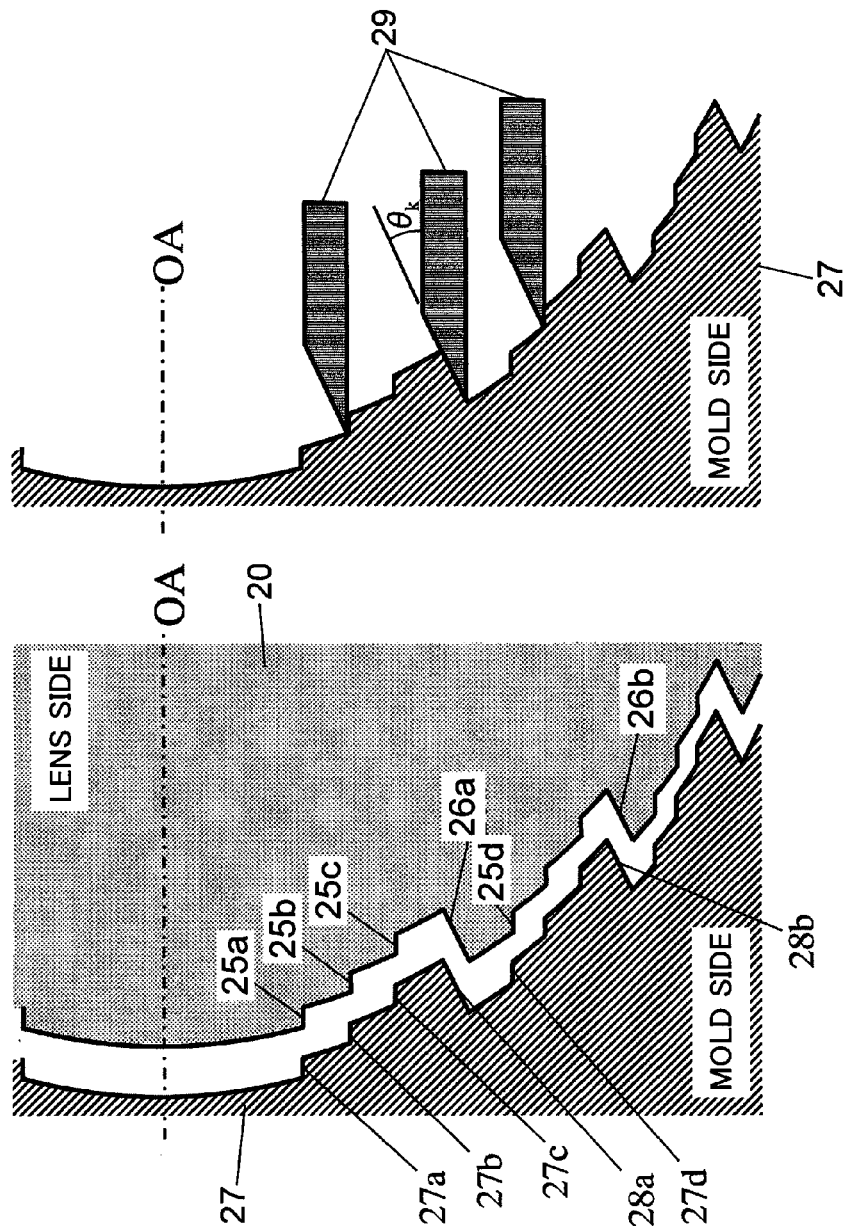
FIG. 10A is a diagram showing a shape of a mold used when producing a synthetic resin objective lens according to the second embodiment of the present invention by injection molding.
FIG. 10B is a diagram for describing processing of a mold of an objective lens according to the second embodiment of the present invention.

FIG. 10A is a diagram showing a shape of a mold used when producing a synthetic resin objective lens according to the second embodiment of the present invention by injection molding, and FIG. 10B is a diagram for describing processing of a mold of an objective lens according to the second embodiment of the present invention.

The conical connecting surfaces 26a and 26b of the objective lens 20 according to the present second embodiment shown in FIG. 10A have an angle $\theta_b$ of 27.1 [deg] with respect to the optical axis OA of the objective lens 20 ($\theta_b = \theta_e$), and the cylindrical connecting surfaces 25a, 25b, 25c, and 25d are parallel to the optical axis OA of the objective lens 20.

Therefore, as shown in FIG. 10A, in a mold 27 used when mass-producing the objective lens 20 by injection molding, machining surfaces 27a, 27b, 27c, and 27d which correspond to the cylindrical connecting surfaces 25a, 25b, 25c, and 25d are parallel to the optical axis OA, and machining surfaces 28a and 28b which correspond to the conical connecting surfaces 26a and 26b have an angle $\theta_b$ with respect to the optical axis OA. Consequently, as shown in FIG. 10B, by setting a blade edge angle $\theta_k$ of a tool bit (blade) 29 that processes the mold 27 to 27.1 [deg] that is equivalent to the angle $\theta_b$, the machining surfaces 27a, 27b, 27c, and 27d and the machining surfaces 28a and 28b of the mold 27 can be readily processed. In addition, since a tip of the tool bit 29 does not become excessively narrow, chipping of the tip of the tool bit during mold processing can be suppressed.

In addition, among the plurality of connecting surfaces of the objective lens 20, the cylindrical connecting surfaces 25a, 25b, 25c, . . . with a small level difference interval ($\Delta t/3$) are composed of a part of a cylindrical surface having the optical axis OA of the objective lens 10 as an axis of rotation, and the conical connecting surfaces 26a, 26b, . . . with a large level difference interval (Δt) are composed of a part of a conical surface having the optical axis OA of the objective lens 20 as an axis of rotation. Therefore, an objective lens can be obtained which has a lower likelihood of a transfer failure occurring on the circular optical surface 22o, the annular optical surfaces 22a, 22b, 22c, . . . , the cylindrical connecting surfaces 25a, 25b, 25c, . . . , and the conical connecting surfaces 26a, 26b, . . . during injection molding, which has improved mold releasability, and which has favorable aberration performance.

Furthermore, in order to prevent a light path from being blocked when an incident light beam is refracted and diffracted by a lens surface in a vicinity of an outermost periphery corresponding to a position of an effective radius Re [mm], the angle $\theta_b$ between the conical connecting surfaces 26a, 26b, . . . with a large level difference interval (Δt) and the optical axis OA is set to 27.1 [deg] that is equal to the angle $\theta_e$. Therefore, compared to a case where the conical connecting surface is composed of a part of a cylindrical surface having the optical axis OA as an axis of rotation, light intensity loss does not substantially occur. As a result, a favorable objective lens can be obtained in which a decline in diffraction efficiency is reduced in a vicinity of an outermost periphery where light intensity loss reaches maximum.

On the other hand, since the cylindrical connecting surfaces 25a, 25b, 25c, . . . with a small level difference interval (Δt/3) are composed of a part of a cylindrical surface having the optical axis OA as an axis of rotation, light intensity loss does not substantially occur. Consequently, a favorable objective lens with a reduced decline in diffraction efficiency can be obtained.

According to the configuration of the present second embodiment described above, in a diffractive structure formed on a base aspherical surface of the objective lens 20, an angle $\theta_b$ formed between a conical connecting surface with a large level difference interval (Δt) among annular connecting surfaces that connect adjacent annular optical surfaces to each other and the optical axis OA of the objective lens 20 is equal to an angle $\theta_e$ formed between a light beam resulting from the refraction and diffraction by the lens surface of a light beam incident parallel to the optical axis OA and the optical axis OA ($\theta_b=\theta_e$), whereby the angle $\theta_e$ is expressed by Expression (8) above.

Accordingly, a favorable objective lens can be obtained in which a decline in diffraction efficiency is reduced in a vicinity of an outermost periphery where light intensity loss reaches maximum.

In addition, processing of a mold used for injection molding is facilitated, and chipping of a tip of a tool bit during mold processing can be suppressed. Furthermore, since transferability and mold releasability during injection molding also improve, an objective lens with favorable aberration performance can be obtained.

Moreover, while a case where $\theta_b=\theta_e$ has been described for the objective lens 20 according to the present second embodiment, in a range where $0<\theta_b \le \theta_e$, a favorable objective lens can be obtained in which a decline in diffraction efficiency is reduced in a vicinity of an outermost periphery where light intensity loss substantially reaches maximum. Since an excessively fine tip of the tool bit used to process a mold creates a risk of chipping of the tip of the tool bit during mold processing, the angle $\theta_b$ is favorably set to 20 [deg] or more.

In other words, the objective lens 20 has a numerical aperture of 0.8 or higher and is made of a synthetic resin. The optical surface 22l has a diffractive structure with an approximately stair-shaped cross section, and the angle $\theta_b$ [deg] formed by a conical connecting surface and the optical axis OA of the objective lens 20 favorably satisfies Expression (16) below.

$$20 \le \theta_b \le \theta - \sin^{-1}\left(\frac{(\sin\theta - m\lambda_1/d)}{n}\right) \quad (16)$$

In Expression (16), $\lambda_1$ [μm] denotes a light source wavelength of a laser beam incident on the objective lens 20, n denotes a refractive index of the objective lens 20 at the wavelength $\lambda_1$, $\theta$ [deg] denotes a lens inclination angle of a base aspherical surface at an outermost periphery of an active region of the objective lens 20, d [μm] denotes a pitch of one period of the diffractive structure in a direction perpendicular to the optical axis OA, and m denotes a diffraction order of diffracted light that is a main component of the laser beam with the wavelength $\lambda_1$ that is generated by the diffractive structure.

From the above, in consideration of transferability, mold releasability, mold workability, and the like during injection molding, the angle $\theta_b$ formed between an annular conical connecting surface and the optical axis of the objective lens may be varied as appropriate within a range of $0<\theta_b \le \theta_e$, and more favorably, within a range of 20 [deg]$\le \theta_b \le \theta_e$.

In the course of actually creating a tool bit and processing a mold when molding the objective lens 20 according to the present second embodiment, it was confirmed that by setting the blade edge angle $\theta_k$ of the tool bit to $\theta_k \cong 45$ [deg] and, more specifically, to within a range expressed as $\theta_k = 45 \pm 5$ [deg], workability of the tool bit itself is improved, chipping of a tip of the tool bit during mold processing is suppressed, and favorable transferability and mold releasability during injection molding are achieved.

Figure 11:
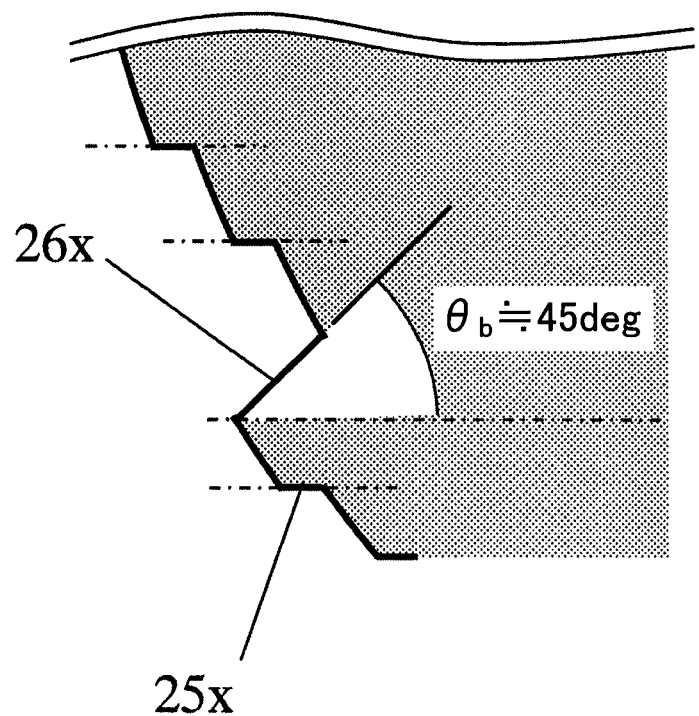
FIG. 11 is a diagram for describing an angle of a conical connecting surface according to the second embodiment of the present invention.

FIG. 11 is a diagram for describing an angle of a conical connecting surface according to the second embodiment of the present invention.

Here, as shown in FIG. 11, by adopting a configuration in which the cylindrical connecting surface 25x with a small level difference interval (Δt/3) is parallel to the optical axis, a decline in diffraction efficiency can be suppressed to a certain degree. Therefore, even in a case where the angle $\theta_b$ formed by a conical connecting surface 26x with a large level difference interval (Δt) and the optical axis is greater than the angle $\theta_e$, by setting the angle $\theta_b$ to $\theta_b \cong 45$ [deg] and, more specifically, to $\theta_b = 45 \pm 5$ [deg], further favorable transferability, mold releasability, mold workability, and the like during injection molding may be achieved, and by placing emphasis on these advantages, an objective lens with favorable aberration performance can be obtained.

In other words, appropriately varying the angle $\theta_b$ between an annular conical connecting surface and the optical axis of the objective lens within a range expressed as $\theta_b = 45 \pm 5$ [deg] is also within a scope of application of the present invention. The angle $\theta_b$ [deg] formed by a conical connecting surface and the optical axis OA of the objective lens 20 favorably satisfies $\theta_b = 45 \pm 5$.

Third Embodiment

Figure 12:
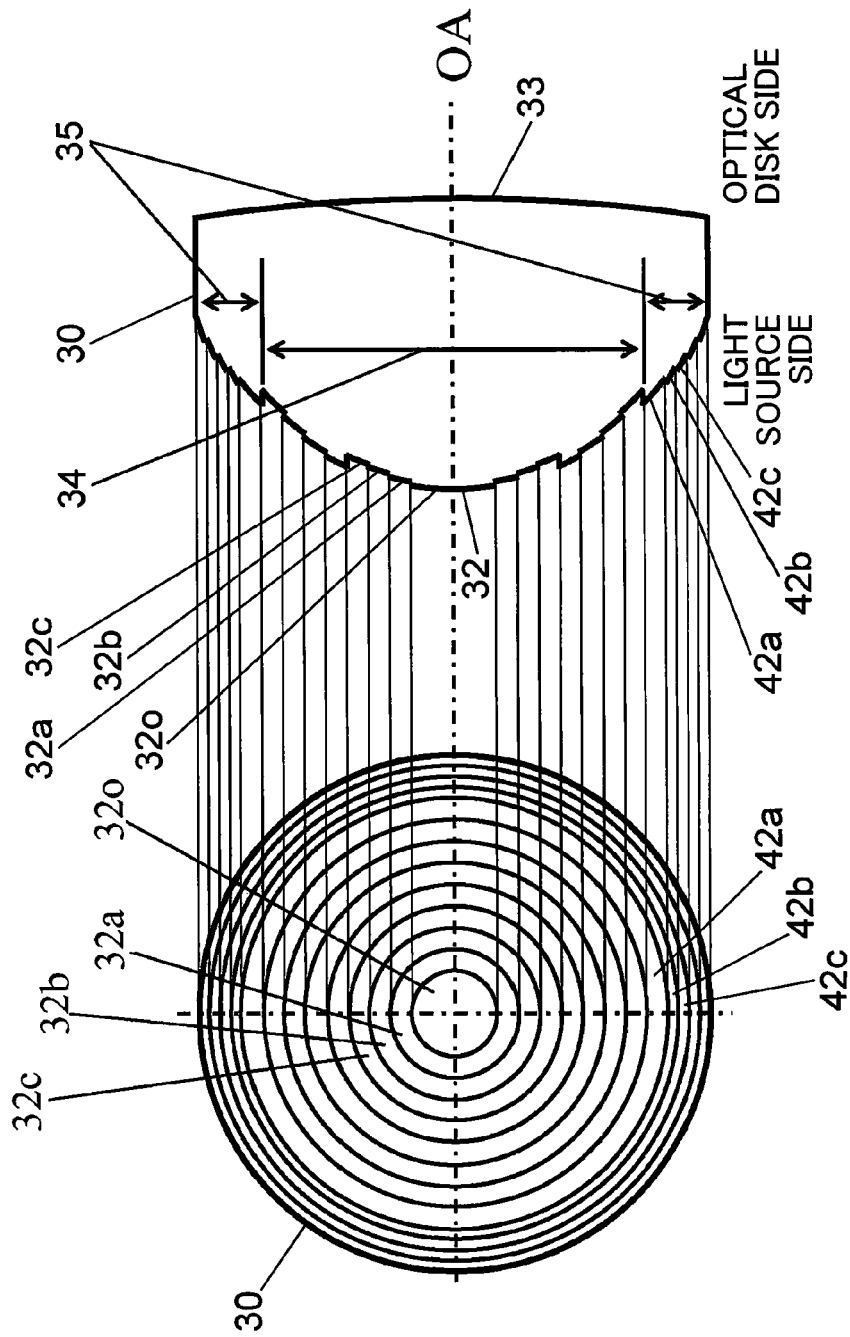
FIG. 12 is a diagram showing a configuration of an objective lens according to a third embodiment of the present invention.

FIG. 12 is a diagram showing a configuration of an objective lens according to a third embodiment of the present invention. A left-hand side diagram in FIG. 12 is a plan view showing a configuration of a synthetic resin objective lens 30 according to the present third embodiment, and a right-hand side diagram in FIG. 12 is a sectional view showing a configuration of the objective lens 30 according to the present third embodiment. A lens surface 32 on a light source side (an incidence side of a laser beam) of the objective lens 30 comprises a base aspherical surface. A stair-shaped diffractive structure having a plurality of annular optical surfaces centered around an optical axis OA of the objective lens 30 is formed on the base aspherical surface.

Meanwhile, a lens surface 33 on an optical disk side (an exit side of a laser beam) of the objective lens 30 which opposes the lens surface 32 is configured as a spherical surface or an aspherical surface.

The lens surface 32 has an inner peripheral region 34 including the optical axis of the objective lens 30, and an outer peripheral region 35 arranged on an outer peripheral side relative to the inner peripheral region 34. The outer peripheral region 35 is in contact with the inner peripheral region 34. The diffractive structure of the inner peripheral region 34 which is formed on the base aspherical surface of the lens surface 32 comprises a circular optical surface 32o centered around the optical axis OA, and concentric annular optical surfaces 32a, 32b, 32c, . . . provided on an outer side of the circular optical surface 32O. The circular optical surface 32O and the annular optical surfaces 32a, 32b, 32c, . . . themselves which form the diffractive structure are optical surfaces composed of a spherical surface or an aspherical surface. As shown in FIG. 12, in the inner peripheral region 34 including the optical axis OA, a cross section of the lens surface 32 of the objective lens 30 has an approximately stair shape.

On the other hand, in the outer peripheral region 35 surrounding the inner peripheral region 34, a cross section of the lens surface 32 of the objective lens 30 has an approximately sawtooth shape. A diffractive structure of the outer peripheral region 35 which is formed on the base aspherical surface of the lens surface 32 comprises concentric annular optical surfaces 42a, 42b, 42c, . . . .

The objective lens 30 according to the present third embodiment is used as a compatible objective lens that is compatible between, for example, a BD onto which information is recorded or from which information is reproduced using a blue-violet laser beam with a wavelength $\lambda_1$ [μm] and a DVD onto which information is recorded or from which information is reproduced using a red laser beam with a wavelength $\lambda_2$ [μm] that is longer than the wavelength $\lambda_1$ ($\lambda_1<\lambda_2$).

The inner peripheral region 34 shown in FIG. 12 is a BD/DVD compatible region and a numerical aperture thereof corresponds to approximately 0.60 to 0.65. In the inner peripheral region 34, the stair-shaped diffractive structure is determined so that a blue-violet laser beam converges on an information recording surface of the BD having a light transmission layer with a thickness of approximately 0.1 mm and, at the same time, a red laser beam converges on an information recording surface of the DVD having a light transmission layer with a thickness of approximately 0.6 mm. Moreover, an interval of level differences of the stair-shaped diffractive structure in a direction of the optical axis assumes that one period is constituted by, for example, four steps, and is determined in consideration of compatibility performances of a BD and a DVD as well as a balance in diffraction efficiency between the wavelength $\lambda_1$ [μm] and the wavelength $\lambda_2$ [μm].

For example, a level difference interval ($\Delta t_1/3$) of a cylindrical connecting surface is determined so as to provide a blue-violet laser beam having a wavelength $\lambda_1$ ($\lambda_1$=405 nm) with a light path difference of approximately 1.25×$\lambda_1$ [μm], and to provide a red laser beam having a wavelength $\lambda_2$ ($\lambda_2$=660 nm) with a light path difference of approximately 0.75×$\lambda_2$ [μm].

In other words, favorably, a length L1 of the cylindrical connecting surface in the direction of the optical axis of the objective lens 30 provides a laser beam having a wavelength $\lambda_1$ (0.39 μm≤$\lambda_1$≤0.43 μm) with a phase difference that is equal to or greater than $\lambda_1$, and provides a laser beam having a wavelength $\lambda_2$ (0.61 μm≤$\lambda_2$≤0.69 μm) with a phase difference that is equal to or smaller than $\lambda_2$. In addition, due to a refractive effect of the base aspherical surface and a diffractive effect of the diffractive structure of the objective lens 30, a laser beam with the wavelength $\lambda_1$ and a laser beam with the wavelength $\lambda_2$ incident on the optical surface 321 are both outputted in the direction of the optical axis of the objective lens 30.

Accordingly, since a sawtooth shape in an opposite direction can be approximated by the wavelength $\lambda_1$ and the wavelength $\lambda_2$, a diffraction direction of diffracted light which produces maximum diffraction efficiency is reversed and BD-DVD compatibility is facilitated.

Figure 13:
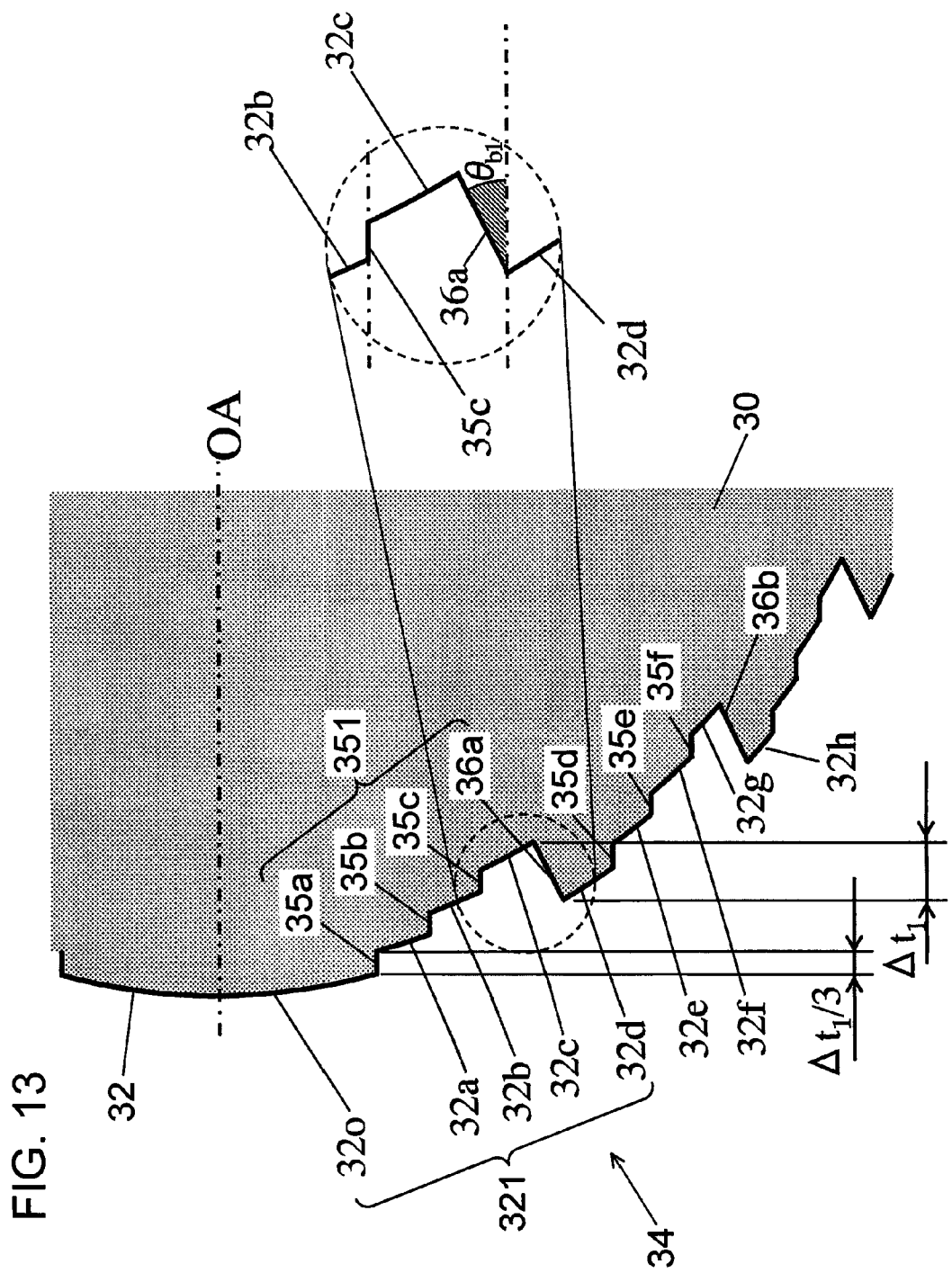
FIG. 13 is a partially enlarged sectional view showing an inner peripheral region of an objective lens according to the third embodiment of the present invention.

FIG. 13 is a partially enlarged sectional view showing the inner peripheral region of the objective lens according to the third embodiment of the present invention. FIG. 14 is a partially enlarged sectional view showing the outer peripheral region of the objective lens according to the third embodiment of the present invention.

As shown in FIG. 13, in the inner peripheral region 34, the circular optical surface 32O and the annular optical surface 32a are connected by an annular cylindrical connecting surface 35a. The annular optical surfaces 32a, 32b, 32d, 32e, 32f, . . . and the annular optical surfaces 32b, 32c, 32e, 32f, 32g, . . . adjacent to the annular optical surfaces 32a, 32b, 32d, 32e, 32f, . . . are connected by annular cylindrical connecting surfaces 35b, 35c, 35d, 35e, 35f, . . . . The annular optical surfaces 32c, 32g, . . . and the annular optical surfaces 32d, 32h, . . . adjacent to the annular optical surfaces 32c, 32g, . . . are connected by annular conical connecting surfaces 36a, 36b, . . . .

The inner peripheral region 34 of the lens surface 32 has an optical surface 321 comprising the circular optical surface 32o which is centered around the optical axis OA and which has a circular shape and the plurality of annular optical surfaces 32a, 32b, 32c, . . . which have approximately stair-shaped cross sections and which are annularly partitioned centered around the optical axis OA of the objective lens 30, and a plurality of connecting surfaces 351 which connect the plurality of mutually adjacent annular optical surfaces to each other.

The plurality of connecting surfaces 351 include at least the cylindrical connecting surface 35b formed of a cylindrical surface centered around the optical axis OA of the objective lens 30, the cylindrical connecting surface 35c formed of a cylindrical surface centered around the optical axis OA of the objective lens 30, and the conical connecting surface 36a formed of a conical surface centered around the optical axis OA of the objective lens 30. In addition, the plurality of annular optical surfaces include at least the annular optical surface 32a, the annular optical surface 32b adjacent to the annular optical surface 32a, the annular optical surface 32c adjacent to the annular optical surface 32b, and the annular optical surface 32d adjacent to the annular optical surface 32c.

Moreover, configurations of the optical surface 321 and the plurality of connecting surfaces 351 are similar to the configurations of the optical surface 221 and the plurality of connecting surfaces 251 according to the second embodiment.

The cylindrical connecting surface 35a connects the circular optical surface 32o on an inner side of the cylindrical connecting surface 35a and the annular optical surface 32a on an outer side of the cylindrical connecting surface 35a. The cylindrical connecting surfaces 35b, 35c, . . . connect the annular optical surfaces 32a, 32b, . . . on an inner side of the connecting surfaces 35b, 35c, . . . and the annular optical surfaces 32b, 32c, . . . on an outer side of the connecting surfaces 35b, 35c, . . . .

In addition, the conical connecting surface 36a connects the annular optical surface 32c on an inner side of the conical connecting surface 36a and the annular optical surface 32d on an outer side of the conical connecting surface 36a.

Furthermore, the cylindrical connecting surfaces 35d, 35e, 35f, . . . connect the annular optical surfaces 32d, 32e, 32f, . . . on an inner side of the cylindrical connecting surfaces 35d, 35e, 35f, . . . and the annular optical surfaces 32e, 32f, 32g, . . . on an outer side of the cylindrical connecting surfaces 35d, 35e, 35f, . . . . The conical connecting surface 36b connects the annular optical surface 32g on an inner side of the conical connecting surface 36b and the annular optical surface 32h on an outer side of the conical connecting surface 36b.

As shown in FIG. 13, the cylindrical connecting surfaces 35a, 35b, 35c, . . . in the inner peripheral region 34 form level differences (interval $\Delta t_1/3$) in a direction where a thickness of the objective lens 30 decreases among the stair-shaped diffractive structure in which four steps constitute one period, and the conical connecting surfaces 36a, 36b, . . . form level differences (interval $\Delta t_1$) in a direction where the thickness of the objective lens 30 increases among the stair-shaped diffractive structure in which four steps constitute one period.

In addition, the cylindrical connecting surfaces 35a, 35b, 35c, . . . are parallel to the optical axis OA of the objective lens 30, and the conical connecting surfaces 36a, 36b, . . . form a predetermined angle $\theta_{b1}$ with the optical axis OA of the objective lens 30.

Meanwhile, the outer peripheral region 35 shown in FIG. 14 is a BD-only region and a numerical aperture thereof corresponds to approximately 0.85. In the outer peripheral region 35, a sawtooth-shaped diffractive structure is determined so that a blue-violet laser beam converges on an information recording surface of the BD having a light transmission layer with a thickness of approximately 0.1 mm. An interval ($\Delta t_2$) of a level difference of a conical connecting surface in the sawtooth-shaped diffractive structure in the direction of the optical axis is determined so that, for example, a maximum diffraction efficiency is obtained at a wavelength $\lambda_1$ [µm].

The outer peripheral region 35 of the lens surface 32 has an optical surface 421 comprising the plurality of annular optical surfaces 42a, 42b, 42c, . . . which have approximately sawtooth-shaped cross sections and which are annularly partitioned centered around the optical axis OA of the objective lens 30, and conical connecting surfaces 45a, 45b, 45c, . . . which connect the plurality of mutually adjacent annular optical surfaces to each other and which are composed of conical surfaces centered around the optical axis OA of the objective lens 30.

The plurality of annular optical surfaces include at least the annular optical surface 42a and the annular optical surface 42b that is adjacent to the annular optical surface 42a.

Moreover, configurations of the optical surface 421 and the conical connecting surfaces 45a, 45b, 45c, . . . are similar to the configurations of the optical surface 121 and the connecting surfaces 15b, 15c, . . . according to the first embodiment. However, the optical surface 421 does not include the circular optical surface 32o.

Moreover, in the present embodiment, the inner peripheral region 34 corresponds to an example of a first region, the outer peripheral region 35 corresponds to an example of a second region, the annular optical surfaces 42a, 42b, 42c, . . . correspond to examples of an outer periphery partitioned surface, the optical surface 421 corresponds to an example of an outer periphery optical surface, the conical connecting surfaces 45a, 45b, 45c, . . . correspond to examples of an outer periphery connecting surface, the annular optical surface 42a corresponds to an example of a first outer periphery partitioned surface, and the annular optical surface 42b corresponds to an example of a second outer periphery partitioned surface.

As shown in FIG. 14, the conical connecting surfaces 45a, 45b, 45c, . . . in the outer peripheral region 35 connect the annular optical surfaces 42a, 42b, 42c, . . . on an inner side of the conical connecting surfaces 45a, 45b, 45c, . . . and the annular optical surfaces 42b, 42c, 42d, . . . on an outer side of the conical connecting surfaces 45a, 45b, 45c, . . . . The conical connecting surfaces 45a, 45b, 45c, . . . all form a predetermined angle $\theta_{b2}$ with the optical axis OA of the objective lens 30.

With the synthetic resin objective lens 30 according to the present third embodiment, if a first reference wavelength $\lambda_1$ of the used light source is set to 0.405 [µm], a refractive index n of the synthetic resin at the wavelength $\lambda_1$ is set to 1.52, a lens inclination angle $\theta$ of the base aspherical surface at an effective radius Re [mm] is set to 60 [deg], a pitch d of the diffractive structure is set to 10 [µm], and a diffraction order m at which diffraction efficiency reaches maximum at the wavelength $\lambda_1$ is set to +1, then the angle $\theta_e$ is obtained as 27.1 [deg] using Expression (8) above.

The conical connecting surfaces 36a, 36b, . . . in the inner peripheral region 34 of the objective lens 30 according to the present third embodiment shown in FIG. 13 have an angle $\theta_{b1}$ of 27.1 [deg] with respect to the optical axis OA of the objective lens 30 ($\theta_{b1}=\theta_e$), and the cylindrical connecting surfaces 35a, 35b, 35c, . . . are parallel to the optical axis OA of the objective lens 20.

In addition, the conical connecting surfaces 45a, 45b, 45c, . . . in the outer peripheral region 35 also have an angle $\theta_{b2}$ of 27.1 [deg] with respect to the optical axis OA of the objective lens 30 ($\theta_{b2}=\theta_e$).

Consequently, in a similar manner to the first embodiment and the second embodiment, when mass-producing the objective lens 30 according to the present third embodiment by injection molding, by setting a blade edge angle $\theta_k$ of a tool bit (blade) that processes a mold to 27.1 [deg] that is equivalent to the angle $\theta_{b1}$ and the angle $\theta_{b2}$, machining surfaces in all regions of the mold including the approximately stair-shaped inner peripheral region 34 and the approximately sawtooth-shaped outer peripheral region 35 can be readily processed using a single tool bit. In addition, since a tip of the tool bit does not become excessively narrow, chipping of the tip of the tool bit during mold processing can be suppressed. Furthermore, since the likelihood of transfer failure is reduced while mold releasability is improved during injection molding, an objective lens with favorable aberration performance can be obtained.

Moreover, favorably, the angle $\theta_{b1}$ [deg] formed between the conical connecting surfaces 36a, 36b, . . . and the optical axis OA of the objective lens 30 is equal to the angle $\theta_{b2}$ [deg]

formed between the conical connecting surfaces 45a, 45b, 45c, ... and the optical axis OA of the objective lens 30.

Furthermore, in order to prevent a light path from being blocked when an incident light beam is refracted and diffracted by a lens surface in a vicinity of an outermost periphery corresponding to a position of an effective radius Re [mm], the angle $\theta_{b2}$ between the conical connecting surfaces 45a, 45b, 45c, ... and the optical axis OA is set to 27.1 [deg] that is equal to the angle $\theta_e$. Accordingly, light intensity loss can be suppressed. As a result, a favorable objective lens can be obtained in which a decline in diffraction efficiency is reduced in a vicinity of an outermost periphery where light intensity loss reaches maximum.

Similarly, in the inner peripheral region 34, since the cylindrical connecting surfaces 35a, 35b, 35c, ... with a small level difference interval ($\Delta t_1/3$) are composed of a part of a cylindrical surface having the optical axis OA as an axis of rotation, a favorable objective lens with a reduced decline in diffraction efficiency can be obtained.

FIG. 15 is a diagram for describing an interval of a cylindrical connecting surface and an interval of a conical connecting surface in the inner peripheral region according to the third embodiment of the present invention.

With the objective lens 30 according to the present third embodiment, the interval ($\Delta t_1$) of the level differences of the stair-shaped diffractive structure is determined so as to provide a blue-violet laser beam having a wavelength $\lambda_1$ with a light path difference that is equal to or greater than $\lambda_1$ and to provide a red laser beam having a wavelength $\lambda_2$ with a light path difference that is equal to or smaller than $\lambda_2$. Therefore, a diffraction direction of the blue-violet laser beam with the wavelength $\lambda_1$ is opposite to a diffraction direction of the red laser beam with the wavelength $\lambda_2$.

However, since the diffractive structure is formed on the base aspherical surface of the objective lens, as shown in FIG. 15, both the blue-violet laser beam having a wavelength $\lambda_1$ and the red laser beam having a wavelength $\lambda_2$ are refracted and diffracted by the lens surface and outputted toward the side of the optical axis OA of the objective lens 30. In other words, the objective lens 30 substantially has a power of a convex lens. Therefore, since the light path of a laser beam of neither of the wavelengths is blocked due to a cylindrical connecting surface with a small level difference interval ($\Delta t_1/3$) being composed of a part of a cylindrical surface having the optical axis OA as an axis of rotation, a decline in diffraction efficiency can be suppressed.

According to the configuration of the present third embodiment described above, in a diffractive structure formed on the base aspherical surface of the objective lens 30, an angle $\theta_{b1}$ formed between a conical connecting surface in the inner peripheral region 34 with a large level difference interval ($\Delta t_1$) among annular connecting surfaces that connect adjacent annular optical surfaces to each other and the optical axis OA of the objective lens 30 and an angle $\theta_{b2}$ formed between a conical connecting surface in the outer peripheral region 35 that connects adjacent annular optical surfaces to each other and the optical axis OA of the objective lens 30 are equal to an angle $\theta_e$ formed between a light beam resulting from the refraction and diffraction by the lens surface of a light beam incident parallel to the optical axis OA and the optical axis OA ($\theta_{b1}=\theta_{b2}=\theta_e$), whereby the angle $\theta_e$ is expressed by Expression (8) above.

Alternatively, in a similar manner to the first embodiment, the angle $\theta_e$ may be expressed by Expression (13) above using a lens inclination angle $\theta_r$ of an actual optical surface due to the diffractive structure.

In other words, the angle $\theta_{b2}$ [deg] formed by the conical connecting surfaces 45a, 45b, 45c, ... and the optical axis OA of the objective lens 30 may satisfy Expression (17) below.

$$0 < \theta_{b2} \le \theta_r - \sin^{-1}\left(\frac{\sin\theta_r}{n}\right) \quad (17)$$

In Expression (17), $\theta_r$ [deg] denotes a lens inclination angle of an annular optical surface at an outermost periphery of an active region of the objective lens 30, and n denotes a refractive index of the objective lens 30 at a light source wavelength of a laser beam incident on the objective lens 30.

Accordingly, a favorable objective lens can be obtained in which a decline in diffraction efficiency is reduced in a vicinity of an outermost periphery where light intensity loss reaches maximum.

In addition, processing of a mold used for injection molding is facilitated, and chipping of a tip of a tool bit during mold processing can be suppressed. Furthermore, since transferability and mold releasability during injection molding also improve, an objective lens with favorable aberration performance can be obtained.

Moreover, while a case where $\theta_{b1}=\theta_{b2}=\theta_e$ has been described for the objective lens 30 according to the present third embodiment, in a range where $0<\theta_{b1}=\theta_{b2}\le\theta_e$, a favorable objective lens can be obtained in which a decline in diffraction efficiency is reduced in a vicinity of an outermost periphery where light intensity loss substantially reaches maximum.

In other words, favorably, the objective lens 30 has a numerical aperture of 0.8 or higher and is made of a synthetic resin. Favorably, the optical surface 421 has a diffractive structure with an approximately sawtooth-shaped cross section, and the angle $\theta_{b2}$ [deg] formed by the conical connecting surfaces 45a, 45b, 45c, ... and the optical axis OA of the objective lens 30 satisfies Expression (18) below.

$$0 < \theta_{b2} \le \theta - \sin^{-1}\left(\frac{(\sin\theta - m\lambda_1/d)}{n}\right) \quad (18)$$

In Expression (18), $\lambda_1$ [μm] denotes a light source wavelength of a laser beam incident on the objective lens 30, n denotes a refractive index of the objective lens 30 at the wavelength $\lambda_1$, $\theta$ [deg] denotes a lens inclination angle of a base aspherical surface at an outermost periphery of an active region of the objective lens 30, d [μm] denotes a pitch of one period of the diffractive structure in a direction perpendicular to the optical axis OA, and m denotes a diffraction order of diffracted light that is a main component of the laser beam with the wavelength $\lambda_1$ that is generated by the diffractive structure.

Moreover, since an excessively fine tip of the tool bit used to process a mold creates a risk of chipping of the tip of the tool bit during mold processing, the angle $\theta_{b1}$ and the angle $\theta_{b2}$ are favorably set to 20 [deg] or more.

In other words, the angle $\theta_{b2}$ [deg] formed by the conical connecting surfaces 45a, 45b, 45c, ... and the optical axis OA of the objective lens 30 favorably satisfies Expression (19) below.

$$20 \le \theta_{b2} \le \theta - \sin^{-1}\left(\frac{(\sin\theta - m\lambda_1/d)}{n}\right) \quad (19)$$

From the above, in consideration of transferability, mold releasability, mold workability, and the like during injection molding, the angle $\theta_{b1}$ and the angle $\theta_{b2}$ formed between annular conical connecting surfaces and an optical axis of the objective lens may be varied as appropriate within a range of $0<\theta_{b1}=\theta_{b2\le\theta_e}$, and more favorably, within a range of 20 [deg]$\le\theta_{b1}=\theta_{b2}\le\theta_e$.

Moreover, as shown in the second embodiment, by adopting a configuration in which a cylindrical connecting surface with a small level difference interval is parallel to the optical axis, a decline in diffraction efficiency can be suppressed to a certain degree. Therefore, by setting the angle $\theta_{b1}$ and the angle $\theta_{b2}$ such that $\theta_{b1}=\theta_{b2}=45\pm5$ [deg], transferability, mold releasability, mold workability, and the like during injection molding become even more favorable, and by placing emphasis on these advantages, an objective lens with favorable aberration performance can be obtained.

In other words, appropriately varying the angle $\theta_{b1}$ and the angle $\theta_{b2}$ between annular conical connecting surfaces and the optical axis of the objective lens within a range expressed as $\theta_{b1}=\theta_{b2}=45\pm5$ [deg] is also within a scope of application of the present invention. The angle $\theta_{b2}$ [deg] formed by the conical connecting surfaces 45a, 45b, 45c, . . . and the optical axis OA of the objective lens 30 favorably satisfies $\theta_{b2}=45\pm5$.

A specific shape of the objective lens 30 according to the third embodiment of the present invention will now be described. FIG. 16 is a diagram showing an actual shape of a boundary portion between the inner peripheral region and the outer peripheral region of the objective lens 30 according to the third embodiment of the present invention.

In FIG. 16, a left-hand side of a boundary BP represents the inner peripheral region 34 having an approximately stair-shaped diffractive structure, and a right-hand side of the boundary BP represents the outer peripheral region 35 having an approximately sawtooth-shaped diffractive structure. In a vicinity of the boundary BP, a level difference interval ($\Delta t_1/3$) of a cylindrical connecting surface of the inner peripheral region 34 is approximately 1 μm, a level difference interval ($\Delta t_1$) of a conical connecting surface is approximately 3 μm, a line width d is approximately 3 μm, and a lens inclination angle θ is approximately 50 deg.

Figures 17A, 17B:
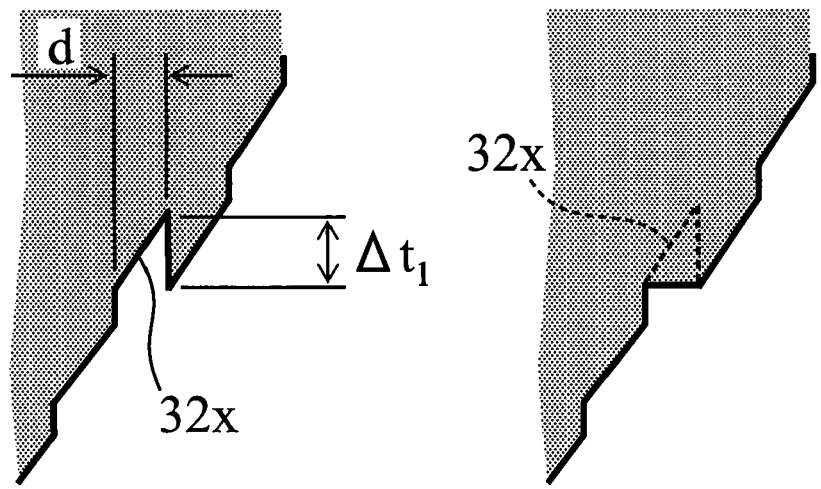
FIG. 17A is a diagram showing an ideal shape of a connecting surface in an inner peripheral region.
FIG. 17B is a diagram showing a shape of a connecting surface in a case where Patent Literature 2 is applied.
Figures 17C, 17D:
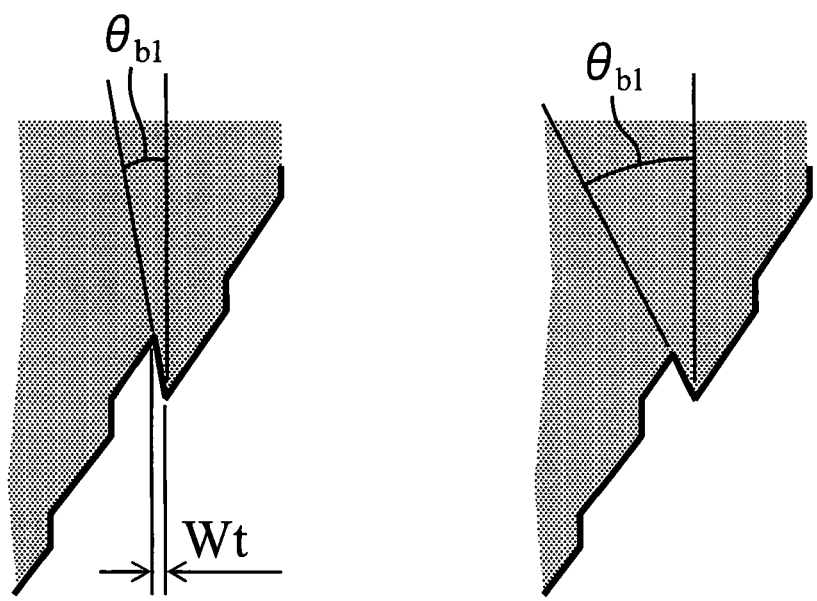
FIG. 17C is a diagram showing a shape of a connecting surface in a case where Patent Literature 1 is applied.
FIG. 17D is a diagram showing a shape of a connecting surface in an inner peripheral region according to the present third embodiment.

FIGS. 17A to 17D are enlarged views of a part of the inner peripheral region shown in FIG. 16 (in a vicinity of the boundary between the inner peripheral region and the outer peripheral region). FIG. 17A is a diagram showing an ideal shape of a connecting surface in the inner peripheral region, FIG. 17B is a diagram showing a shape of a connecting surface in a case where Patent Literature 2 is applied; FIG. 17C is a diagram showing a shape of a connecting surface in a case where Patent Literature 1 is applied; and FIG. 17D is a diagram showing a shape of a connecting surface in the inner peripheral region according to the present third embodiment.

While FIG. 17A shows an ideal shape of a level difference of an approximately stair-shaped connecting surface in the inner peripheral region, as already described, in this case, mold processing and molding are extremely difficult. Now, since the objective lens 30 according to the present third embodiment has a large level difference interval ($\Delta t_1$) and a large lens inclination angle θ but a small line width d, as shown in FIG. 17B, configuring a connecting surface of annular optical surfaces as a surface perpendicular to the optical axis as described in Patent Literature 2 results in losing almost an entire region of an annular optical surface 32x adjacent on a side of an inner periphery and causing a significant loss in light intensity.

On the other hand, a width of a connecting surface (a boundary portion) described in Patent Literature 1 is expressed by Expression (20) below.

$$0.05 < Wt(n-1)/\lambda < 0.60 \quad (20)$$

In Expression (20), Wt denotes a width of a boundary portion (a width of an orthogonal projection of a conical surface from the direction of the optical axis), n denotes a refractive index of the material of a single lens, and λ denotes a wavelength of a light beam passing through the single lens.

By applying Expression (20) above to the objective lens 30 according to the present third embodiment, since n is 1.52 and λ is 0.405 [μm], the width Wt of the connecting surface (boundary portion) may be expressed by Expression (21) below.

$$0.039 < Wt < 0.467 \text{ [μm]} \quad (21)$$

Therefore, as is the case of the objective lens 30 according to the present third embodiment, when the level difference interval ($\Delta t_1$) of a conical connecting surface is 3 [μm], an angle $\theta_{b1}$ formed between the conical connecting surface and the optical axis of the objective lens 30 is limited to a range expressed as $0.74<\theta_{b1}<8.85$ [deg] as shown in FIG. 17C, which is significantly small compared to the range expressed as $20\le\theta_{b1}\le\theta_e$ [deg] or $\theta_{b1}=45\pm5$ [deg] as described in the present third embodiment.

As described above, with the shape of a connecting surface shown in FIG. 17C in a case where Patent Literature 1 is applied, it is obvious that a tip of a tool bit for processing a mold becomes significantly narrower and therefore is significantly inferior in mold workability compared to the shape of the conical connecting surface according to the present third embodiment shown in FIG. 17D. In addition, it is needless to say that the shape of the conical connecting surface according to the present third embodiment is also superior in transferability and mold releasability during injection molding.

Fourth Embodiment

Figure 18:
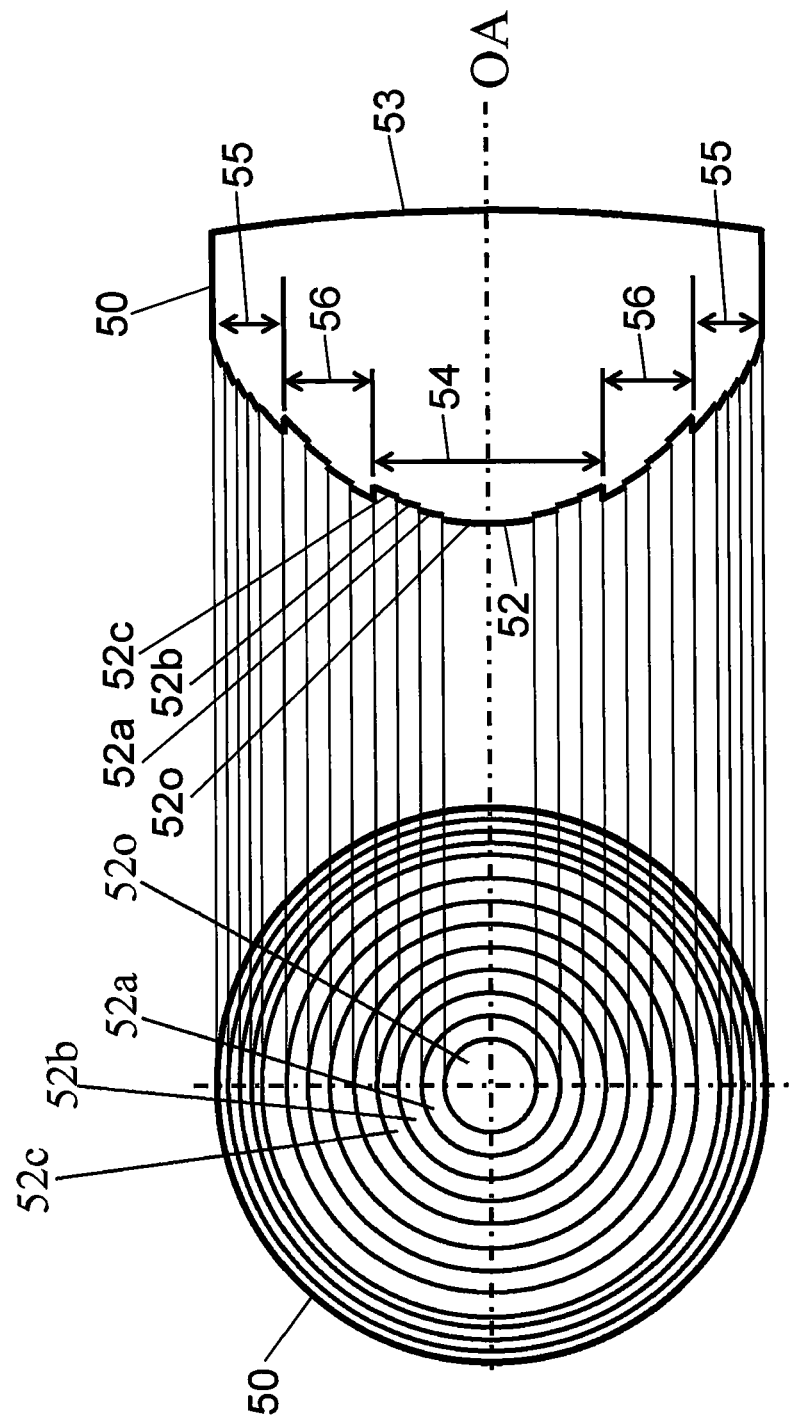
FIG. 18 is a diagram showing a configuration of an objective lens according to a fourth embodiment of the present invention.

FIG. 18 is a diagram showing a configuration of an objective lens according to a fourth embodiment of the present invention. A left-hand side diagram in FIG. 18 is a plan view showing a configuration of a synthetic resin objective lens 50 according to the present fourth embodiment, and a right-hand side diagram in FIG. 18 is a sectional view showing a configuration of the objective lens 50 according to the present fourth embodiment. A lens surface 52 on a light source side (an incidence side of a laser beam) of the objective lens 50 comprises a base aspherical surface. A stair-shaped diffractive structure having a plurality of annular optical surfaces centered around an optical axis OA of the objective lens 50 is formed on the base aspherical surface.

Meanwhile, a lens surface 53 on an optical disk side (an exit side of a laser beam) of the objective lens 50 which opposes the lens surface 52 is configured as a spherical surface or an aspherical surface.

The lens surface 52 has an inner peripheral region 54 including the optical axis of the objective lens 50, an outer peripheral region 55 arranged on an outer peripheral side relative to the inner peripheral region 54, and an middle peripheral region 56 arranged between the inner peripheral region 54 and the outer peripheral region 55. The diffractive structure of the inner peripheral region 54 which is formed on the base aspherical surface of the lens surface 52 comprises a circular optical surface 520 centered around the optical axis OA, and concentric annular optical surfaces 52a, 52b, 52c, . . . provided on an outer side of the circular optical surface 52o. The circular optical surface 52o and the annular optical surfaces 52a, 52b, 52c, . . . themselves which form the diffractive structure are optical surfaces composed of a spherical surface or an aspherical surface. As shown in FIG. 18, in the inner peripheral region 54 including the optical axis and in the middle peripheral region 56, a cross section of the lens surface 52 of the objective lens 50 has an approximately stair shape.

On the other hand, in the outer peripheral region 55 surrounding the middle peripheral region 56, a cross section of the lens surface 52 of the objective lens 50 has an approximately sawtooth shape.

Figure 19:
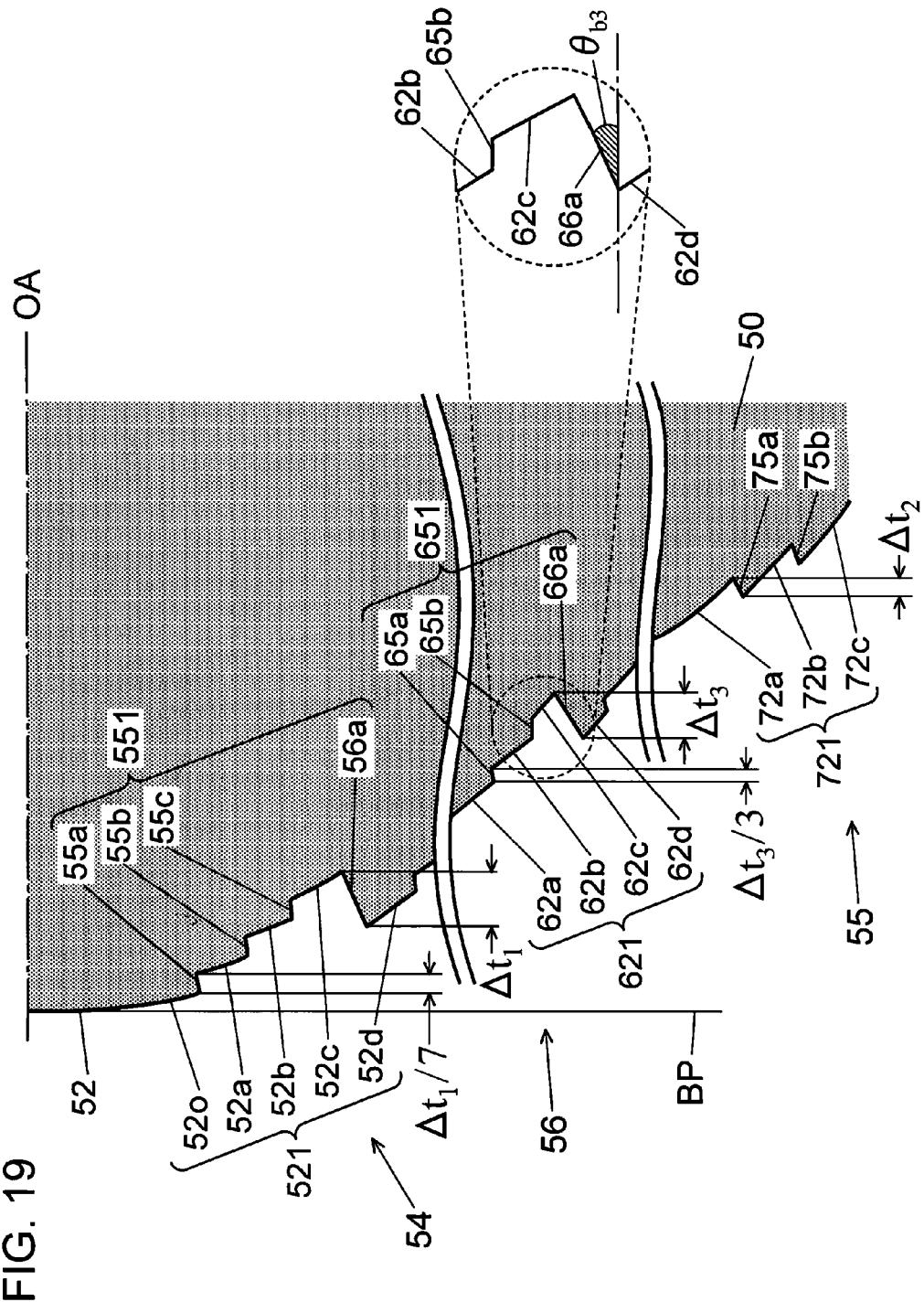
FIG. 19 is a partially enlarged sectional view showing an inner peripheral region, a middle peripheral region, and an outer peripheral region of an objective lens according to the fourth embodiment of the present invention.

FIG. 19 is a partially enlarged sectional view showing the inner peripheral region, the middle peripheral region, and the outer peripheral region of the objective lens according to the fourth embodiment of the present invention.

The inner peripheral region 54 of the lens surface 52 has an optical surface 521 comprising the circular optical surface 520 which is centered around the optical axis OA and which has a circular shape and the plurality of annular optical surfaces 52a, 52b, 52c, 52d, . . . which have approximately stair-shaped cross sections and which are annularly partitioned centered around the optical axis OA of the objective lens 50, and a plurality of connecting surfaces 551 which connect the plurality of mutually adjacent annular optical surfaces to each other.

The plurality of connecting surfaces 551 include at least a cylindrical connecting surface 55b formed of a cylindrical surface centered around the optical axis OA of the objective lens 50, a cylindrical connecting surface 55c formed of a cylindrical surface centered around the optical axis OA of the objective lens 50, and a conical connecting surface 56a formed of a conical surface centered around the optical axis OA of the objective lens 50. The conical connecting surface 56a forms a predetermined angle $\theta_{b1}$ with the optical axis OA of the objective lens 50. In addition, the plurality of annular optical surfaces include at least the annular optical surface 52a, the annular optical surface 52b adjacent to the annular optical surface 52a, the annular optical surface 52c adjacent to the annular optical surface 52b, and the annular optical surface 52d adjacent to the annular optical surface 52c.

Moreover, configurations of the optical surface 521 and the plurality of connecting surfaces 551 are similar to the configurations of the optical surface 221 and the plurality of connecting surfaces 251 according to the second embodiment.

The outer peripheral region 55 of the lens surface 52 has an optical surface 721 formed of a plurality of annular optical surfaces 72a, 72b, 72c, . . . which have approximately sawtooth-shaped cross sections and which are annularly partitioned centered around the optical axis OA of the objective lens 50, and conical connecting surfaces 75a, 75b, . . . which connect the plurality of mutually adjacent annular optical surfaces to each other and which are composed of conical surfaces centered around the optical axis OA of the objective lens 50. The conical connecting surfaces 75a, 75b, . . . all form a predetermined angle $\theta_{b2}$ with the optical axis OA of the objective lens 50.

The plurality of annular optical surfaces include at least the annular optical surface 72a and the annular optical surface 72b that is adjacent to the annular optical surface 72a.

Moreover, configurations of the optical surface 721 and the conical connecting surfaces 75a, 75b, . . . are similar to the configurations of the optical surface 121 and the connecting surfaces 15b, 15c, . . . according to the first embodiment. However, the optical surface 721 does not include the circular optical surface 52o.

The middle peripheral region 56 of the lens surface 52 has an optical surface 621 formed of a plurality of annular optical surfaces 62a, 62b, 62c, 62d, . . . which have approximately stair-shaped cross sections and which are annularly partitioned centered around the optical axis OA of the objective lens 50, and a plurality of connecting surfaces 651 which connect the plurality of mutually adjacent annular optical surfaces to each other.

The plurality of connecting surfaces 651 include at least a cylindrical connecting surface 65a formed of a cylindrical surface centered around the optical axis OA of the objective lens 50, a cylindrical connecting surface 65b formed of a cylindrical surface centered around the optical axis OA of the objective lens 50, and a conical connecting surface 66a formed of a conical surface centered around the optical axis OA of the objective lens 50. The conical connecting surface 66a forms a predetermined angle $\theta_{b3}$ with the optical axis OA of the objective lens 50. In addition, the plurality of annular optical surfaces include at least the annular optical surface 62a, the annular optical surface 62b adjacent to the annular optical surface 62a, the annular optical surface 62c adjacent to the annular optical surface 62b, and the annular optical surface 62d adjacent to the annular optical surface 62c.

The annular optical surface 62a is closer to the optical axis OA of the objective lens 50 than the annular optical surface 62b, the annular optical surface 62b is closer to the optical axis OA of the objective lens 50 than the annular optical surface 62c, and the annular optical surface 62c is closer to the optical axis OA of the objective lens 50 than the annular optical surface 62d.

An interval between the annular optical surface 62b and the reference plane PR is greater than an interval between the annular optical surface 62a and the reference plane PR, an interval between the annular optical surface 62c and the reference plane PR is greater than the interval between the annular optical surface 62a and the reference plane PR, and an interval between the annular optical surface 62d and the reference plane PR is smaller than the interval between the annular optical surface 62c and the reference plane PR.

The cylindrical connecting surface 65a connects the annular optical surface 62a and the annular optical surface 62b, the cylindrical connecting surface 65b connects the annular optical surface 62b and the annular optical surface 62c, and the conical connecting surface 66a connects the annular optical surface 62c and the annular optical surface 62d.

A length of the cylindrical connecting surfaces 65a and 65b in a direction of the optical axis of the objective lens 50 is shorter than a length of the conical connecting surface 66a in the direction of the optical axis of the objective lens 50.

Moreover, in the present embodiment, in the inner peripheral region 54, a length of the cylindrical connecting surfaces 55a, 55b, and 55c in the direction of the optical axis is, for example, ⅐ of a length of the conical connecting surface 56a in the direction of the optical axis, and in the middle peripheral region 56, a length of the cylindrical connecting surfaces 65a and 65b in the direction of the optical axis is, for example, ⅓ of a length of the conical connecting surface 66a in the direction of the optical axis.

Furthermore, configurations of the optical surface 621 and the plurality of connecting surfaces 651 are similar to the configurations of the optical surface 221 and the plurality of connecting surfaces 251 according to the second embodiment. However, the optical surface 621 does not include the circular optical surface 52o.

In addition, in the present embodiment, the inner peripheral region 54 corresponds to an example of a first region, the outer peripheral region 55 corresponds to an example of a second region, the middle peripheral region 56 corresponds to an example of a third region, the annular optical surfaces 62a, 62b, 62c, 62d, . . . correspond to examples of a middle periphery partitioned surface, the optical surface 621 corresponds to an example of a middle periphery optical surface, the plurality of connecting surfaces 651 correspond to an example of a plurality of middle periphery connecting surfaces, the cylindrical connecting surface 65a corresponds to an example of a first middle periphery connecting surface, the cylindrical connecting surface 65b corresponds to an example of a second middle periphery connecting surface, the conical connecting surface 66a corresponds to an example of a third middle periphery connecting surface, the annular optical surface 62a corresponds to an example of a first middle periphery partitioned surface, the annular optical surface 62b corresponds to an example of a second middle periphery partitioned surface, the annular optical surface 62c corresponds to an example of a third middle periphery partitioned surface, and the annular optical surface 62d corresponds to an example of a fourth middle periphery partitioned surface.

The objective lens 50 according to the present fourth embodiment is used as a compatible objective lens that is compatible among, for example, a BD onto which information is recorded or from which information is reproduced using a blue-violet laser beam with a wavelength $\lambda_1$ [μm], a DVD onto which information is recorded or from which information is reproduced using a red laser beam with a wavelength $\lambda_2$ ($\lambda_1 < \lambda_2$) [μm], and a CD onto which information is recorded or from which information is reproduced using an infrared laser beam with a wavelength $\lambda_3$ ($\lambda_2 < \lambda_3$) [μm].

The inner peripheral region 54 shown in FIGS. 18 and 19 is a BD/DVD/CD compatible region and a numerical aperture thereof corresponds to approximately 0.47 to 0.52. In the inner peripheral region 54, the stair-shaped diffractive structure is determined so that a blue-violet laser beam converges on an information recording surface of the BD having a light transmission layer with a thickness of approximately 0.1 mm, a red laser beam converges on an information recording surface of the DVD having a light transmission layer with a thickness of approximately 0.6 mm, and an infrared laser beam converges on an information recording surface of the CD having a light transmission layer with a thickness of approximately 1.2 mm. Moreover, an interval of level differences of the stair-shaped diffractive structure in the direction of the optical axis assumes that one period is constituted by, for example, eight steps, and is determined in consideration of compatibility performances of a BD, a DVD, and a CD as well as a balance in diffraction efficiency among the wavelength $\lambda_1$ [μm], the wavelength $\lambda_2$ [μm], and the wavelength $\lambda_3$ [μm].

For example, a level difference interval ($\Delta t_1/7$) of a cylindrical connecting surface in the inner peripheral region 54 is determined so as to provide a blue-violet laser beam having a wavelength $\lambda_1$ ($\lambda_1$=405 nm) with a light path difference of approximately 1.25×$\lambda_1$ [μm], provide a red laser beam having a wavelength $\lambda_2$ ($\lambda_2$=660 nm) with a light path difference of approximately 0.75×$\lambda_2$ [μm], and provide an infrared laser beam having a wavelength $\lambda_3$ ($\lambda_3$=780 nm) with a light path difference of approximately 0.62×$\lambda_3$ [μm].

In other words, favorably, a length L1 of the cylindrical connecting surfaces 55a, 55b, and 55c in the direction of the optical axis of the objective lens 50 provides a laser beam having a wavelength $\lambda_1$ (0.39 μm≤$\lambda_1$≤0.43 μm) with a phase difference that is equal to or greater than $\lambda_1$, provides a laser beam having a wavelength $\lambda_2$ (0.61 μm≤$\lambda_2$≤0.69 μm) with a phase difference that is equal to or smaller than $\lambda_2$, and provides a laser beam having a wavelength $\lambda_3$ (0.75 μm≤$\lambda_3$≤0.85 μm) with a phase difference that is equal to or smaller than $\lambda_3$. In addition, due to a refractive effect of the base aspherical surface and a diffractive effect of the diffractive structure of the objective lens 50, a laser beam with the wavelength $\lambda_1$, a laser beam with the wavelength $\lambda_2$, and a laser beam with the wavelength $\lambda_3$ incident on the optical surface 521 are all outputted in the direction of the optical axis of the objective lens 50.

Accordingly, since a sawtooth shape in an opposite direction can be approximated by the wavelength $\lambda_1$, the wavelength $\lambda_2$, and the wavelength $\lambda_3$, a diffraction direction of diffracted light which produces maximum diffraction efficiency is reversed and BD-DVD-CD compatibility is facilitated.

The middle peripheral region 56 shown in FIGS. 18 and 19 is a BD/DVD compatible region and a numerical aperture thereof corresponds to approximately 0.60 to 0.65. In the middle peripheral region 56, the stair-shaped diffractive structure is determined so that a blue-violet laser beam converges on an information recording surface of the BD having a light transmission layer with a thickness of approximately 0.1 mm and, at the same time, a red laser beam converges on an information recording surface of the DVD having a light transmission layer with a thickness of approximately 0.6 mm. Moreover, level differences of the stair-shaped diffractive structure in a direction of the optical axis assumes that one period is constituted by, for example, four steps, and is determined in consideration of compatibility performances of a BD and a DVD as well as a balance in diffraction efficiency between the wavelength $\lambda_1$ [μm] and the wavelength $\lambda_2$ [μm].

For example, a level difference interval ($\Delta t_3/3$) of a cylindrical connecting surface of the middle peripheral region 56 is determined so as to provide a blue-violet laser beam having a wavelength $\lambda_1$ ($\lambda_1$=405 nm) with a light path difference of approximately 1.25×$\lambda_1$ [μm], and to provide a red laser beam having a wavelength $\lambda_2$ ($\lambda_2$=660 nm) with a light path difference of approximately 0.75×$\lambda_2$ [μm]. Accordingly, since a sawtooth shape in an opposite direction can be approximated by the wavelength $\lambda_1$ and the wavelength $\lambda_2$, a diffraction direction of diffracted light which produces maximum diffraction efficiency is reversed and BD-DVD compatibility is facilitated.

The outer peripheral region 55 shown in FIGS. 18 and 19 is a BD-only region and a numerical aperture thereof corresponds to approximately 0.85. In the outer peripheral region 55, the sawtooth-shaped diffractive structure is determined so that a blue-violet laser beam converges on an information recording surface of the BD having a light transmission layer with a thickness of approximately 0.1 mm. An interval ($\Delta t_2$) of a level difference of a conical connecting surface in the sawtooth-shaped diffractive structure in the direction of the optical axis is determined so that, for example, a maximum diffraction efficiency is obtained at a wavelength $\lambda_1$ [μm].

Moreover, with the objective lens 50 according to the present fourth embodiment, the interval ($\Delta t_1/7$) of the level differences of the cylindrical connecting surface of the stair-shaped diffractive structure in the inner peripheral region 54 is determined so as to provide a blue-violet laser beam having a wavelength $\lambda_1$ with a light path difference that is equal to or greater than $\lambda_1$, provide a red laser beam having a wavelength $\lambda_2$ with a light path difference that is equal to or smaller than $\lambda_2$, and provide an infrared laser beam having a wavelength $\lambda_3$ with a light path difference that is equal to or smaller than $\lambda_3$. Therefore, a diffraction direction of the blue-violet laser beam with the wavelength $\lambda_1$ is opposite to diffraction directions of the red laser beam with the wavelength $\lambda_2$ and the infrared laser beam with the wavelength $\lambda_3$.

However, since the diffractive structure is formed on the base aspherical surface of the objective lens 50, the blue-violet laser beam having the wavelength $\lambda_1$, the red laser beam having the wavelength $\lambda_2$, and the infrared laser beam having the wavelength $\lambda_3$ are all refracted and diffracted by the lens surface 52 and outputted toward the side of the optical axis OA of the objective lens 50. In other words, the objective lens 50 substantially has a power of a convex lens. Therefore, since the light path of a laser beam of neither of the wavelengths is blocked due to a cylindrical connecting surface with a small level difference interval ($\Delta t_1/7$) being composed of a part of a cylindrical surface having the optical axis OA as an axis of rotation, a decline in diffraction efficiency can be suppressed.

In addition, the interval ($\Delta t_3/3$) of the level differences of the cylindrical connecting surfaces of the stair-shaped diffractive structure of the middle peripheral region 56 is determined so as to provide a blue-violet laser beam having a wavelength $\lambda_1$ with a light path difference that is equal to or greater than $\lambda_1$ and to provide a red laser beam having a wavelength $\lambda_2$ with a light path difference that is equal to or smaller than $\lambda_2$. Therefore, a diffraction direction of the blue-violet laser beam with the wavelength $\lambda_1$ is opposite to a diffraction direction of the red laser beam with the wavelength $\lambda_2$.

However, since the diffractive structure is formed on the base aspherical surface of the objective lens 50, both the blue-violet laser beam having the wavelength $\lambda_1$ and the red laser beam having the wavelength $\lambda_2$ are refracted and diffracted by the lens surface 52 and outputted toward the side of the optical axis OA of the objective lens 50. In other words, the objective lens 50 substantially has a power of a convex lens. Therefore, since the light path of a laser beam of neither of the wavelengths is blocked due to a cylindrical connecting surface with a small level difference interval ($\Delta t_3/3$) being composed of a part of a cylindrical surface having the optical axis OA as an axis of rotation, a decline in diffraction efficiency can be suppressed.

Even according to the configuration of the present fourth embodiment described above, in a similar manner to the third embodiment, in a diffractive structure formed on the base aspherical surface of the objective lens 50, an angle $\theta_{b1}$ formed between a conical connecting surface in the inner peripheral region 54 with a large level difference interval ($\Delta t_1$) among annular connecting surfaces that connect adjacent annular optical surfaces to each other and the optical axis OA of the objective lens 50, an angle $\theta_{b3}$ formed between a conical connecting surface in the middle peripheral region 56 with a large level difference interval ($\Delta t_3$) among annular connecting surfaces that connect adjacent annular optical surfaces to each other and the optical axis OA of the objective lens 50, and an angle $\theta_{b2}$ formed between a conical connecting surface in the outer peripheral region 55 that connects adjacent annular optical surfaces to each other and the optical axis OA of the objective lens 50 are equal to an angle $\theta_e$ formed between a light beam resulting from the refraction and diffraction by the lens surface of a light beam incident parallel to the optical axis OA and the optical axis OA ($\theta_{b1}=\theta_{b2}=\theta_{b3}=\theta_e$), whereby the angle $\theta_e$ is expressed by Expression (8) above.

Moreover, favorably, the angle $\theta_{b1}$ [deg] formed between the conical connecting surface 56a and the optical axis OA of the objective lens 50, the angle $\theta_{b2}$ [deg] formed between the conical connecting surfaces 75a and 75b and the optical axis OA of the objective lens 50, and the angle $\theta_{b3}$ [deg] formed between the conical connecting surface 66a and the optical axis OA of the objective lens 50 are equal to each other.

Alternatively, in a similar manner to the first embodiment, the angle $\theta_e$ may be expressed by Expression (13) above using a lens inclination angle $\theta_r$ of an actual optical surface due to the diffractive structure.

Accordingly, a favorable objective lens can be obtained in which a decline in diffraction efficiency is reduced in a vicinity of an outermost periphery where light intensity loss reaches maximum.

In addition, processing of a mold used for injection molding is facilitated, and chipping of a tip of a tool bit during mold processing can be suppressed. Furthermore, since transferability and mold releasability during injection molding also improve, an objective lens with favorable aberration performance can be obtained.

Moreover, while a case where $\theta_{b1}=\theta_{b2}=\theta_{b3}=\theta_e$ has been described for the objective lens 50 according to the present fourth embodiment, in a range where $0<\theta_{b1}=\theta_{b2}=\theta_{b3}\leq\theta_e$, a favorable objective lens can be obtained in which a decline in diffraction efficiency is reduced in a vicinity of an outermost periphery where light intensity loss substantially reaches maximum. Furthermore, since an excessively fine tip of a tool bit used to process a mold creates a risk of chipping of the tip of the tool bit during mold processing, the angle $\theta_{b1}$, the angle $\theta_{b2}$, and the angle $\theta_{b3}$ are favorably set to 20 [deg] or more.

From the above, in consideration of transferability, mold releasability, mold workability, and the like during injection molding, the angle $\theta_{b1}$, the angle $\theta_{b2}$, and the angle $\theta_{b3}$ formed between annular conical connecting surfaces and the optical axis of the objective lens may be varied as appropriate within a range of $0<\theta_{b1}=\theta_{b2}=\theta_{b3}\leq\theta_e$, and more favorably, within a range of $20\,[\text{deg}]\leq\theta_{b1}=\theta_{b2}=\theta_{b3}\leq\theta_e$.

Moreover, as shown in the second embodiment, by adopting a configuration in which a cylindrical connecting surface with a small level difference interval is parallel to the optical axis, a decline in diffraction efficiency can be suppressed to a certain degree. Therefore, by setting the angle $\theta_{b1}$, the angle $\theta_{b2}$, and the angle $\theta_{b3}$ such that $\theta_{b1}=\theta_{b2}=\theta_{b3}=45\pm5$ [deg], transferability, mold releasability, mold workability, and the like during injection molding become even more favorable, and by placing emphasis on these advantages, an objective lens with favorable aberration performance can be obtained.

In other words, appropriately varying the angles $\theta_{b1}$, $\theta_{b2}$, and $\theta_{b3}$ between annular conical connecting surfaces and the optical axis of the objective lens within a range expressed as $\theta_{b1}=\theta_{b2}=\theta_{b3}=45\pm5$ [deg] is also within a scope of application of the present invention.

Fifth Embodiment

Figure 20:
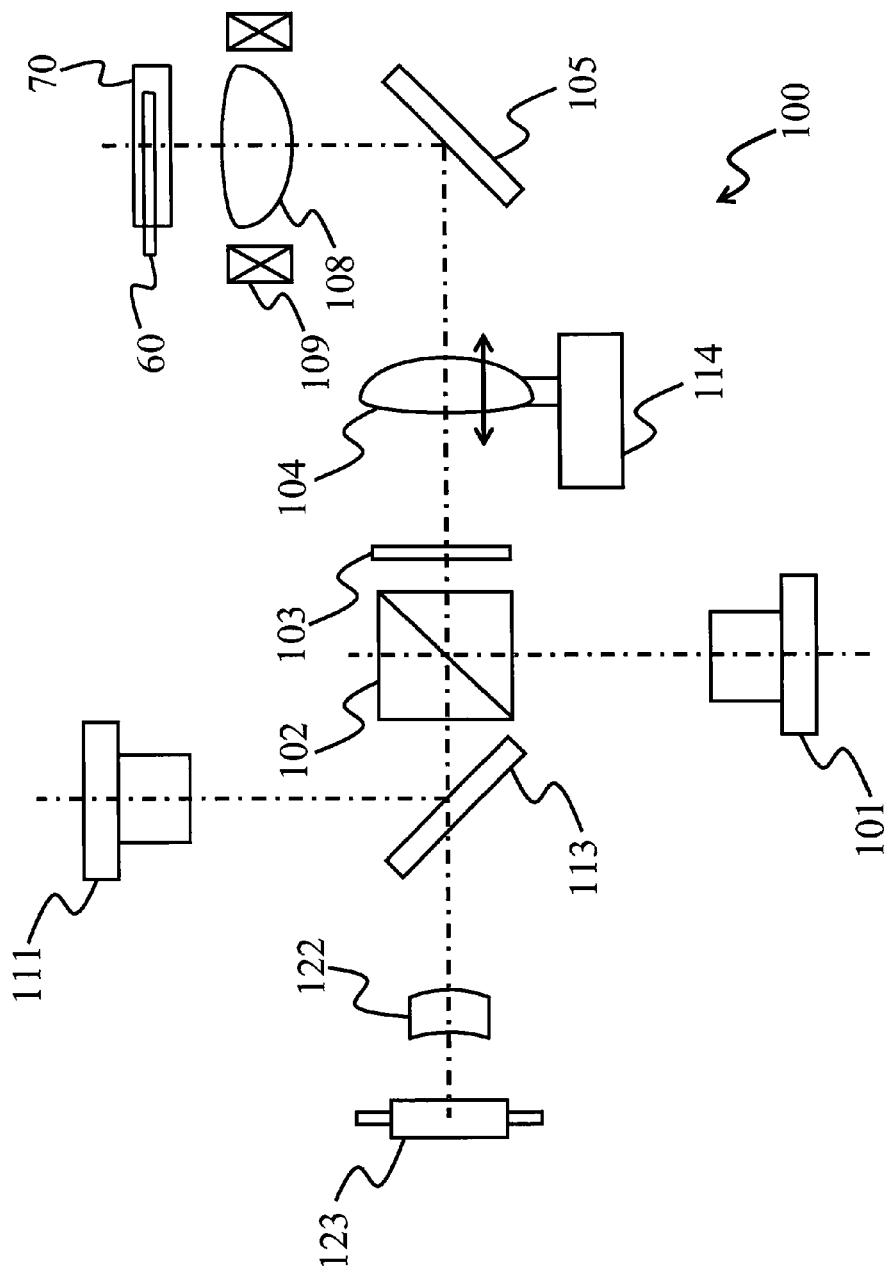
FIG. 20 is a diagram showing a schematic configuration of an optical head according to a fifth embodiment of the present invention.

FIG. 20 is a diagram showing a schematic configuration of an optical head according to a fifth embodiment of the present invention.

In FIG. 20, an optical head 100 comprises a blue-violet laser light source 101 that outputs a blue-violet laser beam, a polarization beam splitter 102, a quarter wavelength plate 103, a collimating lens 104, a mirror 105, an objective lens 108, an objective lens actuator 109, a red laser light source 111 that outputs a red laser beam, a flat plate beam splitter 113, a collimating lens actuator 114, a detection lens 122, and a light receiving element 123. In addition, information is recorded onto or reproduced from a BD 60 by a blue-violet laser beam, and information is recorded onto or reproduced from a DVD 70 by a red laser beam.

First, an operation of the optical head 100 when information is recorded onto or reproduced from the BD 60 will be described. A blue-violet laser beam having a wavelength of approximately 405 nm which is outputted from the blue-violet laser light source 101 is incident on the polarization beam splitter 102 as s-polarized light. The blue-violet laser beam reflected by the polarization beam splitter 102 is converted into circular polarized light by the quarter wavelength plate 103 and then converted into approximately parallel light by the collimating lens 104. The optical axis of the blue-violet laser beam converted into approximately parallel light is bent as the blue-violet laser beam is reflected by the mirror 105. The objective lens 108 causes the blue-violet laser beam reflected by the mirror 105 to converge as an optical spot onto an information recording surface of the BD 60.

The blue-violet laser beam reflected by the information recording surface of the BD 60 is once again transmitted through the objective lens 108 and is reflected by the mirror 105. The blue-violet laser beam reflected by the mirror 105 is transmitted through the collimating lens 104 and then converted by the quarter wavelength plate 103 into linear polarized light that differs from the inward light. Subsequently, the blue-violet laser beam is incident on the polarization beam splitter 102 and the flat plate beam splitter 113 as p-polarized light. The blue-violet laser beam transmitted through the polarization beam splitter 102 and the flat plate beam splitter 113 is guided to the light receiving element 123 via the detection lens 122. The light receiving element 123 photoelectrically converts the detected blue-violet laser beam and generates a focus error signal for tracking an axial runout of the BD 60 and a tracking error signal for tracking an eccentricity of the BD 60.

Next, an operation of the optical head 100 when information is recorded onto or reproduced from the DVD 70 will be described. A red laser beam having a wavelength of approximately 660 nm which is outputted from the red laser light source 111 is incident on the flat plate beam splitter 113 as s-polarized light. The red laser beam reflected by the flat plate beam splitter 113 is transmitted through the polarization beam splitter 102, converted into circular polarized light by the quarter wavelength plate 103, and then converted into approximately parallel light by the collimating lens 104. The optical axis of the red laser beam converted into approximately parallel light is bent as the red laser beam is reflected by the mirror 105. The objective lens 108 causes the red laser beam reflected by the mirror 105 to converge as an optical spot onto an information recording surface of the DVD 70.

The red laser beam reflected by the information recording surface of the DVD 70 is once again transmitted through the objective lens 108 and is reflected by the mirror 105. The red laser beam reflected by the mirror 105 is transmitted through the collimating lens 104 and then converted by the quarter wavelength plate 103 into linear polarized light that differs from the inward light. Subsequently, the red laser beam is incident on the polarization beam splitter 102 and the flat plate beam splitter 113 as p-polarized light. The red laser beam transmitted through the polarization beam splitter 102 and the flat plate beam splitter 113 is guided to the light receiving element 123 via the detection lens 122. The light receiving element 123 photoelectrically converts the detected red laser beam and generates a focus error signal for tracking an axial runout of the DVD 70 and a tracking error signal for tracking an eccentricity of the DVD 70.

The objective lens 108 according to the present fifth embodiment is, for example, the compatible objective lens 30 shown in the third embodiment. The objective lens 108 comprises a diffractive structure which uses a difference in wavelengths to respectively condense, as minute optical spots, a blue-violet laser beam for recording information onto or reproducing information from the BD 60 and a red laser beam for recording information onto or reproducing information from the DVD 70.

An objective lens holder (a movable part) that retains the objective lens 108 is supported by a plurality of suspension wires. Using the focus error signal and the tracking error signal, the objective lens actuator 109 drives the objective lens 108 in two axial directions (a focusing direction and a tracking direction) so that an optical spot tracks an information track of the rotating BD 60 or DVD 70. Moreover, the objective lens actuator 109 may be structured so as to be capable of tilting the objective lens 108 in a radial direction of the optical disk in addition to producing displacements in the focusing direction and the tracking direction.

Due to the collimating lens actuator 114, the collimating lens 104 is movable in a direction of an optical axis of the collimating lens 104. By moving the collimating lens 104 toward a side of a light source relative to a reference position at which an outgoing beam of the collimating lens 104 becomes approximately parallel light, the outgoing beam of the collimating lens 104 becomes diverging light. In addition, by moving the collimating lens 104 toward a side of the objective lens relative to the reference position, the outgoing beam of the collimating lens 104 becomes converging light. The collimating lens actuator 114 corrects spherical aberrations of the BD 60 and the DVD 70 by moving the collimating lens 104 in accordance with a thickness of a light transmission layer of an information recording surface.

Moreover, information may be recorded onto or reproduced from the BD 60 and/or the DVD 70 by moving the collimating lens 104 to a predetermined position in the direction of the optical axis in order to configure an outgoing beam of the collimating lens 104 as converging light with a predetermined angle of convergence or as diverging light with a predetermined angle of divergence.

Since the optical head 100 according to the present fifth embodiment comprises the compatible objective lens described in the third embodiment, a decline in diffraction efficiency does not occur in a vicinity of an outermost periphery where light intensity loss reaches maximum, and information can be favorably recorded onto or reproduced from the BD 60 and the DVD 70.

In addition, processing of a mold used for injection molding of the objective lens is facilitated, and chipping of a tip of a tool bit during mold processing can be suppressed. Furthermore, since transferability and mold releasability during injection molding are also improved, an objective lens with favorable aberration performance can be obtained, and information can be favorably recorded onto or reproduced from the BD 60 and the DVD 70.

While the present fifth embodiment describes a case where the objective lens 108 is the compatible objective lens shown in the third embodiment, the present invention is not limited to such a configuration.

For example, the optical head 100 may comprise a dual wavelength light source that outputs a red laser beam and an infrared laser beam in place of the red laser light source 111, and the objective lens 108 may be the synthetic resin objective lens 50 shown in the fourth embodiment which is compatible among a BD onto which information is recorded or from which information is reproduced using a blue-violet laser beam, a DVD onto which information is recorded or from which information is reproduced using a red laser beam, and a CD onto which information is recorded or from which information is reproduced using an infrared laser beam. In this case, in a similar manner to the present fifth embodiment, a decline in diffraction efficiency does not occur in a vicinity of an outermost periphery where light intensity loss reaches maximum, processing of a mold used for injection molding is facilitated, and chipping of a tip of a tool bit during mold processing can be suppressed. Furthermore, since transferability and mold releasability during injection molding are also improved, an objective lens with favorable aberration performance can be obtained, and information can be respectively recorded onto or reproduced from the BD, the DVD, and the CD in a favorable manner.

Furthermore, the optical head 100 may only comprise a blue-violet laser light source that outputs a blue-violet laser beam, and the objective lens 108 may be the synthetic resin objective lens 10 or 20 shown in the first embodiment or the second embodiment. Even in these cases, a decline in diffraction efficiency does not occur in a vicinity of an outermost periphery where light intensity loss reaches maximum, processing of a mold used for injection molding is facilitated, and chipping of a tip of a tool bit during mold processing can be suppressed. Furthermore, since transferability and mold releasability during injection molding are also improved, an objective lens with favorable aberration performance can be obtained, and a significant advantage can obviously be achieved such as being able to record or reproduce information onto or from a BD in a favorable manner.

Sixth Embodiment

Figure 21:
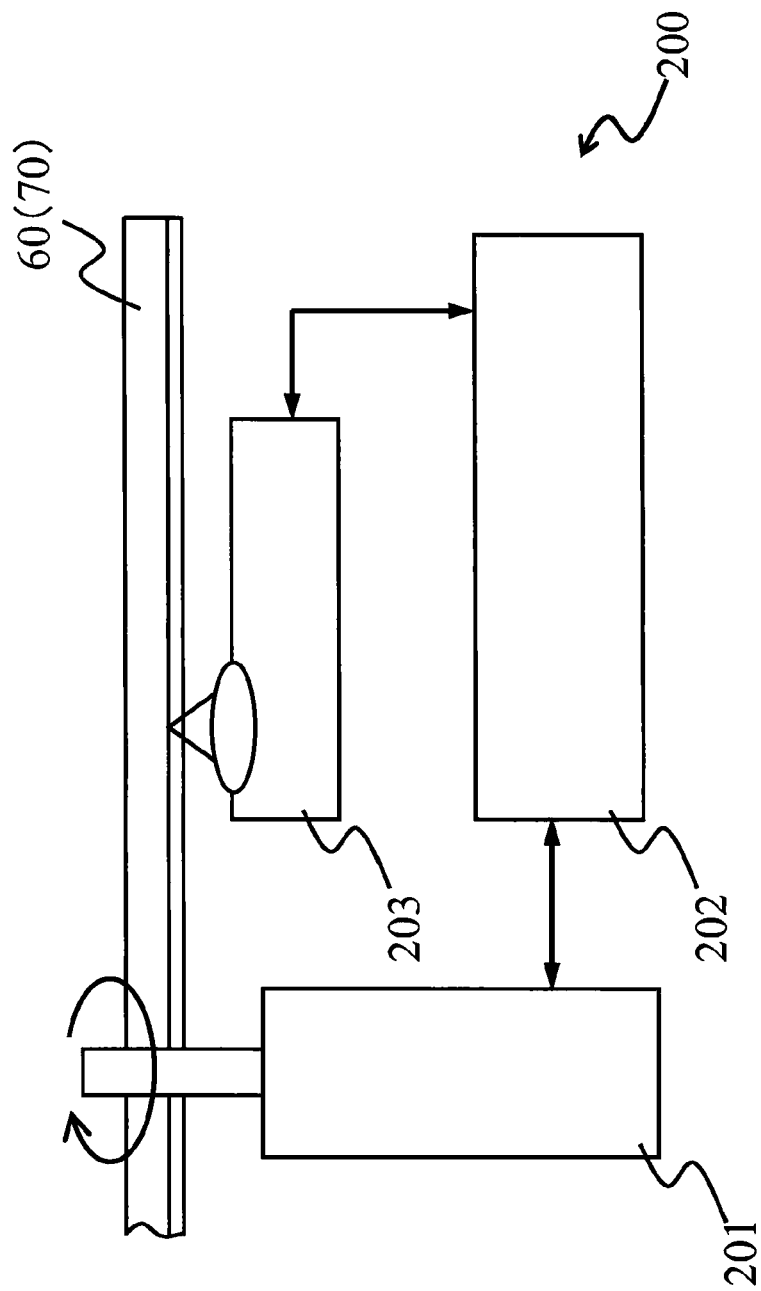
FIG. 21 is a diagram showing a schematic configuration of an optical disk device according to a sixth embodiment of the present invention.

FIG. 21 is a diagram showing a schematic configuration of an optical disk device according to a sixth embodiment of the present invention.

In FIG. 21, an optical disk device 200 comprises an optical disk driving unit 201, a control unit 202, and an optical head 203.

The optical disk driving unit 201 rotationally drives a BD 60 (or a DVD 70). The optical head 203 is the optical head 100 described in the fifth embodiment. The control unit 202 controls the optical disk driving unit 201 and driving of the optical head 203, and also performs signal processing of control signals and information signals photoelectrically converted by the optical head 203. In addition, the control unit 202 is equipped with a function that interfaces information signals between outside and inside of the optical disk device 200.

The control unit 202 receives a control signal obtained from the optical head 203, and based on the control signal, performs focusing control, tracking control, information reproduction control, and rotation control of the optical disk driving unit 201. In addition, the control unit 202 reproduces information based on an information signal, and transmits a recording signal to the optical head 203.

Since the optical disk device 200 is mounted with the optical head 100 described in the fifth embodiment, the optical disk device 200 according to the present sixth embodiment enables information to be recorded on or reproduced from the BD 60 and the DVD 70 in a favorable manner.

In addition, the optical disk device 200 may comprise an optical head equipped with the synthetic resin objective lens 50 described in the fourth embodiment which is compatible among a BD onto which information is recorded or from which information is reproduced using a blue-violet laser beam, a DVD onto which information is recorded or from which information is reproduced using a red laser beam, and a CD onto which information is recorded or from which information is reproduced using an infrared laser beam. In this case, information can be respectively recorded onto or reproduced from the BD, the DVD, and the CD in a favorable manner.

Furthermore, the optical disk device 200 may comprise an optical head equipped with the synthetic resin objective lens 10 or 20 shown in the first embodiment or the second embodiment. In this case, a decline in diffraction efficiency does not occur in a vicinity of an outermost periphery where light intensity loss reaches maximum, processing of a mold used for injection molding is facilitated, and chipping of a tip of a tool bit during mold processing can be suppressed. Furthermore, since transferability and mold releasability during injection molding are also improved, an objective lens with favorable aberration performance can be obtained, and a significant advantage can be achieved such as being able to record or reproduce information onto or from a BD in a favorable manner.

Moreover, the specific embodiments described above mainly include an invention configured as described below.

An objective lens according to an aspect of the present invention is an objective lens used in an optical head which records information onto or reproduces information from an information recording medium, wherein at least one surface of the objective lens includes an optical surface formed of a plurality of partitioned surfaces including an approximately stair-shaped cross section and annularly partitioned centered around an optical axis of the objective lens, and a plurality of connecting surfaces that connect the plurality of mutually adjacent partitioned surfaces to each other, the plurality of connecting surfaces include a first connecting surface formed of a cylindrical surface centered around the optical axis of the objective lens, a second connecting surface formed of a cylindrical surface centered around the optical axis of the objective lens, and a third connecting surface formed of a conical surface centered around the optical axis of the objective lens, the plurality of partitioned surfaces include a first partitioned surface, a second partitioned surface adjacent to the first partitioned surface, a third partitioned surface adjacent to the second partitioned surface, and a fourth partitioned surface adjacent to the third partitioned surface, the first partitioned surface is closer to the optical axis of the objective lens than the second partitioned surface, the second partitioned surface is closer to the optical axis of the objective lens than the third partitioned surface, the third partitioned surface is closer to the optical axis of the objective lens than the fourth partitioned surface, when a plane in contact with the optical surface at an intersection of the optical surface and the optical axis of the objective lens is assumed as a reference plane, an interval between the second partitioned surface and the reference plane is greater than an interval between the first partitioned surface and the reference plane, an interval between the third partitioned surface and the reference plane is greater than the interval between the second partitioned surface and the reference plane, an interval between the fourth partitioned surface and the reference plane is smaller than the interval between the third partitioned surface and the reference plane, the first connecting surface connects the first partitioned surface and the second partitioned surface, the second connecting surface connects the second partitioned surface and the third partitioned surface, and the third connecting surface connects the third partitioned surface and the fourth partitioned surface.

According to this configuration, at least one surface of the objective lens includes an optical surface formed of a plurality of partitioned surfaces including an approximately stair-shaped cross section and annularly partitioned centered around an optical axis of the objective lens, and a plurality of connecting surfaces that connect the plurality of mutually adjacent partitioned surfaces to each other. The plurality of connecting surfaces include a first connecting surface formed of a cylindrical surface centered around the optical axis of the objective lens, a second connecting surface formed of a cylindrical surface centered around the optical axis of the objective lens, and a third connecting surface formed of a conical surface centered around the optical axis of the objective lens. The plurality of partitioned surfaces include a first partitioned surface, a second partitioned surface adjacent to the first partitioned surface, a third partitioned surface adjacent to the second partitioned surface, and a fourth partitioned surface adjacent to the third partitioned surface. The first partitioned surface is closer to the optical axis of the objective lens than the second partitioned surface, the second partitioned surface is closer to the optical axis of the objective lens than the third partitioned surface, and the third partitioned surface is closer to the optical axis of the objective lens than the fourth partitioned surface. A flat surface in contact with the optical surface at an intersection of the optical surface and the optical axis of the objective lens is now assumed as a reference plane. An interval between the second partitioned surface and the reference plane is greater than an interval between the first partitioned surface and the reference plane, an interval between the third partitioned surface and the reference plane is greater than the interval between the second partitioned surface and the reference plane, and an interval between the fourth partitioned surface and the reference plane is smaller than the interval between the third partitioned surface and the reference plane. The first connecting surface connects the first partitioned surface and the second partitioned surface, the second connecting surface connects the second partitioned surface and the third partitioned surface, and the third connecting surface connects the third partitioned surface and the fourth partitioned surface.

Therefore, since the third partitioned surface and the fourth partitioned surface are connected by the third connecting surface formed of a conical surface centered around the optical axis of the objective lens and a light path is not blocked when a light beam incident in a vicinity of an outermost periphery of an active region of the objective lens is refracted and diffracted by the lens surface, diffraction efficiency in the vicinity of the outermost periphery of the active region of the objective lens can be improved and light intensity loss can be suppressed.

In addition, in the objective lens described above, favorably, a length of each of the first connecting surface and the second connecting surface in a direction of the optical axis of the objective lens is shorter than a length of the third connecting surface in the direction of the optical axis of the objective lens.

According to this configuration, since the length of the third connecting surface in the direction of the optical axis of the objective lens is longer than the length of each of the first connecting surface and the second connecting surface in the direction of the optical axis of the objective lens, the interval between the fourth partitioned surface and the reference plane can be set shorter than the interval between the third partitioned surface and the reference plane.

Furthermore, in the objective lens described above, favorably, the objective lens has a numerical aperture of 0.8 or higher and is made of synthetic resin, the optical surface has a diffractive structure with an approximately stair-shaped cross section, and an angle $\theta_b$ [deg] formed between the third connecting surface and the optical axis of the objective lens satisfies Expression (22) below.

$$0 < \theta_b \leq \theta - \sin^{-1}\left(\frac{(\sin\theta - m\lambda_1/d)}{n}\right) \quad (22)$$

In Expression (22), $\lambda_1$ [μm] denotes a light source wavelength of a laser beam incident on the objective lens, n denotes a refractive index of the objective lens at the wavelength $\lambda_1$, $\theta$ [deg] denotes a lens inclination angle of a base aspherical surface at an outermost periphery of an active region of the objective lens, d [μm] denotes a pitch of one period of the diffractive structure in a direction perpendicular to the optical axis, and m denotes a diffraction order of diffracted light that is a main component of the laser beam with the wavelength $\lambda_1$ that is generated by the diffractive structure.

According to this configuration, since the angle $\theta_b$ formed between the third connecting surface and the optical axis of the objective lens becomes equal to or smaller than an angle formed between a light beam resulting from a refraction and a diffraction by the lens surface of a light beam incident parallel to the optical axis, diffraction efficiency can be improved in a vicinity of an outermost periphery of an active region of the objective lens and light intensity loss can be suppressed.

Furthermore, in the objective lens described above, favorably, the objective lens has a numerical aperture of 0.8 or higher and is made of synthetic resin, the optical surface has a diffractive structure with an approximately stair-shaped cross section, and an angle $\theta_b$ [deg] formed between the third connecting surface and the optical axis of the objective lens satisfies Expression (23) below.

$$20 \leq \theta_b \leq \theta - \sin^{-1}\left(\frac{(\sin\theta - m\lambda_1/d)}{n}\right) \quad (23)$$

In Expression (23), $\lambda_1$ [μm] denotes a light source wavelength of a laser beam incident on the objective lens, n denotes a refractive index of the objective lens at the wavelength $\lambda_1$, $\theta$ [deg] denotes a lens inclination angle of a base aspherical surface at an outermost periphery of an active region of the objective lens, d [μm] denotes a pitch of one period of the diffractive structure in a direction perpendicular to the optical axis, and m denotes a diffraction order of diffracted light that is a main component of the laser beam with the wavelength $\lambda_1$ that is generated by the diffractive structure.

According to this configuration, since the angle $\theta_b$ formed between the third connecting surface and the optical axis of the objective lens becomes equal to or larger than 20 [deg], transferability, mold releasability, and mold workability during injection molding can be further improved.

In addition, in the objective lens described above, favorably, the objective lens has a numerical aperture of 0.8 or higher and is made of synthetic resin, the optical surface has a diffractive structure with an approximately stair-shaped cross section, and an angle $\theta_b$ [deg] formed between the third connecting surface and the optical axis of the objective lens satisfies $\theta_b = 45 \pm 5$.

According to this configuration, by setting the angle $\theta_b$ formed between the third connecting surface and the optical axis of the objective lens to 45±5 [deg], workability of a tool bit itself for processing a mold can be improved and chipping of a tip of the tool bit during mold processing can also be reduced.

Furthermore, in the objective lens described above, favorably, at least one surface of the objective lens includes a first region including the optical axis of the objective lens and a second region arranged on an outer peripheral side relative to the first region, wherein the first region includes the optical surface and the plurality of connecting surfaces, and the second region includes an outer periphery optical surface formed of a plurality of outer periphery partitioned surfaces including an approximately sawtooth-shaped cross section and annularly partitioned centered around the optical axis of the objective lens, and an outer periphery connecting surface which connects the plurality of mutually adjacent outer periphery partitioned surfaces to each other and which is formed of a conical surface centered around the optical axis of the objective lens.

According to this configuration, at least one surface of the objective lens includes a first region including the optical axis of the objective lens and a second region arranged on an outer peripheral side relative to the first region. The first region includes the optical surface and the plurality of connecting surfaces. The second region includes an outer periphery optical surface formed of a plurality of outer periphery partitioned surfaces including an approximately sawtooth-shaped cross section and annularly partitioned centered around the optical axis of the objective lens, and an outer periphery connecting surface which connects the plurality of mutually adjacent outer periphery partitioned surfaces to each other and which is formed of a conical surface centered around the optical axis of the objective lens.

Therefore, since diffractive structures differ between the first region and the second region, an objective lens can be provided which is compatible between at least two types of information recording media onto which information is recorded or from which information is reproduced by light of at least two wavelengths that differ from each other.

In addition, in the objective lens described above, favorably, the plurality of outer periphery partitioned surfaces include a first outer periphery partitioned surface and a second outer periphery partitioned surface adjacent to the first outer periphery partitioned surface, the first outer periphery partitioned surface is closer to the optical axis of the objective lens than the second outer periphery partitioned surface, an interval between the second outer periphery partitioned surface and the reference plane is greater than an interval between the first outer periphery partitioned surface and the reference plane, and the first outer periphery partitioned surface and the second outer periphery partitioned surface are connected by the outer periphery connecting surface.

According to this configuration, the plurality of outer periphery partitioned surfaces include a first outer periphery partitioned surface and a second outer periphery partitioned surface adjacent to the first outer periphery partitioned surface. The first outer periphery partitioned surface is closer to the optical axis of the objective lens than the second outer periphery partitioned surface. An interval between the second outer periphery partitioned surface and the reference plane is greater than an interval between the first outer periphery partitioned surface and the reference plane. The first outer periphery partitioned surface and the second outer periphery partitioned surface are connected by the outer periphery connecting surface.

Therefore, since the first outer periphery partitioned surface and the second outer periphery partitioned surface are connected by the outer periphery connecting surface formed of a conical surface centered around the optical axis of the objective lens and a light path is not blocked when a light beam incident in a vicinity of an outermost periphery of an active region of the objective lens is refracted and diffracted by the lens surface, diffraction efficiency in the vicinity of the outermost periphery of the active region of the objective lens can be improved and light intensity loss can be suppressed.

Furthermore, in the objective lens described above, favorably, an angle $\theta_{b1}$ [deg] formed between the third connecting surface and the optical axis of the objective lens is equal to an angle $\theta_{b2}$ [deg] formed between the outer periphery connecting surface and the optical axis of the objective lens.

According to this configuration, an angle $\theta_{b1}$ [deg] formed between the third connecting surface and the optical axis of the objective lens is equal to an angle $\theta_{b2}$ [deg] formed between the outer periphery connecting surface and the optical axis of the objective lens. Therefore, since a mold can be fabricated without having to alter a blade edge angle of a tool bit for processing the mold, mold workability can be improved.

Furthermore, in the objective lens described above, favorably, the objective lens has a numerical aperture of 0.8 or higher and is made of synthetic resin, the outer periphery optical surface has a diffractive structure with an approximately sawtooth-shaped cross section, and an angle $\theta_{b2}$ [deg] formed between the outer periphery connecting surface and the optical axis of the objective lens satisfies Expression (24) below.

$$0 < \theta_{b2} \leq \theta - \sin^{-1}\left(\frac{(\sin\theta - m\lambda_1/d)}{n}\right) \quad (24)$$

In Expression (24), $\lambda_1$ [μm] denotes a light source wavelength of a laser beam incident on the objective lens, n denotes a refractive index of the objective lens at the wavelength $\lambda_1$, $\theta$ [deg] denotes a lens inclination angle of a base aspherical surface at an outermost periphery of an active region of the objective lens, d [μm] denotes a pitch of one period of the diffractive structure in a direction perpendicular to the optical axis, and m denotes a diffraction order of diffracted light that is a main component of the laser beam with the wavelength $\lambda_1$ that is generated by the diffractive structure.

According to this configuration, since the angle $\theta_{b2}$ formed between the outer periphery connecting surface and the optical axis of the objective lens becomes equal to or smaller than an angle formed between a light beam resulting from a refraction and a diffraction by the lens surface of a light beam incident parallel to the optical axis, diffraction efficiency can be improved in a vicinity of an outermost periphery of an active region of the objective lens and light intensity loss can be suppressed.

Furthermore, in the objective lens described above, favorably, the objective lens has a numerical aperture of 0.8 or higher and is made of synthetic resin, the outer periphery optical surface has a diffractive structure with an approximately sawtooth-shaped cross section, and an angle $\theta_{b2}$ [deg] formed between the outer periphery connecting surface and the optical axis of the objective lens satisfies Expression (25) below.

$$0 < \theta_{b2} \leq \theta_r - \sin^{-1}\left(\frac{\sin\theta_r}{n}\right) \quad (25)$$

In Expression (25), $\theta_r$ [deg] denotes a lens inclination angle of the outer periphery partitioned surface at an outermost periphery of an active region of the objective lens, and n denotes a refractive index of the objective lens at a light source wavelength of a laser beam incident on the objective lens.

According to this configuration, the angle $\theta_{b2}$ formed between the outer periphery connecting surface and the optical axis of the objective lens can be defined using the lens inclination angle $\theta_r$ of the outer periphery partitioned surface at an outermost periphery of the active region of the objective lens.

Furthermore, in the objective lens described above, favorably, the objective lens has a numerical aperture of 0.8 or higher and is made of synthetic resin, the outer periphery optical surface has a diffractive structure with an approximately sawtooth-shaped cross section, and an angle $\theta_{b2}$ [deg] formed between the outer periphery connecting surface and the optical axis of the objective lens satisfies Expression (26) below.

$$20 \le \theta_{b2} \le \theta - \sin^{-1}\left(\frac{(\sin\theta - m\lambda_1/d)}{n}\right) \quad (26)$$

In Expression (26), $\lambda_1$ [μm] denotes a light source wavelength of a laser beam incident on the objective lens, n denotes a refractive index of the objective lens at the wavelength $\lambda_1$, $\theta$ [deg] denotes a lens inclination angle of a base aspherical surface at an outermost periphery of an active region of the objective lens, d [μm] denotes a pitch of one period of the diffractive structure in a direction perpendicular to the optical axis, and m denotes a diffraction order of diffracted light that is a main component of the laser beam with the wavelength $\lambda_1$ that is generated by the diffractive structure.

According to this configuration, since the angle $\theta_{b2}$ formed between the outer periphery connecting surface and the optical axis of the objective lens becomes equal to or larger than 20 [deg], transferability, mold releasability, and mold workability during injection molding can be further improved.

Furthermore, in the objective lens described above, favorably, the objective lens has a numerical aperture of 0.8 or higher and is made of synthetic resin, the outer periphery optical surface has a diffractive structure with an approximately sawtooth-shaped cross section, and an angle $\theta_{b2}$ [deg] formed between the outer periphery connecting surface and the optical axis of the objective lens satisfies $\theta_{b2}=45\pm5$.

According to this configuration, by setting the angle $\theta_{b2}$ formed between the outer periphery connecting surface and the optical axis of the objective lens to 45±5 [deg], workability of a tool bit itself for processing a mold can be improved and chipping of a tip of the tool bit during mold processing can also be reduced.

In addition, in the objective lens described above, favorably, a length of each of the first connecting surface and the second connecting surface in a direction of the optical axis of the objective lens provides a laser beam having a wavelength $\lambda_1$ (0.39 μm≤$\lambda_1$≤0.43 μm) with a phase difference that is equal to or greater than $\lambda_1$, and provides a laser beam having a wavelength $\lambda_2$ (0.61 μm≤$\lambda_2$≤0.69 μm) with a phase difference that is equal to or smaller than $\lambda_2$, and the laser beam with the wavelength $\lambda_1$ and the laser beam with the wavelength $\lambda_2$ incident on the optical surface are both outputted in the direction of the optical axis of the objective lens due to a refractive effect of a base aspherical surface and a diffractive effect of the diffractive structure of the objective lens.

According to this configuration, the length of each of the first connecting surface and the second connecting surface in the direction of the optical axis of the objective lens provides a laser beam having a wavelength $\lambda_1$ (0.39 μm≤$\lambda_1$≤0.43 μm) with a phase difference that is equal to or greater than $\lambda_1$, and provides a laser beam having a wavelength $\lambda_2$ (0.61 μm≤$\lambda_2$≤0.69 μm) with a phase difference that is equal to or smaller than $\lambda_2$. In addition, the laser beam with the wavelength $\lambda_1$ and the laser beam with the wavelength $\lambda_2$ incident on the optical surface are both outputted in the direction of the optical axis of the objective lens due to a refractive effect of the base aspherical surface and a diffractive effect of the diffractive structure of the objective lens.

As a result, an objective lens can be provided which is compatible between an information recording surface onto which information is recorded or from which information is reproduced by a laser beam having a wavelength $\lambda_1$ (0.39 μm≤$\lambda_1$≤0.43 μm) and an information recording surface onto which information is recorded or from which information is reproduced by a laser beam having a wavelength $\lambda_2$ (0.61 μm≤$\lambda_2$≤0.69 μm).

Furthermore, in the objective lens described above, favorably, the second region is adjacent to the first region.

According to this configuration, since the second region is adjacent to the first region, an objective lens can be provided which is compatible between two types of information recording media onto which information is recorded or from which information is reproduced by light of two wavelengths that differ from each other.

In addition, in the objective lens described above, favorably, at least one surface of the objective lens further includes a third region arranged between the first region and the second region, the third region includes a middle periphery optical surface formed of a plurality of middle periphery partitioned surfaces including an approximately stair-shaped cross section and annularly partitioned centered around the optical axis of the objective lens, and a plurality of middle periphery connecting surfaces which connect the plurality of mutually adjacent middle periphery partitioned surfaces to each other, and the plurality of middle periphery connecting surfaces include a first middle periphery connecting surface formed of a cylindrical surface centered around the optical axis of the objective lens, a second middle periphery connecting surface formed of a cylindrical surface centered around the optical axis of the objective lens, and a third middle periphery connecting surface formed of a conical surface centered around the optical axis of the objective lens.

According to this configuration, at least one surface of the objective lens further includes a third region arranged between the first region and the second region. The third region includes a middle periphery optical surface formed of a plurality of middle periphery partitioned surfaces including an approximately stair-shaped cross section and annularly partitioned centered around the optical axis of the objective lens, and a plurality of middle periphery connecting surfaces which connect the plurality of mutually adjacent middle periphery partitioned surfaces to each other. The plurality of middle periphery connecting surfaces include a first middle periphery connecting surface formed of a cylindrical surface centered around the optical axis of the objective lens, a second middle periphery connecting surface formed of a cylindrical surface centered around the optical axis of the objective lens, and a third middle periphery connecting surface formed of a conical surface centered around the optical axis of the objective lens.

Therefore, since diffractive structures differ among the first region, the second region, and the third region, an objective lens can be provided which is compatible between three types of information recording media onto which information is recorded or from which information is reproduced by light of three wavelengths that differ from each other.

Furthermore, in the objective lens described above, favorably, the plurality of middle periphery partitioned surfaces include a first middle periphery partitioned surface, a second middle periphery partitioned surface adjacent to the first middle periphery partitioned surface, a third middle periphery partitioned surface adjacent to the second middle periphery partitioned surface, and a fourth middle periphery partitioned surface adjacent to the third middle periphery partitioned surface, the first middle periphery partitioned surface is closer to the optical axis of the objective lens than the second middle periphery partitioned surface, the second middle periphery partitioned surface is closer to the optical axis of the objective lens than the third middle periphery partitioned surface, the third middle periphery partitioned surface is closer to the optical axis of the objective lens than the fourth middle periphery partitioned surface, an interval between the second middle periphery partitioned surface and the reference plane is greater than an interval between the first middle periphery partitioned surface and the reference plane, an interval between the third middle periphery partitioned surface and the reference plane is greater than the interval between the second middle periphery partitioned surface and the reference plane, an interval between the fourth middle periphery partitioned surface and the reference plane is smaller than the interval between the third middle periphery partitioned surface and the reference plane, the first middle periphery connecting surface connects the first middle periphery partitioned surface and the second middle periphery partitioned surface, the second middle periphery connecting surface connects the second middle periphery partitioned surface and the third middle periphery partitioned surface, and the third middle periphery connecting surface connects the third middle periphery partitioned surface and the fourth middle periphery partitioned surface.

According to this configuration, the plurality of middle periphery partitioned surfaces include a first middle periphery partitioned surface, a second middle periphery partitioned surface adjacent to the first middle periphery partitioned surface, a third middle periphery partitioned surface adjacent to the second middle periphery partitioned surface, and a fourth middle periphery partitioned surface adjacent to the third middle periphery partitioned surface. The first middle periphery partitioned surface is closer to the optical axis of the objective lens than the second middle periphery partitioned surface, the second middle periphery partitioned surface is closer to the optical axis of the objective lens than the third middle periphery partitioned surface, and the third middle periphery partitioned surface is closer to the optical axis of the objective lens than the fourth middle periphery partitioned surface. An interval between the second middle periphery partitioned surface and the reference plane is greater than an interval between the first middle periphery partitioned surface and the reference plane, an interval between the third middle periphery partitioned surface and the reference plane is greater than the interval between the second middle periphery partitioned surface and the reference plane, and an interval between the fourth middle periphery partitioned surface and the reference plane is smaller than the interval between the third middle periphery partitioned surface and the reference plane. The first middle periphery connecting surface connects the first middle periphery partitioned surface and the second middle periphery partitioned surface, the second middle periphery connecting surface connects the second middle periphery partitioned surface and the third middle periphery partitioned surface, and the third middle periphery connecting surface connects the third middle periphery partitioned surface and the fourth middle periphery partitioned surface.

Therefore, since the third middle periphery partitioned surface and the fourth middle periphery partitioned surface are connected by the third middle periphery connecting surface formed of a conical surface centered around the optical axis of the objective lens and a light path is not blocked when a light beam incident in a vicinity of an outermost periphery of an active region of the objective lens is refracted and diffracted by the lens surface, diffraction efficiency in the vicinity of the outermost periphery of the active region of the objective lens can be improved and light intensity loss can be suppressed.

In addition, in the objective lens described above, favorably, a length of each of the first middle periphery connecting surface and the second middle periphery connecting surface in a direction of the optical axis of the objective lens is shorter than a length of the third middle periphery connecting surface in the direction of the optical axis of the objective lens.

According to this configuration, since the length of the third middle periphery connecting surface in the direction of the optical axis of the objective lens is longer than the length of each of the first middle periphery connecting surface and the second middle periphery connecting surface in the direction of the optical axis of the objective lens, the interval between the fourth middle periphery partitioned surface and the reference plane can be set shorter than the interval between the third middle periphery partitioned surface and the reference plane.

Furthermore, in the objective lens described above, favorably, an angle $\theta_{b1}$ [deg] formed between the third connecting surface and the optical axis of the objective lens, an angle $\theta_{b2}$ [deg] formed between the outer periphery connecting surface and the optical axis of the objective lens, and an angle $\theta_{b3}$ [deg] formed between the third middle periphery connecting surface and the optical axis of the objective lens are equal to each other.

According to this configuration, an angle $\theta_{b1}$ [deg] formed between the third connecting surface and the optical axis of the objective lens, an angle $\theta_{b2}$ [deg] formed between the outer periphery connecting surface and the optical axis of the objective lens, and an angle $\theta_{b3}$ [deg] formed between the third middle periphery connecting surface and the optical axis of the objective lens are equal to each other. Therefore, since a mold can be fabricated without having to alter a blade edge angle of a tool bit for processing the mold, mold workability can be improved.

In addition, in the objective lens described above, favorably, a length of each of the first connecting surface and the second connecting surface in a direction of the optical axis of the objective lens provides a laser beam having a wavelength $\lambda_1$ (0.39 µm≤$\lambda_1$≤0.43 µm) with a phase difference that is equal to or greater than $\lambda_1$, provides a laser beam having a wavelength $\lambda_2$ (0.61 µm≤$\lambda_2$≤0.69 µm) with a phase difference that is equal to or smaller than $\lambda_2$, and provides a laser beam having a wavelength $\lambda_3$ (0.75 µm≤$\lambda_3$≤0.85 µm) with a phase difference that is equal to or smaller than $\lambda_3$, and the laser beam with the wavelength $\lambda_1$, the laser beam with the wavelength $\lambda_2$, and the laser beam with the wavelength $\lambda_3$ incident on the optical surface are all outputted in the direction of the optical axis of the objective lens due to a refractive effect of a base aspherical surface and a diffractive effect of the diffractive structure of the objective lens.

According to this configuration, the length of each of the first connecting surface and the second connecting surface in the direction of the optical axis of the objective lens provides a laser beam having a wavelength $\lambda_1$ (0.39 µm≤$\lambda_1$≤0.43 µm) with a phase difference that is equal to or greater than $\lambda_1$, provides a laser beam having a wavelength $\lambda_2$ (0.61 µm≤$\lambda_2$≤0.69 µm) with a phase difference that is equal to or smaller than $\lambda_2$, and provides a laser beam having a wavelength $\lambda_3$ (0.75 µm≤$\lambda_3$≤0.85 µm) with a phase difference that is equal to or smaller than $\lambda_3$. In addition, the laser beam with the wavelength $\lambda_1$, the laser beam with the wavelength $\lambda_2$, and the laser beam with the wavelength $\lambda_3$ incident on the optical surface are all outputted in the direction of the optical axis of the objective lens due to a refractive effect of the base aspherical surface and a diffractive effect of the diffractive structure of the objective lens.

As a result, an objective lens can be provided which is compatible among an information recording surface onto which information is recorded or from which information is reproduced by a laser beam having a wavelength $\lambda_1$ (0.39 µm≤$\lambda_1$≤0.43 µm), an information recording surface onto which information is recorded or from which information is reproduced by a laser beam having a wavelength $\lambda_2$ (0.61 µm≤$\lambda_2$≤0.69 µm), and an information recording surface onto which information is recorded or from which information is reproduced by a laser beam having a wavelength $\lambda_3$ (0.75 µm≤$\lambda_3$≤0.85 µm).

An objective lens according to another aspect of the present invention is an objective lens used in an optical head which records information onto or reproduces information from an information recording medium, wherein the objective lens has a numerical aperture of 0.8 or higher and is made of synthetic resin, at least one surface of the objective lens includes an optical surface formed of a plurality of partitioned surfaces including an approximately sawtooth-shaped cross section and annularly partitioned centered around an optical axis of the objective lens, and a connecting surface which connects the plurality of mutually adjacent partitioned surfaces to each other and which is formed of a conical surface centered around the optical axis of the objective lens, the plurality of partitioned surfaces include a first partitioned surface and a second partitioned surface adjacent to the first partitioned surface, the first partitioned surface is closer to the optical axis of the objective lens than the second partitioned surface, when a plane in contact with the optical surface at an intersection of the optical surface and the optical axis of the objective lens is assumed as a reference plane, an interval between the second partitioned surface and the reference plane is greater than an interval between the first partitioned surface and the reference plane, the connecting surface connects the first partitioned surface and the second partitioned surface, the optical surface has a diffractive structure with an approximately sawtooth-shaped cross section, and an angle $\theta_b$ [deg] formed between the connecting surface and the optical axis of the objective lens satisfies Expression (27) below.

$$0 < \theta_b \le \theta - \sin^{-1}\left(\frac{(\sin\theta - m\lambda_1/d)}{n}\right) \quad (27)$$

In Expression (27), $\lambda_1$ [µm] denotes a light source wavelength of a laser beam incident on the objective lens, n denotes a refractive index of the objective lens at the wavelength $\lambda_1$, $\theta$ [deg] denotes a lens inclination angle of a base aspherical surface at an outermost periphery of an active region of the objective lens, d [µm] denotes a pitch of one period of the diffractive structure in a direction perpendicular to the optical axis, and m denotes a diffraction order of diffracted light that is a main component of the laser beam with the wavelength $\lambda_1$ that is generated by the diffractive structure.

According to this configuration, the objective lens has a numerical aperture of 0.8 or higher and is made of a synthetic resin. At least one surface of the objective lens includes an optical surface formed of a plurality of partitioned surfaces including an approximately sawtooth-shaped cross section and annularly partitioned centered around an optical axis of the objective lens, and a connecting surface which connects the plurality of mutually adjacent partitioned surfaces to each other and which is formed of a conical surface centered around the optical axis of the objective lens. The plurality of partitioned surfaces include a first partitioned surface and a second partitioned surface adjacent to the first partitioned surface. The first partitioned surface is closer to the optical axis of the objective lens than the second partitioned surface. A flat surface in contact with the optical surface at an intersection of the optical surface and the optical axis of the objective lens is now assumed as a reference plane. An interval between the second partitioned surface and the reference plane is greater than an interval between the first partitioned surface and the reference plane, and the connecting surface connects the first partitioned surface and the second partitioned surface. The optical surface has a diffractive structure with an approximately sawtooth-shaped cross section, and an angle $\theta_b$ [deg] formed between the connecting surface and the optical axis of the objective lens satisfies Expression (27) above.

Therefore, since the first partitioned surface and the second partitioned surface are connected by the connecting surface formed of a conical surface centered around the optical axis of the objective lens and a light path is not blocked when a light beam incident in a vicinity of an outermost periphery of an active region of the objective lens is refracted and diffracted by the lens surface, diffraction efficiency in the vicinity of the outermost periphery of the active region of the objective lens can be improved and light intensity loss can be suppressed. In addition, since the angle $\theta_b$ formed between the connecting surface and the optical axis of the objective lens becomes equal to or smaller than an angle formed between a light beam resulting from a refraction and a diffraction by the lens surface of a light beam incident parallel to the optical axis, diffraction efficiency can be improved in a vicinity of an outermost periphery of an active region of the objective lens and light intensity loss can be suppressed.

An objective lens according to another aspect of the present invention is an objective lens used in an optical head which records information onto or reproduces information from an information recording medium, wherein the objective lens has a numerical aperture of 0.8 or higher and is made of synthetic resin, at least one surface of the objective lens includes an optical surface formed of a plurality of partitioned surfaces including an approximately sawtooth-shaped cross section and annularly partitioned centered around an optical axis of the objective lens, and a connecting surface which connects the plurality of mutually adjacent partitioned surfaces to each other and which is formed of a conical surface centered around the optical axis of the objective lens, the plurality of partitioned surfaces include a first partitioned surface and a second partitioned surface adjacent to the first partitioned surface, the first partitioned surface is closer to the optical axis of the objective lens than the second partitioned surface, when a plane in contact with the optical surface at an intersection of the optical surface and the optical axis of the objective lens is assumed as a reference plane, an interval between the second partitioned surface and the reference plane is greater than an interval between the first partitioned surface and the reference plane, the connecting surface connects the first partitioned surface and the second partitioned surface, the optical surface has a diffractive structure with an approximately sawtooth-shaped cross section, and an angle $\theta_b$ [deg] formed between the connecting surface and the optical axis of the objective lens satisfies Expression (28) below.

$$0 < \theta_b \le \theta_r - \sin^{-1}\left(\frac{\sin\theta_r}{n}\right) \quad (28)$$

In Expression (28), $\theta_r$ [deg] denotes a lens inclination angle of the partitioned surface at an outermost periphery of an active region of the objective lens, and n denotes a refractive index of the objective lens at a light source wavelength of a laser beam incident on the objective lens.

According to this configuration, the objective lens has a numerical aperture of 0.8 or higher and is made of a synthetic resin. At least one surface of the objective lens includes an optical surface formed of a plurality of partitioned surfaces including an approximately sawtooth-shaped cross section and annularly partitioned centered around an optical axis of the objective lens, and a connecting surface which connects the plurality of mutually adjacent partitioned surfaces to each other and which is formed of a conical surface centered around the optical axis of the objective lens. The plurality of partitioned surfaces include a first partitioned surface and a second partitioned surface adjacent to the first partitioned surface. The first partitioned surface is closer to the optical axis of the objective lens than the second partitioned surface. A flat surface in contact with the optical surface at an intersection of the optical surface and the optical axis of the objective lens is now assumed as a reference plane. An interval between the second partitioned surface and the reference plane is greater than an interval between the first partitioned surface and the reference plane, and the connecting surface connects the first partitioned surface and the second partitioned surface. The optical surface has a diffractive structure with an approximately sawtooth-shaped cross section, and an angle $\theta_b$ [deg] formed between the connecting surface and the optical axis of the objective lens satisfies Expression (28) above.

Therefore, since the first partitioned surface and the second partitioned surface are connected by the connecting surface formed of a conical surface centered around the optical axis of the objective lens and a light path is not blocked when a light beam incident in a vicinity of an outermost periphery of an active region of the objective lens is refracted and diffracted by the lens surface, diffraction efficiency in the vicinity of the outermost periphery of the active region of the objective lens can be improved and light intensity loss can be suppressed. In addition, the angle $\theta_b$ formed between the connecting surface and the optical axis of the objective lens can be defined using the lens inclination angle $\theta_r$ of the partitioned surface at an outermost periphery of the active region of the objective lens.

An optical head according to another aspect of the present invention comprises a light source that outputs a laser beam, any of the objective lenses described above which causes the light beam outputted from the light source to converge on an information recording surface of an information recording medium, and a light receiving unit which receives the laser beam reflected by the information recording medium.

According to this configuration, a light source outputs a laser beam. Any of the objective lenses described above causes the light beam outputted from the light source to converge on an information recording surface of an information recording medium. A light receiving unit receives the laser beam reflected by the information recording medium. Therefore, the objective lenses described above can be applied to an optical head.

An optical disk device according to another aspect of the present invention comprises the optical head described above, a motor that rotates an information recording medium, and a control unit that controls the optical head and the motor. According to this configuration, the optical head described above can be applied to an optical disk device.

It is to be understood that the specific embodiments or examples described in Description of Embodiments are merely illustrative of the technical contents of the present invention, and that the present invention should not be construed as being limited to such specific examples. Obviously, many modifications and variations of the present invention are possible without departing from the spirit of the invention and the scope of the following claims.

INDUSTRIAL APPLICABILITY

An objective lens according to the present invention is capable of improving diffraction efficiency in a vicinity of an outermost periphery of an active region of the objective lens and suppressing light intensity loss, and is useful as an objective lens having an optical surface formed of a plurality of partitioned surfaces annularly partitioned centered around an optical axis, an optical head using the objective lens, and an optical disk device using the optical head.

The invention claimed is:

1. An objective lens used in an optical head which records information onto or reproduces information from an information recording medium, wherein
at least one surface of the objective lens includes an optical surface formed of a plurality of partitioned surfaces including an approximately stair-shaped cross section and annularly partitioned centered around an optical axis of the objective lens, and a plurality of connecting surfaces connecting mutually adjacent partitioned surfaces, of the plurality of partitioned surfaces, to each other,
the plurality of connecting surfaces includes a first connecting surface formed of a cylindrical surface centered around the optical axis of the objective lens, a second connecting surface formed of a cylindrical surface centered around the optical axis of the objective lens, and a third connecting surface formed of a conical surface centered around the optical axis of the objective lens,
the plurality of partitioned surfaces includes a first partitioned surface, a second partitioned surface adjacent to the first partitioned surface, a third partitioned surface adjacent to the second partitioned surface, and a fourth partitioned surface adjacent to the third partitioned surface,
the first partitioned surface is closer to the optical axis of the objective lens than the second partitioned surface,
the second partitioned surface is closer to the optical axis of the objective lens than the third partitioned surface,
the third partitioned surface is closer to the optical axis of the objective lens than the fourth partitioned surface,
when a plane in contact with the optical surface at an intersection of the optical surface and the optical axis of the objective lens is assumed as a reference plane,
an interval between the second partitioned surface and the reference plane is greater than an interval between the first partitioned surface and the reference plane,
an interval between the third partitioned surface and the reference plane is greater than the interval between the second partitioned surface and the reference plane, and an interval between the fourth partitioned surface and the reference plane is smaller than the interval between the third partitioned surface and the reference plane, the first connecting surface connects the first partitioned surface and the second partitioned surface, the second connecting surface connects the second partitioned surface and the third partitioned surface, the third connecting surface connects the third partitioned surface and the fourth partitioned surface, a length of each of the first connecting surface and the second connecting surface in a direction of the optical axis of the objective lens is shorter than a length of the third connecting surface in the direction of the optical axis of the objective lens, the objective lens has a numerical aperture of 0.8 or higher and is made of synthetic resin, the optical surface has a diffractive structure with an approximately stair-shaped cross section, and an angle $\theta_b$ [deg] formed between the third connecting surface and the optical axis of the objective lens satisfies Expression (1) below:

$$20 \leq \theta_b \leq \theta - \sin^{-1}\left(\frac{(\sin\theta - m\lambda_1/d)}{n}\right), \quad (1)$$

where $\lambda_1$ [μm] denotes a light source wavelength of a laser beam incident on the objective lens, 0.39 μm≤$\lambda_1$≤0.43 μm, n denotes a refractive index of the objective lens at the wavelength $\lambda_1$, $\theta$ [deg] denotes a lens inclination angle of a base aspherical surface at an outermost periphery of an active region of the objective lens, d [μm] denotes a pitch of one period of the diffractive structure in a direction perpendicular to the optical axis, m denotes a diffraction order of diffracted light that is a main component of the laser beam with the wavelength $\lambda_1$ that is generated by the diffractive structure, and $-1 \leq (\sin\theta - m\lambda_1/d)/n \leq 1$.

2. The objective lens according to claim 1, wherein at least one surface of the objective lens includes a first region including the optical axis of the objective lens and a second region arranged on an outer peripheral side relative to the first region, the first region includes the optical surface and the plurality of connecting surfaces, the second region includes an outer periphery optical surface formed of a plurality of outer periphery partitioned surfaces including an approximately sawtooth-shaped cross section and annularly partitioned centered around the optical axis of the objective lens, and an outer periphery connecting surface which connects mutually adjacent outer periphery partitioned surfaces, of the plurality of outer periphery partitioned surfaces, to each other and which is formed of a conical surface centered around the optical axis of the objective lens, and an angle $\theta_{b1}$ [deg] formed between the third connecting surface and the optical axis of the objective lens is equal to an angle $\theta_{b2}$ [deg] formed between the outer periphery connecting surface and the optical axis of the objective lens.

3. The objective lens according to claim 2, wherein the plurality of outer periphery partitioned surfaces includes a first outer periphery partitioned surface and a second outer periphery partitioned surface adjacent to the first outer periphery partitioned surface, the first outer periphery partitioned surface is closer to the optical axis of the objective lens than the second outer periphery partitioned surface, an interval between the second outer periphery partitioned surface and the reference plane is greater than an interval between the first outer periphery partitioned surface and the reference plane, and the first outer periphery partitioned surface and the second outer periphery partitioned surface are connected by the outer periphery connecting surface.

4. The objective lens according to claim 2, wherein the outer periphery optical surface has a diffractive structure with an approximately sawtooth-shaped cross section, and the angle $\theta_{b2}$ [deg] formed between the outer periphery connecting surface and the optical axis of the objective lens satisfies Expression (2) below:

$$0 < \theta_{b2} \leq \theta_r - \sin^{-1}\left(\frac{\sin\theta_r}{n}\right), \quad (2)$$

where $\theta_r$ [deg] denotes a lens inclination angle of an outer periphery partitioned surface, of the plurality of outer periphery partitioned surfaces, at an outermost periphery of an active region of the objective lens, and n denotes the refractive index of the objective lens at the light source wavelength of the laser beam incident on the objective lens.

5. The objective lens according to claim 2, wherein the outer periphery optical surface has a diffractive structure with an approximately sawtooth-shaped cross section, and the angle $\theta_{b2}$ [deg] formed between the outer periphery connecting surface and the optical axis of the objective lens satisfies Expression (3) below:

$$20 \leq \theta_{b2} \leq \theta - \sin^{-1}\left(\frac{(\sin\theta - m\lambda_1/d)}{n}\right). \quad (3)$$

6. The objective lens according to claim 2, wherein the outer periphery optical surface has a diffractive structure with an approximately sawtooth-shaped cross section, and the angle $\theta_{b2}$ [deg] formed between the outer periphery connecting surface and the optical axis of the objective lens satisfies $40 \leq \theta_{b2} \leq 50$.

7. The optical lens according to claim 2, wherein a length of each of the first connecting surface and the second connecting surface in a direction of the optical axis of the objective lens provides a laser beam having the wavelength $\lambda_1$ with a phase difference that is equal to or greater than $\lambda_1$, and provides a laser beam having a wavelength $\lambda_2$ (0.61 μm≤$\lambda_2$≤0.69 μm) with a phase difference that is equal to or smaller than $\lambda_2$, and the laser beam with the wavelength $\lambda_1$ and the laser beam with the wavelength $\lambda_2$ incident on the optical surface are both outputted in the direction of the optical axis of the objective lens due to a refractive effect of a base aspherical surface and a diffractive effect of the diffractive structure of the objective lens.

8. The objective lens according to claim 2, wherein the second region is in contact with the first region.

9. The objective lens according to claim 2, wherein
at least one surface of the objective lens further includes a third region arranged between the first region and the second region,
the third region includes a middle periphery optical surface formed of a plurality of middle periphery partitioned surfaces including an approximately stair-shaped cross section and annularly partitioned centered around the optical axis of the objective lens, and a plurality of middle periphery connecting surfaces connecting mutually adjacent middle periphery partitioned surfaces, of the plurality of middle periphery partitioned surfaces, to each other, and
the plurality of middle periphery connecting surfaces includes a first middle periphery connecting surface formed of a cylindrical surface centered around the optical axis of the objective lens, a second middle periphery connecting surface formed of a cylindrical surface centered around the optical axis of the objective lens, and a third middle periphery connecting surface formed of a conical surface centered around the optical axis of the objective lens.

10. The objective lens according to claim 9, wherein
the plurality of middle periphery partitioned surfaces includes a first middle periphery partitioned surface, a second middle periphery partitioned surface adjacent to the first middle periphery partitioned surface, a third middle periphery partitioned surface adjacent to the second middle periphery partitioned surface, and a fourth middle periphery partitioned surface adjacent to the third middle periphery partitioned surface,
the first middle periphery partitioned surface is closer to the optical axis of the objective lens than the second middle periphery partitioned surface,
the second middle periphery partitioned surface is closer to the optical axis of the objective lens than the third middle periphery partitioned surface,
the third middle periphery partitioned surface is closer to the optical axis of the objective lens than the fourth middle periphery partitioned surface,
an interval between the second middle periphery partitioned surface and the reference plane is greater than an interval between the first middle periphery partitioned surface and the reference plane,
an interval between the third middle periphery partitioned surface and the reference plane is greater than the interval between the second middle periphery partitioned surface and the reference plane,
an interval between the fourth middle periphery partitioned surface and the reference plane is smaller than the interval between the third middle periphery partitioned surface and the reference plane,
the first middle periphery connecting surface connects the first middle periphery partitioned surface and the second middle periphery partitioned surface,
the second middle periphery connecting surface connects the second middle periphery partitioned surface and the third middle periphery partitioned surface, and
the third middle periphery connecting surface connects the third middle periphery partitioned surface and the fourth middle periphery partitioned surface.

11. The objective lens according to claim 9, wherein a length of each of the first middle periphery connecting surface and the second middle periphery connecting surface in a direction of the optical axis of the objective lens is shorter than a length of the third middle periphery connecting surface in the direction of the optical axis of the objective lens.

12. The objective lens according to claim 9, wherein the angle $\theta_{b1}$ [deg] formed between the third connecting surface and the optical axis of the objective lens, the angle $\theta_{b2}$ [deg] formed between the outer periphery connecting surface and the optical axis of the objective lens, and an angle $\theta_{b3}$ [deg] formed between the third middle periphery connecting surface and the optical axis of the objective lens are equal to each other.

13. The objective lens according to claim 9, wherein
a length of each of the first connecting surface and the second connecting surface in a direction of the optical axis of the objective lens provides a laser beam having the wavelength $\lambda_1$ with a phase difference that is equal to or greater than $\lambda_1$, provides a laser beam having a wavelength $\lambda_2$ (0.61 μm≤$\lambda_2$≤0.69 μm) with a phase difference that is equal to or smaller than $\lambda_2$, and provides a laser beam having a wavelength $\lambda_3$ (0.75 μm≤$\lambda_3$≤0.85 μm) with a phase difference that is equal to or smaller than $\lambda_3$, and
the laser beam with the wavelength $\lambda_1$, the laser beam with the wavelength $\lambda_2$, and the laser beam with the wavelength $\lambda_3$ incident on the optical surface are all outputted in the direction of the optical axis of the objective lens due to a refractive effect of a base aspherical surface and a diffractive effect of the diffractive structure of the objective lens.

14. An optical head comprising:
a light source that outputs a laser beam;
the objective lens according to claim 1 which causes the laser beam outputted from the light source to converge on an information recording surface of the information recording medium; and
a light receiving unit which receives the laser beam reflected by the information recording medium.

15. An optical disk device comprising:
the optical head according to claim 14;
a motor that rotates the information recording medium; and
a control unit that controls the optical head and the motor.

16. An objective lens used in an optical head which records information onto or reproduces information from an information recording medium, wherein
at least one surface of the objective lens includes an optical surface formed of a plurality of partitioned surfaces including an approximately stair-shaped cross section and annularly partitioned centered around an optical axis of the objective lens, and a plurality of connecting surfaces connecting mutually adjacent partitioned surfaces, of the plurality of partitioned surfaces, to each other,
the plurality of connecting surfaces includes a first connecting surface formed of a cylindrical surface centered around the optical axis of the objective lens, a second connecting surface formed of a cylindrical surface centered around the optical axis of the objective lens, and a third connecting surface formed of a conical surface centered around the optical axis of the objective lens,
the plurality of partitioned surfaces includes a first partitioned surface, a second partitioned surface adjacent to the first partitioned surface, a third partitioned surface adjacent to the second partitioned surface, and a fourth partitioned surface adjacent to the third partitioned surface,
the first partitioned surface is closer to the optical axis of the objective lens than the second partitioned surface,
the second partitioned surface is closer to the optical axis of the objective lens than the third partitioned surface, the third partitioned surface is closer to the optical axis of the objective lens than the fourth partitioned surface, when a plane in contact with the optical surface at an intersection of the optical surface and the optical axis of the objective lens is assumed as a reference plane, an interval between the second partitioned surface and the reference plane is greater than an interval between the first partitioned surface and the reference plane, an interval between the third partitioned surface and the reference plane is greater than the interval between the second partitioned surface and the reference plane, and an interval between the fourth partitioned surface and the reference plane is smaller than the interval between the third partitioned surface and the reference plane, the first connecting surface connects the first partitioned surface and the second partitioned surface, the second connecting surface connects the second partitioned surface and the third partitioned surface, the third connecting surface connects the third partitioned surface and the fourth partitioned surface, a length of each of the first connecting surface and the second connecting surface in a direction of the optical axis of the objective lens is shorter than a length of the third connecting surface in the direction of the optical axis of the objective lens, the objective lens has a numerical aperture of 0.8 or higher and is made of synthetic resin, the optical surface has a diffractive structure with an approximately stair-shaped cross section, and an angle $\theta_b$ [deg] formed between the third connecting surface and the optical axis of the objective lens satisfies $40 \leq \theta_b \leq 50$.

* * * * *